United States Patent [19]
Sato et al.

[11] Patent Number: 5,555,555
[45] Date of Patent: Sep. 10, 1996

[54] APPARATUS WHICH DETECTS LINES APPROXIMATING AN IMAGE BY REPEATEDLY NARROWING AN AREA OF THE IMAGE TO BE ANALYZED AND INCREASING THE RESOLUTION IN THE ANALYZED AREA

[75] Inventors: Jun Sato, Cambridge, England; Mitsuyoshi Saiki, Tsukuba, Japan

[73] Assignee: Aisin Seiki Kabushiki Kaisha, Kariya, Japan

[21] Appl. No.: 183,369

[22] Filed: Jan. 19, 1994

[30] Foreign Application Priority Data

Jan. 19, 1993 [JP] Japan ..................... 5-007017

[51] Int. Cl.$^6$ .................................................. G06K 9/00
[52] U.S. Cl. .................................... 382/104; 382/291
[58] Field of Search .............................. 382/1, 22, 48, 382/104, 199, 291; 348/118, 119; 364/424.02, 460, 725, 731; G06F 15/48, 15/50

[56] References Cited

U.S. PATENT DOCUMENTS

| | | | |
|---|---|---|---|
| 4,819,169 | 4/1989 | Saitoh et al. | 364/424.02 |
| 5,087,969 | 2/1992 | Kamada et al. | 358/103 |
| 5,220,615 | 6/1993 | Ishii et al. | 382/1 |
| 5,247,587 | 9/1993 | Hasegawa et al. | 382/48 |
| 5,341,437 | 8/1994 | Nakayama | 382/1 |
| 5,359,666 | 10/1994 | Nakayama et al. | 382/1 |
| 5,379,353 | 1/1995 | Hasegawa et al. | 382/41 |

FOREIGN PATENT DOCUMENTS

| | | | |
|---|---|---|---|
| 63-79181 | 4/1988 | Japan | G06F 15/66 |
| 63-106875 | 5/1988 | Japan | G06F 15/62 |
| 63-106876 | 5/1988 | Japan | G06F 15/62 |
| 63-103382 | 5/1988 | Japan | G06F 15/62 |
| 63-103381 | 5/1988 | Japan | G06F 15/62 |
| 64-15605 | 1/1989 | Japan | G01C 3/06 |

OTHER PUBLICATIONS

Technical Research Report of the Association of Electronics and Communication, IE86–67, pp. 49–56, "A Fast Hough Transformation Using Pyramid Hieraarchy—Application to Extracton of Car Number Plates," Agui et al., (no date).

*Primary Examiner*—Leo Boudreau
*Assistant Examiner*—Andrew W. Johns
*Attorney, Agent, or Firm*—Sughrue, Mion, Zinn, Macpeak & Seas

[57] ABSTRACT

Each of feature points (Xs, Ys) in X and Y orthogonal coordinate system of an image taken by a television camera is converted into a group of points (ρ, θ) of polar coordinate system. Memory includes addresses allotted to each one of polar coordinates (ρ, θ) for storing frequency data. Each time the feature point is converted, the frequency data at addresses corresponding to the converted points (ρ, θ) is incremented. A particular point (ρm, θm) where the stored frequency data is at maximum is picked out, and a rectilinear line corresponding to the particular point (ρm, θm) is determined to be a rectilinear line which approxiates a succession of feature points (Xs, Ys). In this manner, a method of detecting a rectilinear line appearing on a photographed image is provided. This processing operation is repeated in a plurality of runs for the same succession of feature points. However, during the conversion into the polar coordinates of an earlier run, the conversion takes place at a low density and covers an increased range of values of ρ and θ while during a later run, the conversion takes place at a higher density and in a narrowed range which is centered about the particular point (ρm, θm) which was obtained during the conversion into the polar coordinates of the previous run.

20 Claims, 57 Drawing Sheets

Fig. 8a

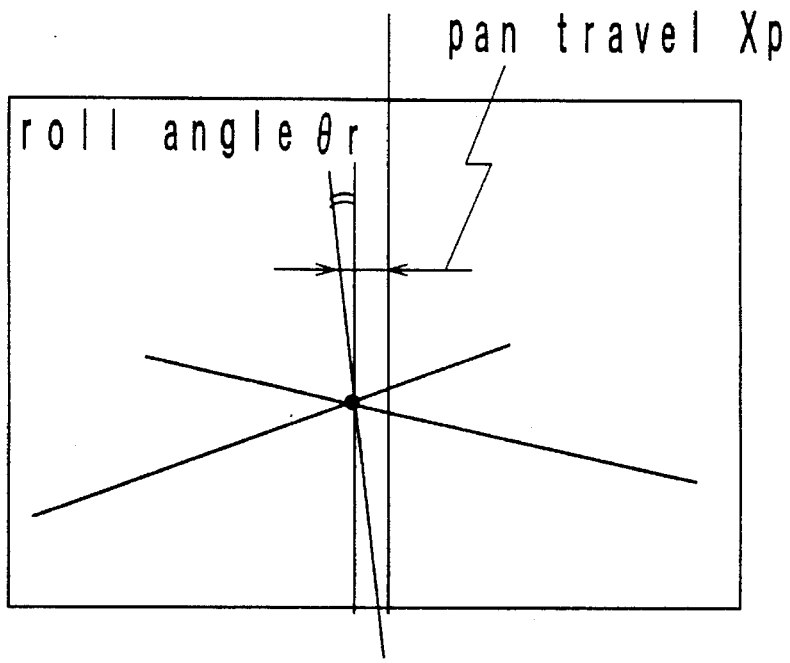

Fig. 8b $$\begin{pmatrix} x' \\ y' \end{pmatrix} = \begin{pmatrix} \cos\theta r & \sin\theta r \\ -\sin\theta r & \cos\theta r \end{pmatrix} \begin{pmatrix} x-x0 \\ y-y0 \end{pmatrix} + \begin{pmatrix} y0-Xp \\ y0 \end{pmatrix}$$

x : original x coordinate
y : original y coordinate
x': corrected x coordinate
y': corrected y coordinate
$\theta r$: roll angle
Xp: pan travel
x0: x coordinate for center of image (x0=256)
y0: y coordinate for center of image (y0=511)

point in question (x, y)

\* In the event no data is found at a point in question, a mean value of data at adjacent four points (a to d) is substituted.

$$A_{ex1} \leftarrow \frac{H_c \cdot S_y}{(X_R + W_L) \cdot S_x \cdot \cos\alpha} \quad (W_L: \text{calculated at D5})$$

$$B_{ex1} \leftarrow Y_0 - S_y \cdot \tan\alpha - \frac{(X_0 - S_x \cdot \tan\phi) \cdot H_c \cdot S_y}{(X_R + W_L) \cdot S_x \cdot \cos\alpha}$$

121

$$A_{ex2} \leftarrow \frac{H_c \cdot S_y}{(X_L + W_L) \cdot S_x \cdot \cos\alpha}$$

$$B_{ex2} \leftarrow Y_0 - S_y \cdot \tan\alpha - \frac{(X_0 - S_x \cdot \tan\phi) \cdot H_c \cdot S_y}{(X_L + W_L) \cdot S_x \cdot \cos\alpha}$$

122

$$T_{mRR} \leftarrow \tan^{-1}\left(\frac{1}{A_{ex1}}\right)$$

$$R_{mRR} \leftarrow (Y_{ch} - B_{ex2})\sin(T_{mRR}) - X_{ch} \cdot \cos(T_{mRR})$$

123

$$T_{mLL} \leftarrow \tan^{-1}\left(\frac{1}{A_{ex2}}\right)$$

$$R_{mLL} \leftarrow (Y_{ch} - B_{ex2})\sin(T_{mLL}) - X_{ch} \cdot \cos(T_{mLL})$$

( return )

picture element in question (x, y)

APPARATUS WHICH DETECTS LINES APPROXIMATING AN IMAGE BY REPEATEDLY NARROWING AN AREA OF THE IMAGE TO BE ANALYZED AND INCREASING THE RESOLUTION IN THE ANALYZED AREA

FIELD OF THE INVENTION

The invention relates to the detection of a rectilinear line or lines on a screen, and more particularly, while not intended to be limited thereto to the detection of a rectilinear line which approximates a white line drawn on a road surface and appearing on a screen which displays a scene including the road surface located ahead of a road vehicle.

BACKGROUND OF THE INVENTION

Detecting a white line drawn on a road surface is disclosed, for example, in Japanese Laid Open Patent Application No. 15,605/1989 where a scene including a road is surface which is located ahead of a road vehicle and which is obtained by a photographing unit mounted onboard the vehicle is displayed on a screen based on X, Y orthogonal coordinates. Utilizing image data displayed on the screen, derivatives in a direction which forms an angle of 45° with respect to the X-axis are calculated, and those derivatives which have magnitudes in excess of a given value are chosen as feature points represented in X, Y orthogonal coordinates. A succession of such feature points are processed into a thin line, and a thin line having a length greater than a given value is picked out to be recognized as representing a white line drawn on the road surface when such thin line satisfies conditions which are preset on the basis of the features of such white line appearing on the screen. However, when the road surface is relatively dark or when the white line is vanishing, the road surface condition becomes different from a road surface condition which is used as a prerequisite by the detecting device. As a result, a high probability of false recognition or inability of detection exists.

Recently, the use of "Hough transformation" in detecting lines on a screen has been proposed. (See, for example, an article appearing on pages 1769–1776 of Journal of the Association of Electronics and Communication, October 1985, Vol. J68-D No. 10). When each point of a rectilinear line on a screen represented in X-Y orthogonal coordinates is converted into $\rho, \theta$ polar coordinates, each point will be converted into a curve in the polar coordinates. Thus, curves representing individual points on a single rectilinear line in and the X-Y orthogonal coordinates will intersect at a point, and the coordinates $(\rho, \theta)$ may be substituted into a conversion formula for converting the coordinates $(\rho, \theta)$ into the X-Y orthogonal coordinates to derive an equation representing the rectilinear line in the X-Y orthogonal coordinates. In the detection of a rectilinear line utilizing the Hough transformation, a rectilinear line representing a set (distribution) of black points, the edges of an image, or the like which are dispersed throughout the screen (hereafter referred to as feature points) may be detected. Specifically, each feature point $(X_s, Y_s)$ in the X-Y orthogonal coordinates may be sequentially converted into a plurality of coordinates $(\rho, \theta)$ through which curves in the $\rho, \theta$ polar coordinates, and corresponding to the respective feature points, pass. Frequency data which is allotted to each one of polar coordinates $(\rho, \theta)$ in memory may be incremented. Such operation is executed for all the feature points. A particular polar coordinate $(\rho m, \theta m)$ representing a maximum value of the frequency data among the memory is then picked out, and the rectilinear line represented by the particular polar coordinate $(\rho m, \theta m)$ is determined to be the line which approximates the succession of the feature points.

More specifically, a single point in the X-Y orthogonal coordinate system becomes a single curve in the $\rho, \theta$ polar coordinate system. Accordingly, a single point in the X-Y coordinates is converted into a plurality of sets of coordinates through which a single curve in the $\rho, \theta$ polar coordinates passes. The $\rho, \theta$ polar coordinates are used as an address for memory means, and the data stored at an address corresponding to the respective coordinates is updated by incrementing the data by one. If a similar operation is executed for other points lying on the same rectilinear line in the X-Y orthogonal coordinates, which are assumed to be a total of E points, data representing the number "n" will be n stored at a single address (or a single point $\rho m, \theta m$ in the $\rho$-$\theta$ polar coordinates). Such data "n" indicates that n-curves will intersect with each other at this address. Similarly, data at other addresses will represent either 0 (no curve passing therethrough) or 1 (a single curve passing therethrough). Thus it will be seen that the address $(\rho m, \theta m)$ in which data representing "n" is stored defines the rectilinear line in the X-Y orthogonal coordinates. This line is defined as follows:

$$\rho m = X \cos \theta m + Y \sin \theta m$$

When the described operation is performed for a plurality (n) of points, which may be a group of feature points, for example, in the X-Y orthogonal coordinates and for which it is uncertain whether they lie on a common rectilinear line, data exhibiting a value less than n will be distributed in the memory means if a point or points which do not lie on the same rectilinear line are contained in the group. When the address $(\rho m, \theta m)$ of data representing a maximum value is picked out from such data, it then follows that a rectilinear line represented by the equation $$\rho m = X \cos \theta m + Y \sin \theta m$$

in the X-Y orthogonal coordinates is a line which is representative of a bank of rectilinear lines joining any pair of points in the group.

With the detection of a rectilinear line using the Hough transformation, it follows that in the event the edge of an image is roughened, there will be obtained a single rectilinear line $(\rho m, \theta m)$ which statistically represents a number of imaginary lines joining any pair of points. Thus, one point located on the edge of the image and any one of a plurality of dispersed feature points can be used to yield a high reliability in detecting a rectilinear line. This may be utilized in detecting a white line appearing in an image which is obtained by taking a picture of a scene located ahead of a vehicle with an onboard television camera, with a concomitant reliability.

However, since each feature point $(X_s, Y_s)$ in the X-Y orthogonal coordinate system becomes a curve in the $\rho$-$\theta$ polar coordinate system, a conversion of one of the feature points $(X_s, Y_s)$ into the $\rho$-$\theta$ polar coordinates requires an excessive repetition. For example, assuming that the extent of $\rho$ is limited by $0 \leq \theta < 90°$, and $\theta$ is scanned in a unit of 1° each value of $\theta$ from 0° to 89° must be input to the equation $$\rho = X_s \cos \theta + Y_s \sin \theta$$

to derive a $\rho$ value corresponding to each value of $\theta$. This means that an increased calculation time as well as an increased capacity of memory are required for the conversion, requiring a memory having a capacity of 90×90×Da (Da represents a number bits used to represent frequency data) for storing such frequency data.

To cope with this problem, an article in the Technical Research Report of the Association of Electronics and Communication, IE86-67, pages 49–56, entitled "On fast Hough transformation utilizing pyramidal hierarchy" has been proposed to reduce the number of feature points which are processed in the calculation by sampling feature points in the original image (which is displayed on the X-Y orthogonal coordinate system). However, the sampling reduces information (feature points) which is used to define the rectilinear line to be detected, it devalues the significance of the statistical processing. In other words, sampling reduces the very merit of the Hough transformation and degrades the reliability. In addition, this technique has no contribution to reducing the number of times the calculation is repeated for one feature point.

SUMMARY OF THE INVENTION

It is an object of the invention to detect a rectilinear line which approximates a succession of a number of feature points (Xs, Ys) in an X-Y orthogonal coordinate system with a high reliability while minimizing a time interval required for the calculation and while utilizing a data memory of a reduced capacity.

Thus, the invention relates to a method of detecting a rectilinear line approximating an image appearing on a screen in X-Y orthogonal coordinate system in which the image is depicted by image data comprising the steps of converting each of a plurality of feature points (Xs, Ys) defined by the values and distribution in X-Y orthogonal coordinate system of the image data which depicts an image on a screen in X-Y coordinates into a group of polar coordinates ($\rho$, $\theta$) in $\rho$-$\theta$ polar coordinate system, incrementing frequency data stored in memory means and allotted to each polar coordinate ($\rho$, $\theta$) in the group, picking out a particular point ($\rho m$, $\theta m$) in the $\rho$, $\theta$ polar coordinate system which represents a maximum value of the frequency data, and determining a rectilinear line corresponding to the point ($\rho m$, $\theta m$) as a rectilinear line which approximates the succession of the feature points (Xs, Ys). In accordance with the invention, the conversion into the polar coordinates ($\rho m$, $\theta m$) as well as the selection of the polar coordinate ($\rho m$, $\theta m$) which represents a maximum value of the frequency data are repeated a plurality of times. During such repetition, $\rho$ and $\theta$ are scanned at a low density and over an extensive area during an earlier conversion, and are scanned at a higher density and in a reduced area which is centered about the polar coordinate ($\rho m$, $\theta m$) obtained as providing a maximum value during a preceding conversion, at a later conversion.

With the method according to the invention, the parameters $\rho$ and $\theta$ in the polar coordinates are scanned over an extensive area during an earlier conversion, thus reducing the likelihood that a point of intersection ($\rho m$, $\theta m$) of curves representing the individual feature points (Xs, Ys) may be missed, thus increasing the reliability with which such point of intersection ($\rho m$, $\theta m$) is detected. When the scan covers an extensive area, an increased capacity is required for a memory which stores the frequency data and the time interval required for the calculation will become longer. However, because the parameters $\rho$ and $\theta$ in the polar coordinates are at a low density, the sampling density of points on the curve in the polar coordinate system which represents a single feature point (Xs, Ys) is low, which in turn minimizes the capacity required for the memory and also minimizes the time interval required for the calculation.

The low sampling density of points on the curve in the polar coordinate system means that the point of intersection ($\rho m$, $\theta m$) is determined with a reduced accuracy. However, during a later conversion into the polar coordinates, the scan takes place over a reduced area which is centered about the polar coordinate ($\rho m$, $\theta m$) obtained during a preceding conversion. Also, this scan takes place at a higher density, so that the reduced area around the point of intersection which was obtained during a preceding conversion can be precisely scanned or searched for. While the sampling density is of points on the curve in polar coordinates is high, because the scan area is reduced, the required capacity for the memory is reduced while also reducing the time interval required for the calculation. The high sampling density provides a high accuracy in detecting the point of intersection ($\rho m$, $\theta m$).

To give an example, it may be assumed that N feature points in X-Y orthogonal coordinate space are subject to coordinate conversion (simple Hough transformation) into $\rho$-$\theta$ polar coordinates, in a range defined by $0 \leq \theta < \pi/2$ and $0 \leq \rho < 256$, with a resolution of 1/2048. Then, $\theta$ will be scanned in unit of $\pi/(2 \times 2028)$, requiring a memory capacity of 2048×2048×Da, and the number of calculations required will be 2048×N, resulting in a memory capacity and a number of calculations both of which are voluminous.

However, according to the present invention, during a first conversion into the polar coordinates, the conversion takes place with a resolution of 1/32, whereby $\theta$ will be scanned in unit of $\pi/(2 \times 32)$, requiring a memory capacity of 32×32× Da and a number of calculations equal to 32×N. During a second conversion, the resolution is raised to 1/256, and $\theta$ will be scanned in a relatively narrow range of $\pi/(2 \times 256/32) = \pi/16$ which is centered about the point of intersection determined during the first conversion. Therefore, even though $\theta$ will be scanned in unit of $\pi/(2 \times 256)$, the memory capacity required will be 32×32×Da and the number of calculations required is will be 32×N. Additionally, during a third conversion into the polar coordinates, a resolution of 1/2048 is used, and $\theta$ will be scanned in a further reduced range of $\pi(2 \times 2048/32) = \pi/128$ which is centered about the point of intersection determined during the second conversion. While $\theta$ will be scanned in unit of $\pi/(2 \times 2048)$, the memory capacity required will be 32×32×Da and the number of calculations will be 32×N.

The combined memory capacity required for the total of three conversions will be 32×32×3×Da and the total number of calculations required will be 32×3×N, which are 1/1365 and 96/2048 times, respectively, the required memory capacity 2048×2048×Da and the required number of calculations 2048×N required when utilizing the aforementioned simple Hough transformation. The frequency data memory can be shared for the first to the third conversion, and in this instance, the memory capacitor required will be 32 ×32×Da, which is 1/4096 times the memory capacitor required with the simple Hough transformation. Nevertheless, data or the polar coordinates ($\rho m$, $\theta m$) obtained during the third conversion, which represents the approximating line, can be obtained with the same resolution (1/2048).

Other objects and features of the invention will become apparent from the following description of an embodiment thereof with reference to the drawings.

BRIEF DESCRIPTION OF THE DRAWINGS

FIG. 8a is a plan view showing a roll angle and a pan travel on a screen as calculated by "calculation of roll angle and pan travel" C5 shown in FIG. 4;

FIG. 8b indicates a transformation formula for transforming the address of a picture element on a screen into an address of a picture element on a corrected screen which is rotated by the roll angle and then translated by the pan travel therefrom in "rotation and translation of image" C7 shown in FIG. 4;

FIG. 24b is a flow chart showing the remainder of "estimation of adjacent lane" F shown in FIG. 3 in detail;

FIG. 38 is a flow chart showing "detection of lateral ends of vehicle" H3 shown in FIG. 28 in detail;

DESCRIPTION OF PREFERRED EMBODIMENT

Figure 1:
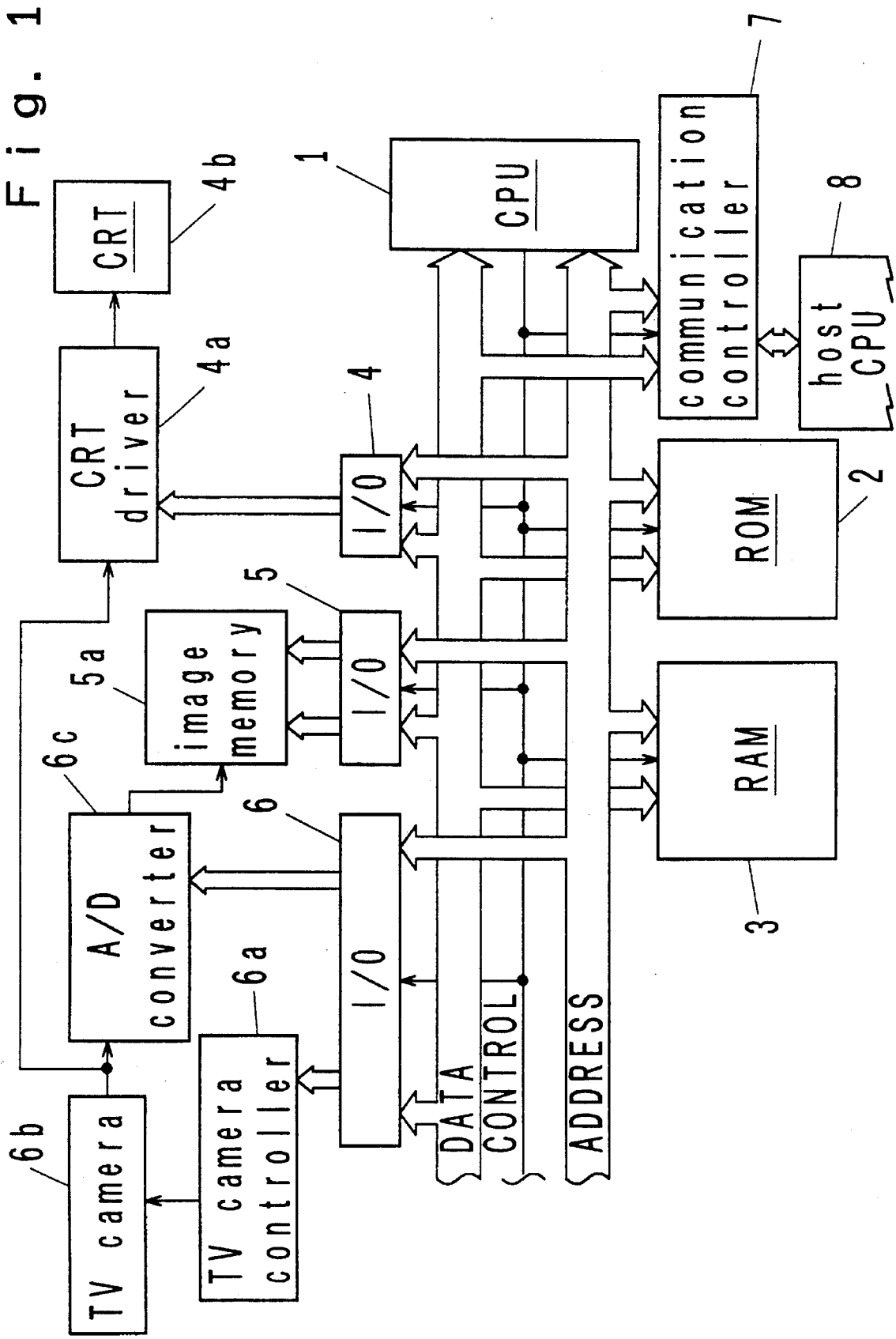
FIG. 1 is a block diagram of a system onboard a is road vehicle for detecting a white line drawn on a road surface ahead of the vehicle according to one embodiment of the invention.

An onboard system for detecting white line drawn on a road surface ahead of a vehicle constructed according to one embodiment of the invention is shown in FIG. 1. The system includes a microcomputer (CPU) 1 and buses, to which a read only memory (ROM) 2 for storing a control program, a read/write memory (RAM) 3 in which parameters are temporarily stored during their processing, and input/output ports (I/O) 4, 5, 6 having various components connected thereto are connected.

Figure 2:
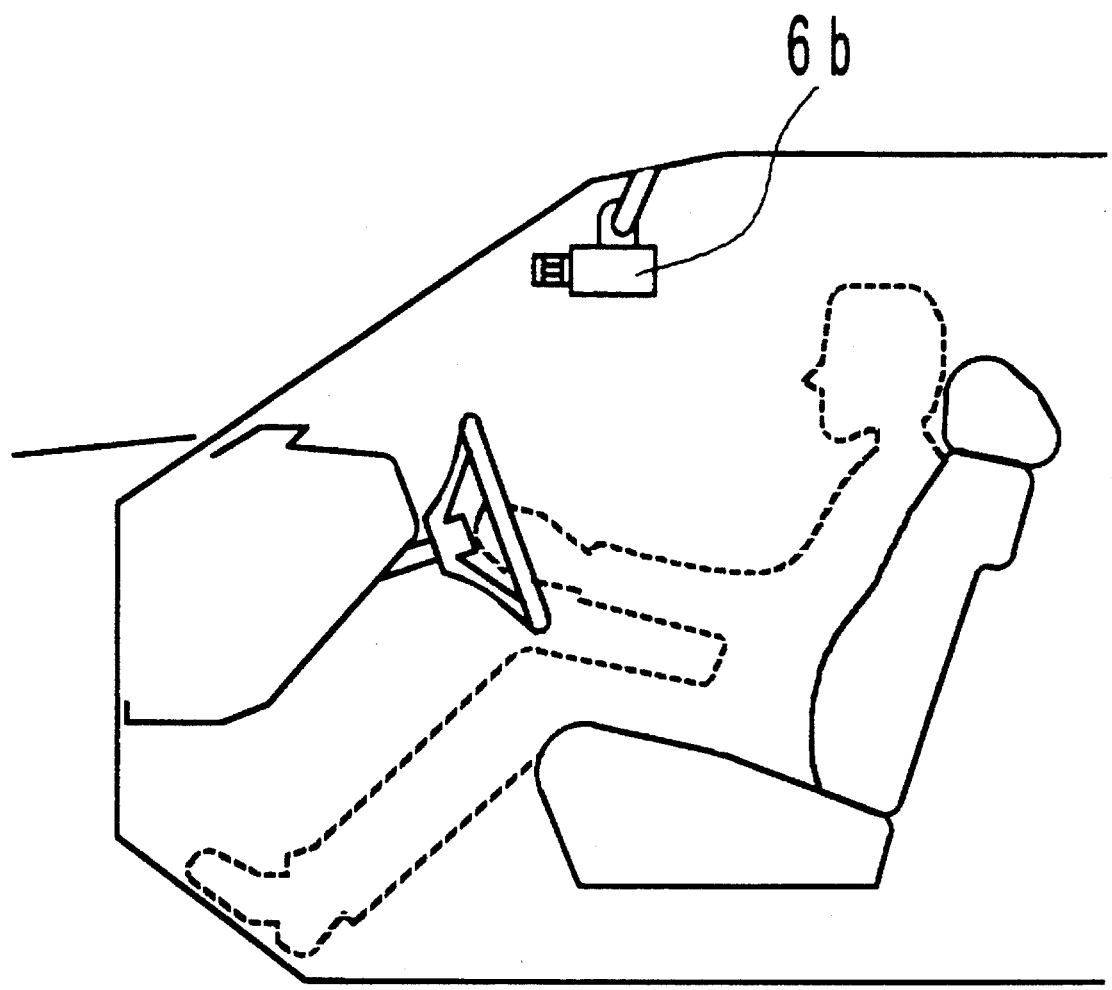
FIG. 2 is a schematic view, in side elevation, of a television camera 6b shown in FIG. 1 as located within the vehicle.

As shown in FIG. 2, a television camera 6b is mounted inside a road vehicle on the ceiling for taking a picture of a scene located ahead of the vehicle converting the scene to an analog picture signal representing brightness and comprising 512×512 picture elements per frame. The analog picture signal is fed to an A/D converter 6c and a CRT driver 4a. The converter 6c converts the analog picture signal into digital data (or gradation data) having 256 gradations (gradation 0 representing a black level and gradation 255 representing a white level), and the digital data is then supplied to an image memory 5a. The image memory 5a includes a gradation data storage area for several pages. One page represents a storage area for storing gradation data for one screen (512×512 picture elements). The image memory also includes a binary data storage area for storing several screens of bit information (binary data).

Figure 16:
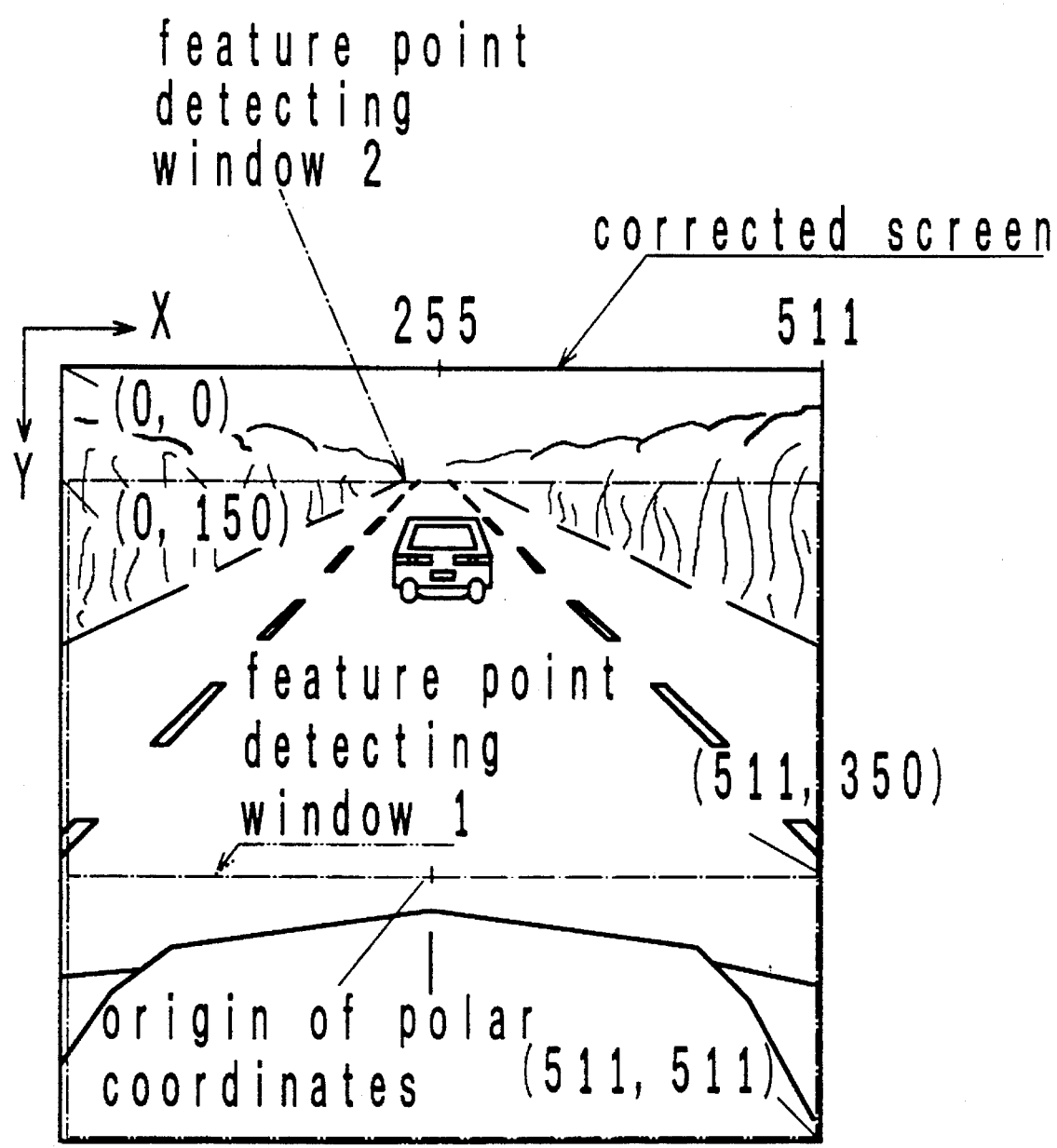
FIG. 16 is a plan view indicating an image and a window 2 on a corrected screen obtained by the "interpolation" C8 shown in FIG. 4.

CPU 1 controls the iris diaphragm of the camera 6b and the output level of the picture signal through a camera controller 6a and also controls the synchronization of the input and output operation to and from the converter 6c and the writing of data into the image memory 5a. A CRT driver 4a is effective to display on CRT 4b, which is disposed centrally on the inner panel inside the vehicle, an image (as illustrated in FIG. 16, for example) depicted by the analog picture signal fed from the camera 6b, which is synthesized with a digital image supplied under the control of CPU 1 (which may be referred as a digital output image, including, for example, lines approximating white lines located on the left and right end of a lane on which the vehicle is running and characters or numerical information indicating the distance to any vehicle running ahead of it).

Figure 3:
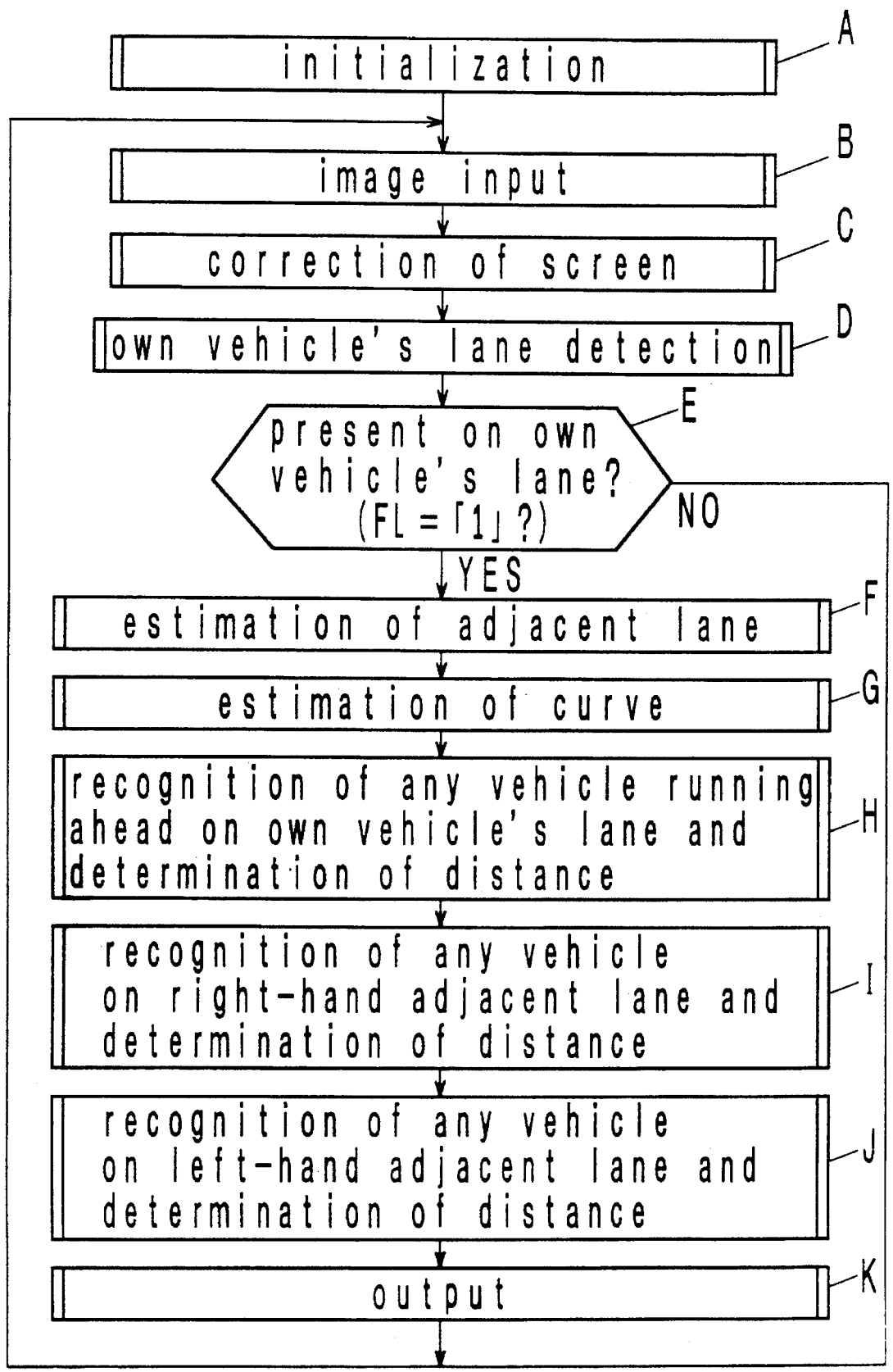
FIG. 3 is a flow chart or a main routine of a processing operation by a microprocessor (CPU) 1 shown in FIG. 1 to detect a white line drawn on a road vehicle ahead of the vehicle and the presence of any preceding vehicle, as based on image data obtained with the television camera 6b shown in FIG. 1.

FIG. 3 generally indicates the data processing operation performed by CPU 1. To summarize, upon turning on the power supply, CPU 1 initializes the input/output ports, internal registers, and internal counters (initialization A). Subsequently, one screen of the analog picture signal is digitally converted for a given time interval and is written into an input data memory area of the image memory 5a (image input B). Each time such operation takes place, CPU 1 executes "correction of screen" C, "detection of its own vehicle's lane" D and examination E to see if the lane of its own vehicle's lane has been detected. In the event that the detection of the vehicle's lane has been confirmed, the "estimation of adjacent lane" F, "estimation of curve" G, "recognition of any vehicle running ahead on the own vehicle's lane and determination of distance" H, "recognition of any vehicle on right-hand adjacent lane and determination of distance" I, "recognition of any vehicle on left-hand adjacent lane and determination of distance" J and "output" K are executed in the sequence named.

At "output" K, the CPU 1 produces lanes representing white lines indicating the both ends of the vehicle's lane, alphabetical information indicating the presence or absence of any vehicle running ahead on the vehicle's lane, a square mark which surrounds such vehicle running ahead, the distance to such vehicle, alphabetical information indicating the presence or absence of any vehicle detected on the right-hand adjacent lane, a square mark surrounding such vehicle and the distance to such vehicle, alphabetical information indicating the presence or absence of any vehicle on the left-hand adjacent lane, and a square mark surrounding such vehicle and the distance to such vehicle. All of the information above are synthesized with an image formed by the analog picture signal to update the display on CRT 4b. In addition, the CPU 1 transfers data indicative of the lines representing the white lines along the both ends of the vehicle's lane and data representing the distance to any vehicle running ahead to a host CPU 8 through a communication controller 7 (FIG. 1). The host CPU 8 utilizes such information in the automatic control of running such as a control over a distance to any preceding vehicle (including an accelerator control, an overdrive interrupt control and/or wheel brake pressure control in a manner corresponding to such distance), detection of any obstacle and an associated wheel brake pressure control, a warning against departure from the lane, lane contouring running control (including a steering control and wheel brake pressure control for each wheel) or the like. The detail of each subroutine from "correction of screen" C to "recognition of any vehicle on left-hand adjacent lane and determination of distance" J shown in FIG. 3 will be described in detail below.

C. "Correction of screen" C (FIG. 4)

Figure 4:
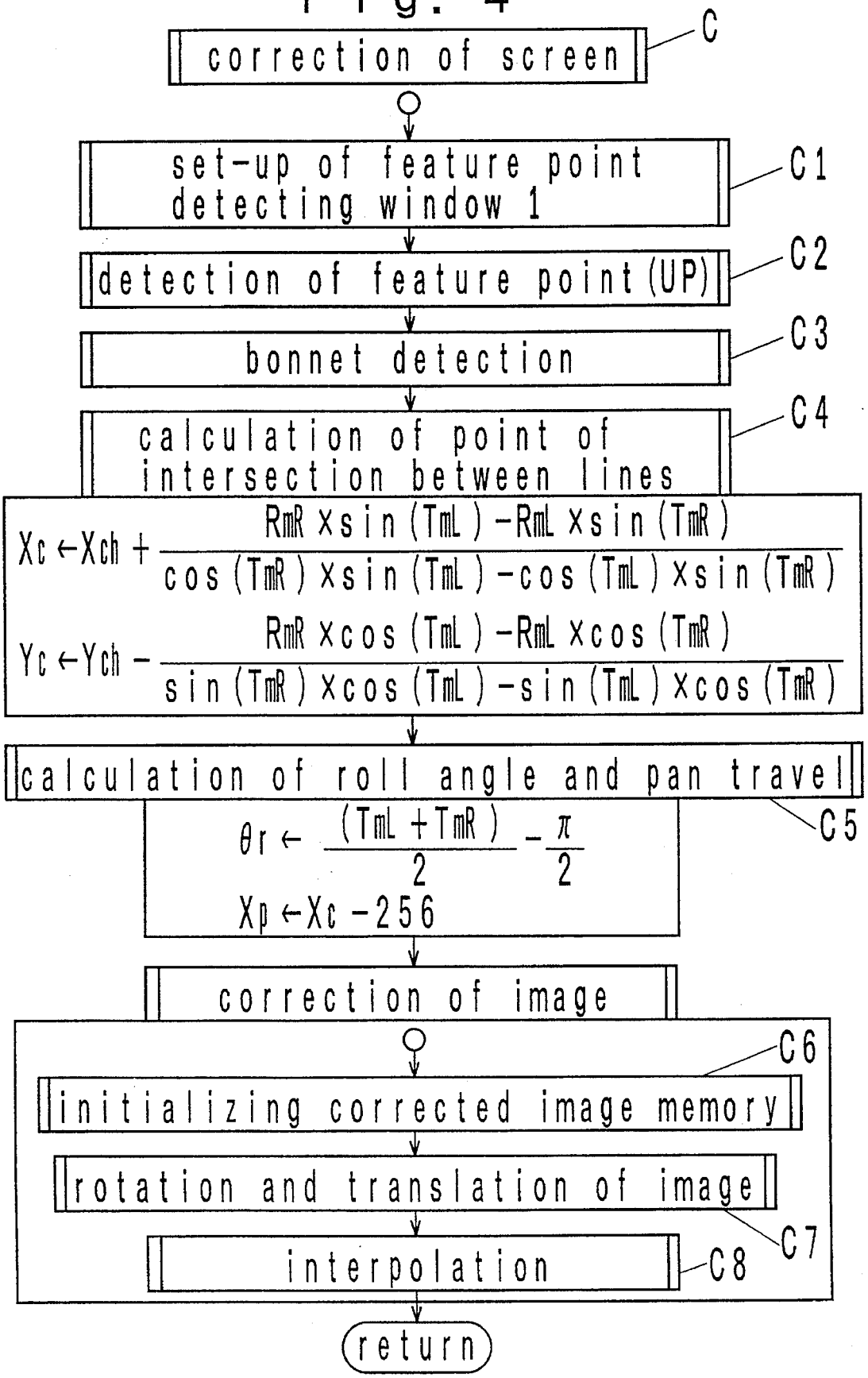
FIG. 4 is a flow chart, showing a subroutine showing the "correction of screen" C shown in FIG. 3 in detail.

This subroutine is shown in detail in FIG. 4. Initially, "set-up of feature point detecting window" C1 is executed.

C1. "Set-up of feature point detecting window 1" C1 (FIG. 5).

Figure 5A:
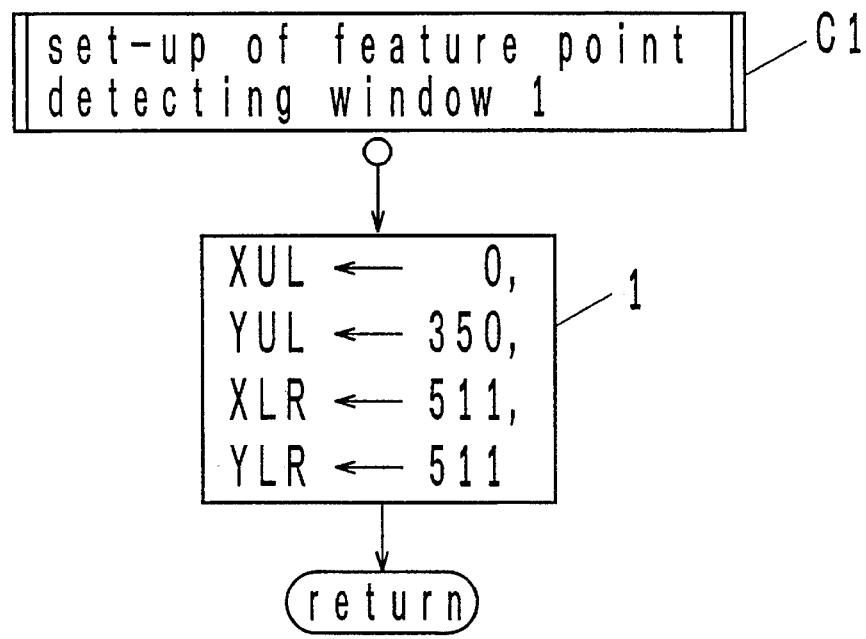
FIG. 5a is a flow chart showing "set-up of feature point detecting window 1" C1 shown in FIG. 4.
Figure 5B:
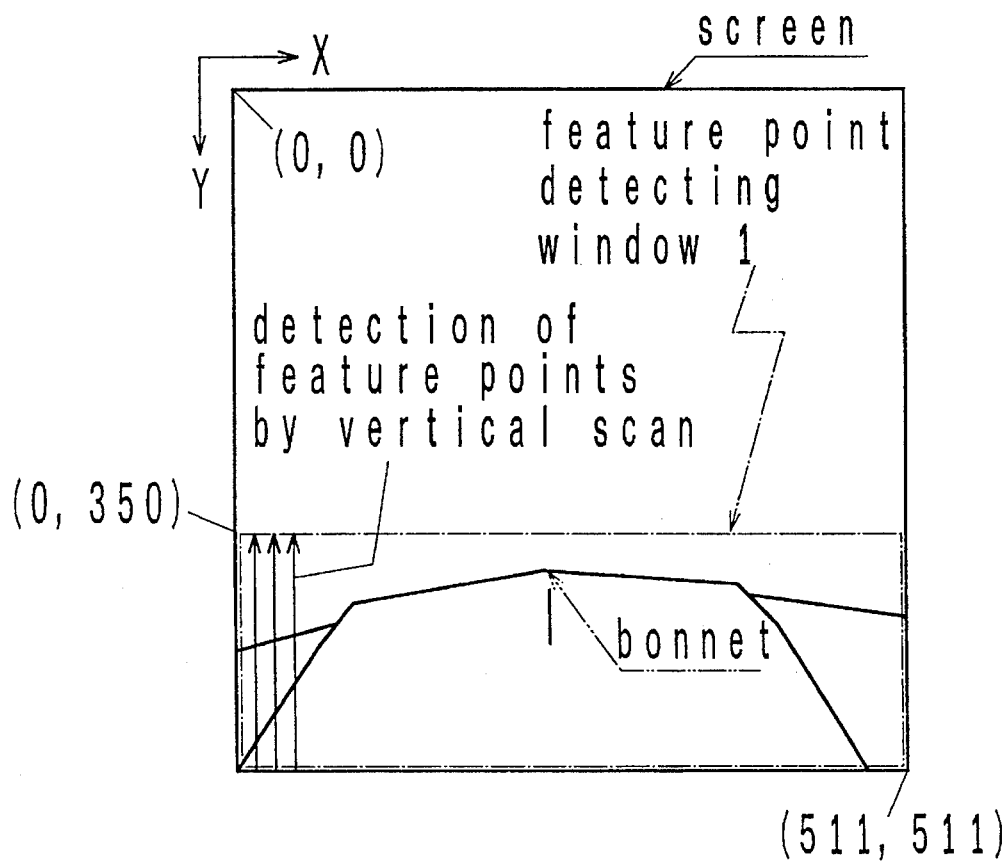
FIG. 5b is a plan view of a scene obtained with the television camera 6b shown in FIG. 1.

This operation is shown in detail in FIG. 5a. Referring to FIG. 5b, an image area is defined as having an origin (0, 0) at the upper left corner of the screen and a point (511, 511) in the lower right corner. Image data from the television camera 6b in the form of gradation data is stored in the input data memory is displayed on a portion of the image area. Also, the section of the image area having diagonal corners at point (0, 350) and another point (511, 511) is chosen as an area for detecting a feature point or a window 1. Specifically, the X coordinate "0" of the upper left corner of the region to be set up is written into a register XUL, its Y coordinate "350" into a register YUL, the X coordinate "511" of the lower right corner into a register XLR, and its Y coordinate 511 into a register YLR at step 1 shown in FIG. 5a. It is to be understood that in the following description, a value represented by data stored in such register is indicated by the notation of the register itself.

The "set-up of feature point detecting window" C1 mentioned above defines a feature point detecting window 1 as an area which is subject to a processing operation and is illustrated as a block in phantom lines in FIG. 5b. The processing of "feature point detection (UP)" C2 shown in FIG. 6a will be described next. It is to be understood that this area fully covers an edge image at the top end of the bonnet of a vehicle, as shown in FIG. 5b.

Figure 6A:
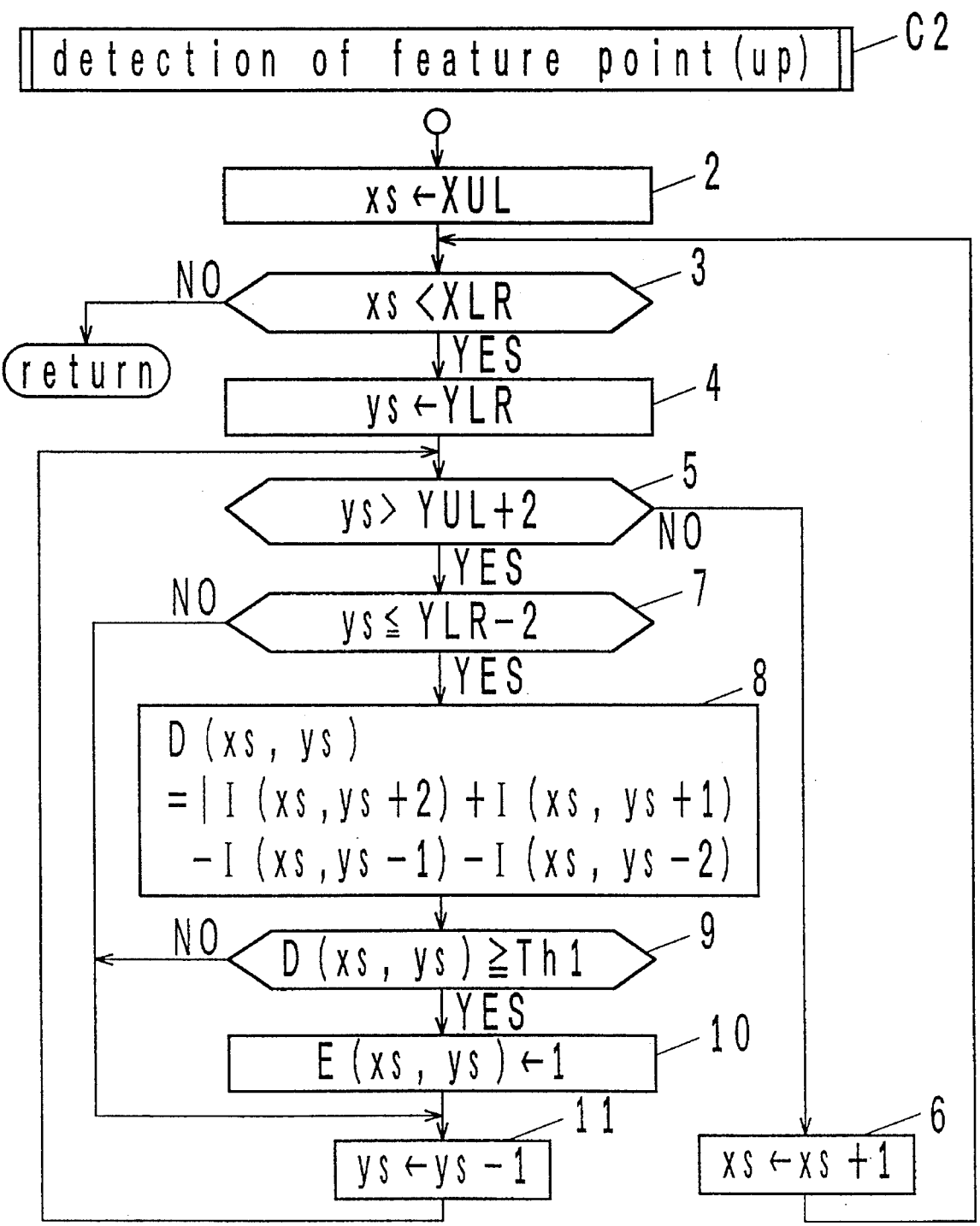
FIG. 6a is a flow chart showing "feature point detection (UP)" C2 shown in FIG. 4.

Then "feature point detection (UP)" C2 is executed. Its detail is shown in FIG. 6a.

C2. "Feature point detection (UP)" C2 (FIG. 6a)

Figure 6B:
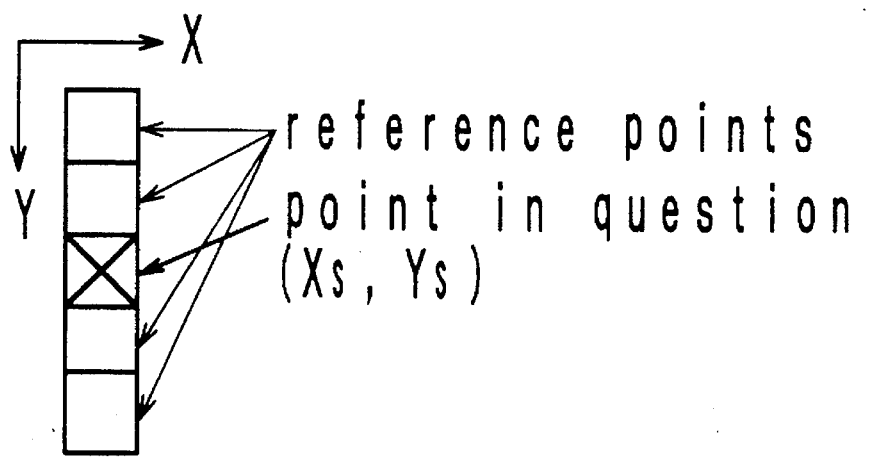
FIG. 6b is a plan view showing the relationship between a point in question marked by X, or a picture element representing a point being calculated and reference points shown by squares in white or reference picture elements, utilized when calculating a derivative of image data in the Y direction on the screen as photographed with the television camera 6b shown in FIG. 1.

Here, a scan is made in the Y direction from bottom to top, beginning with a picture element (0, 509) which is by two picture elements located upward of the lower left corner (0, 511) of the detecting window 1. The scan is sequentially performed by reducing the Y-coordinate until 350 is reached. Thus picture elements distributed the line X=0 are scanned (steps 2 to 11 in FIG. 6a). Considering a particular picture element in question (Xs, Ys), a sum of the brightness represented by the gradation data of a picture element (Xs, Ys+1) which is located by one picture element lower than the particular picture element and another picture element (Xs, Ys+2) which is located by two picture elements lower than the particular picture element is formed. Similarly, a sum of the brightness represented by the gradation data of a picture element (Xs, Ys−1) located by one picture element above the particular picture element (Xs, Ys) and another picture element (Xs, Ys−2) located by two picture elements above the particular picture element is also formed. A difference between these sums is then taken to derive an absolute magnitude thereof, which represents the absolute magnitude of a derivative of gradation in the vertical or Y direction (step 8). This is referred to as a gradation derivative D(Xs, Ys) for the particular picture element (Xs, Ys) in question. As shown in FIG. 6b, the gradation derivative D(Xs, Ys) represents the absolute magnitude of a difference between the sum of image densities of two picture elements located above the particular point (Xs, Ys) and the sum of image densities of two picture elements located below the particular point. Thus, it indicates a change of density in the vertical direction as referenced to the particular point. Accordingly, it exhibits an increased magnitude at the horizontally extending contour line for each image on the screen. It is then examined to see if the gradation derivative D(Xs, Ys) is or is not equal to or greater than a threshold value Th1 (preset value) at step 9. If the derivative is equal to or greater than Th1, "1" is written into a binary data table which is allotted to a particular area of the image memory 5a at an address E(Xs, Ys) corresponding to the particular picture element (Xs, Ys) in question (step 10). This information "1" indicates that the particular picture element represents a horizontally extending contour line of the image. After performing such scan for one line in Y direction (X=0, Y=509 to 350), the scan line is then shifted to the right (step 6), repeating a similar scan for the next line (X=1, Y=509 to 350). A similar scan is repeated until the last line (X=511, Y=509 to 350) is reached.

As a result of the described scans, the binary data table E(Xs, Ys) of the image memory 5a has stored therein, for Xs=0 to 511 and Ys=509 to 350, information indicating horizontally extending contour lines of images located within the feature point detecting window 1 (FIG. 5b). Since the detecting window 1 contains an area in which an edge image located at the top end of the bonnet is located, it follows that the binary table E(Xs, Ys) contains information indicating the edge at the top end of the bonnet. In the present embodiment, such edge is regarded as a rectilinear line, which is detected at the following "detection of bonnet" C3, which is illustrated in detail in FIG. 7.

Figure 7B:
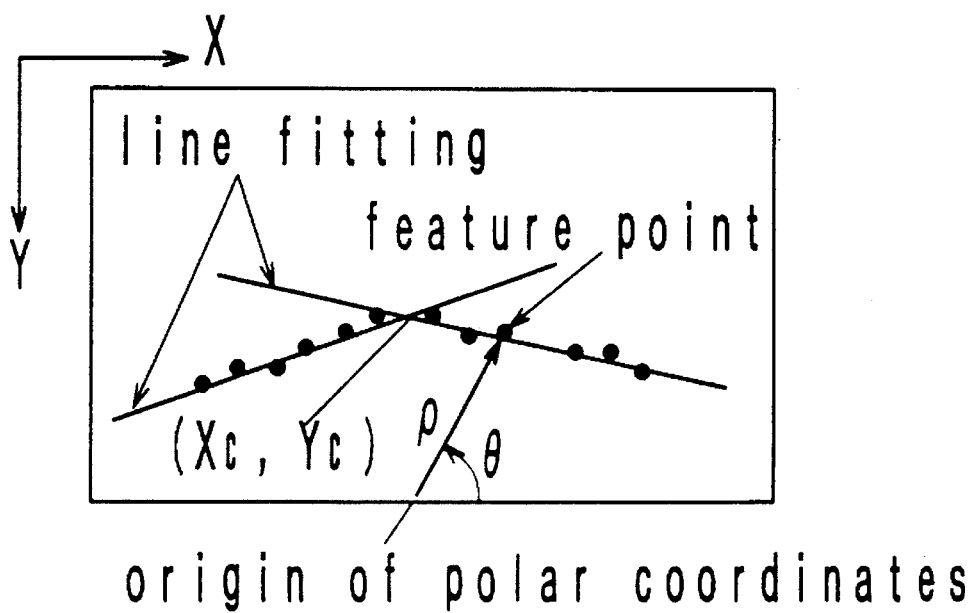
FIG. 7b is a plan view showing a feature point on the bonnet edge, the location where it is detected and a rectilinear line which approximates the bonnet edge on the screen of the television camera 6b shown in FIG. 1.
Figure 7A:
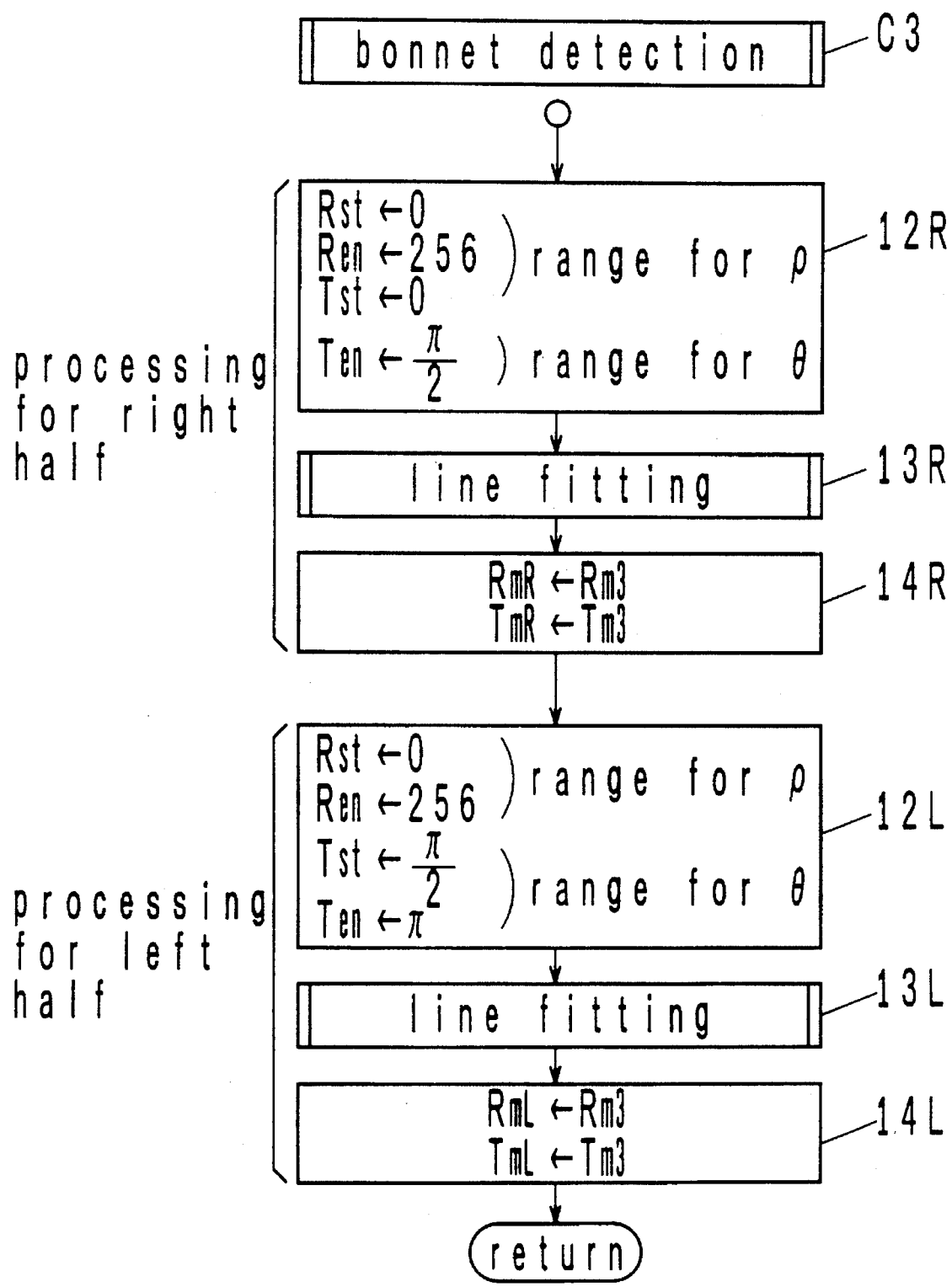
FIG. 7a is a flow chart showing "bonnet detection" C3 shown in FIG. 4.

C3. "Detection of bonnet" C3 (FIG. 7a)

To give a general summary initially, the Hough transformation mentioned above is used to detect the rectilinear line. As mentioned previously, the Hough transformation is a technique for converting information such as the binary data table E(Xs, Ys), which represents distribution of picture elements in X-Y orthogonal coordinates within the feature point detecting window 1, into the polar coordinates (ρ-θ) or $$\rho = X \cos(\theta) + Y \sin(\theta)$$

A single point (picture element) in the ),−Y coordinates is converted into a curve in the ρ-θ polar coordinates in which ρ and θ-axes also represent orthogonal coordinates. Accordingly, when several points lying on a rectilinear line in the X-Y coordinates are converted into corresponding curves in the ρ-θ coordinates, these curves intersect with each other at a point. This point of intersection may be substituted into a formula for conversion into the X-Y coordinates to derive an equation representing a rectilinear line in the X-Y coordinate system.

Thus, coordinates having information "1", representing a feature point stored in the binary table E(Xs, Ys) may be converted into the ρ-θ polar coordinates, and a point of intersection between the resulting curves in the ρ-θ polar coordinate system may be obtained and then substituted into the conversion formula into the X-Y coordinates. Thus, a rectilinear line which joins the feature points is derived. However, it is to be noted that obtaining a rectilinear line which simply joins two points is directly available in the X-Y coordinates, and there is no significance for its conversion into the ρ-θ polar coordinates. However, in practice, a bonnet contour line on the screen may be curved or toughened due to the curvature of the actual bonnet or as a result of the manner of impingement of light upon the bonnet. Consequently, obtaining a rectilinear line by simply joining two points, each having the feature point information "1" in the binary data table E(Xs, Ys), produces a gross error in approximating the bonnet contour line with a rectilinear line. It is also possible that a contour line other than that representing the bonnet may be picked up. As shown in FIGS. 5b and 16, the bonnet contour line extends over an extensive area, and accordingly there are a number of feature points "1's" in the binary data table E(Xs, Ys). This means that a number of rectilinear lines can be obtained, each of which joins two points or picture elements each having "1". However, when a particular line which slopes down to the right is chosen from the number of lines, it can be said that it provides a best approximation of the right-hand half of the bonnet contour line (FIG. 7b). Similarly, by choosing a particular line which slopes down to the left from the number of lines, it would provides a best approximation to the left-hand half of the bonnet contour line (FIG. 7b). However, if such statistical treatment is attempted in the X-Y coordinates, it will be greatly complex. By contrast, when the Hough transformation is utilized to convert the coordinates (a feature point) having the feature point information "1" in the binary data table E(Xs, Ys) into the $\rho$-$\theta$ polar coordinates, every curve representing a corresponding feature point will intersect at two points (corresponding to the right-hand and left-hand bonnet contour lines) in a concentrated manner. It is for this reason that the feature points in the binary data table E(Xs, Ys) is subject to the Hough transformation, and that the frequency of curve passage or the number of curves passing through a given point is counted for each point on the $\rho$-$\theta$ polar coordinate system. A point having a maximum count and another point having a next maximum count are chosen, and each chosen point is substituted into the conversion formula to be converted into the X-Y coordinates, thereby obtaining equations representing rectilinear lines which stand for the right- and left-hand half of the bonnet contour line. In this manner, the bonnet edge contour line is detected by utilizing the Hough transformation and the count of curve passage through etch point on the $\rho$-$\theta$ polar coordinate system.

However, it will be recognized that if it is attempted to count the number of curve passage through each point on the $\rho$-$\theta$ polar coordinate system over a region corresponding to the size of the binary data table E(Xs, Ys), the resulting processing operation will be voluminous, requiring an increased length of time therefor. Accordingly, in the present embodiment, a laterally median point at the lowermost end of the binary data table E(Xs, Ys), namely, X=255 and Y=511 is chosen as the origin (0, 0) of the $\rho$-$\theta$ polar coordinate system. In addition, the binary data table E(Xs, Ys) is divided into left and right halves. A first Hough transformation is applied to the right half to convert the feature points in the binary data table E(Xs, Ys) into the $\rho$-$\theta$ polar coordinates at a lower density or with a rough sampling pitch, and then the frequency of the curve passage through each of the polar coordinates is counted, and then a point having the maximum number of curve passage is determined as a first predicted point. In a second Hough transformation, a $\rho$-$\theta$ region of a reduced extent which is centered about the first predicted point is chosen, and the feature points in the binary data table E(Xs, Ys) are converted into the $\rho$-$\theta$ polar coordinates with an intermediate density corresponding to the size of the region. The number of curve passage through each point in this $\rho$-$\theta$ polar coordinate space is counted, and a particular point having the maximum number of curve passage is determined as a second predicted point. In a third Hough transformation, a $\rho$-$\theta$ region of a further reduced extent which is centered about the second predicted point is chosen, and the feature points in the binary data table E(Xs, Ys) are converted into the $\rho$-$\theta$ polar coordinates at a higher density corresponding to the size of this $\rho$-$\theta$ region. The number of curve passages through each point in this $\rho$-$\theta$ polar coordinate space is counted, and a point having a maximum number of carve passages is determined as a third predicted point. A rectilinear line which is represented by the third predicted point is determined as representing the right half of the bonnet edge contour line (steps 12R to 14R in FIG. 7a). A first, a second and a third Hough transformation are similarly applied to the left half of the binary data table E(Xs, Ys) to similarly determine a rectilinear line representing the left half of the bonnet edge contour line (steps 12L to 14L shown in FIG. 7a).

Referring to FIG. 7a, "detection of bonnet" C3 will be described in detail. Initially, parameters used for detecting a rectilinear line which approximate the right half of the bonnet edge contour line are chosen (step 12R). A point (Rm3, Tm3) which corresponds to the approximate line is detected (step 13R). Rm3 and Tm3 are $\rho$ and $\theta$ values in the $\rho$-$\theta$ polar coordinate system. The coordinates of this point are stored in registers RmR, TmR, respectively (step 14R). A similar operation is repeated in order to detect a rectilinear line which approximates the left half of the bonnet edge contour line (steps 12L to 14L). The detail of "line fitting" 13R, 13L which detects a rectilinear line through the Hough transformation is similar to the detail of "line fitting" 63R shown in FIGS. 17 to 21, and therefore will not be specifically described here. It is sufficient to note for the moment that the "line fitting" 13R is directed to the detection of a rectilinear line for the right half of the window 1 while the "line fitting" 63R is directed to the detection of a rectilinear line which approximates the image of a white line drawn on a road in the right half of a feature point detecting window 2 (FIG. 16) procedures. Accordingly, in the "line fitting" 13L, the an X-Y coordinate region being dealt with is different from that of the "line fitting" 63R. In other respects, the procedure is similar.

The rectilinear lines obtained by the "line fitting" 13R and 13L are those reflected by the points (RmR, TmR) and (RmL, TmL) in the polar coordinates, as follows and as shown in FIG. 7b.

$RmR = X \cos(TmR) + Y \sin(TmR)$ $RmL = X \cos(TmL) + Y \sin(TmL)$

C4. "Calculation of point of intersection between the lines" C4

Returning to FIG. 4, it will be seen that upon completion of the "detection of bonnet" C3, the CPU 1 calculates a point of intersection (Xc, Yc) between these rectilinear lines as indicated in a block shown next to the C4 block. In this block, Xch represents a median position (Xch=255) in the X direction of a region of the binary data table E(Xs, Ys), Ych represents a lowermost position (Ych=509), and a point (Xch, Ych) is the origin of the polar coordinates as chosen during the detection of the rectilinear lines.

C5. "Calculation of roll angle and pan travel" C5 (FIGS. 8a and 8b).

A roll angle refers to an angle $\theta r$ formed between the Y axis of the screen and a bisector of the detected two rectilinear lines mentioned above (or the longitudinal axis of the vehicle). The roll angle is equal to an angle formed between the centerline of the field of sight of the television camera 6b and the longitudinal axis of the vehicle when they are projected onto a horizontal plane, or an offset angle in the roll direction of the centerline of the field of sight of the television camera 6b with respect to the longitudinal axis of the vehicle. A pan travel Xp is a lateral offset of the center edge of the bonnet (or the point of intersection of the two rectilinear is lines mentioned above) with respect to a longitudinal axis which laterally bisects the screen. When calculating a distance from the one's own vehicle to any vehicle running ahead thereof, there is a high probability that a vehicle or object which is offset from the running direction of one's own vehicle will be erroneously recognized as a vehicle in one's own vehicle's lane when the roll angle θr or the pan travel Xp has an increased value. In order to reduce such probability or likelihood, the camera 6b may be mounted at an angle so that both the roll angle θr and the pan travel Xp be reduced to zero, but such adjustment is difficult to achieve and is troublesome. The presence of a certain amount of roll angle θr and pan travel Xp is unavoidable. Accordingly, in the present embodiment, the "correction of screen" C adjusts the roll angle θr and the pan travel Xp on the screen to zero. To determine the required adjustment, the processing operations mentioned under the paragraphs C1 to C4 are performed, and in addition, the "calculation of roll angle and the pan travel" C5 is performed. The equations to calculate the roll angle θr and the pan travel Xp are indicated in a block which is shown next to the block C5 in FIG. 4. The calculated roll angle θr is stored in a roll angle register θr, and the calculated pan travel Xp is stored in a pan travel register Xp.

C6 to C8. "Correction of image" C6 to C8 (FIG. 4)

The "correction of image" including "initialization of corrected image memory" C6, "rotation and translation of image" C7 and "interpolation" C8 is operative to convert the address (x, y shown in FIG. 8b) of the gradation data of each picture element in the input data memory of the image memory 5a into an address which will be assumed after a rotation and a translation corresponding to the roll angle θr and the pan travel Xp (or an address x', y' shown in FIG. 8b required to display the photographed image with θr=0 and Xp=0). Then the "correction of image" writes the address into a corrected image memory (storage area of the image memory 5a to store gradation data for one screen) corresponding to the input data memory (C6, C7).

Figure 9:
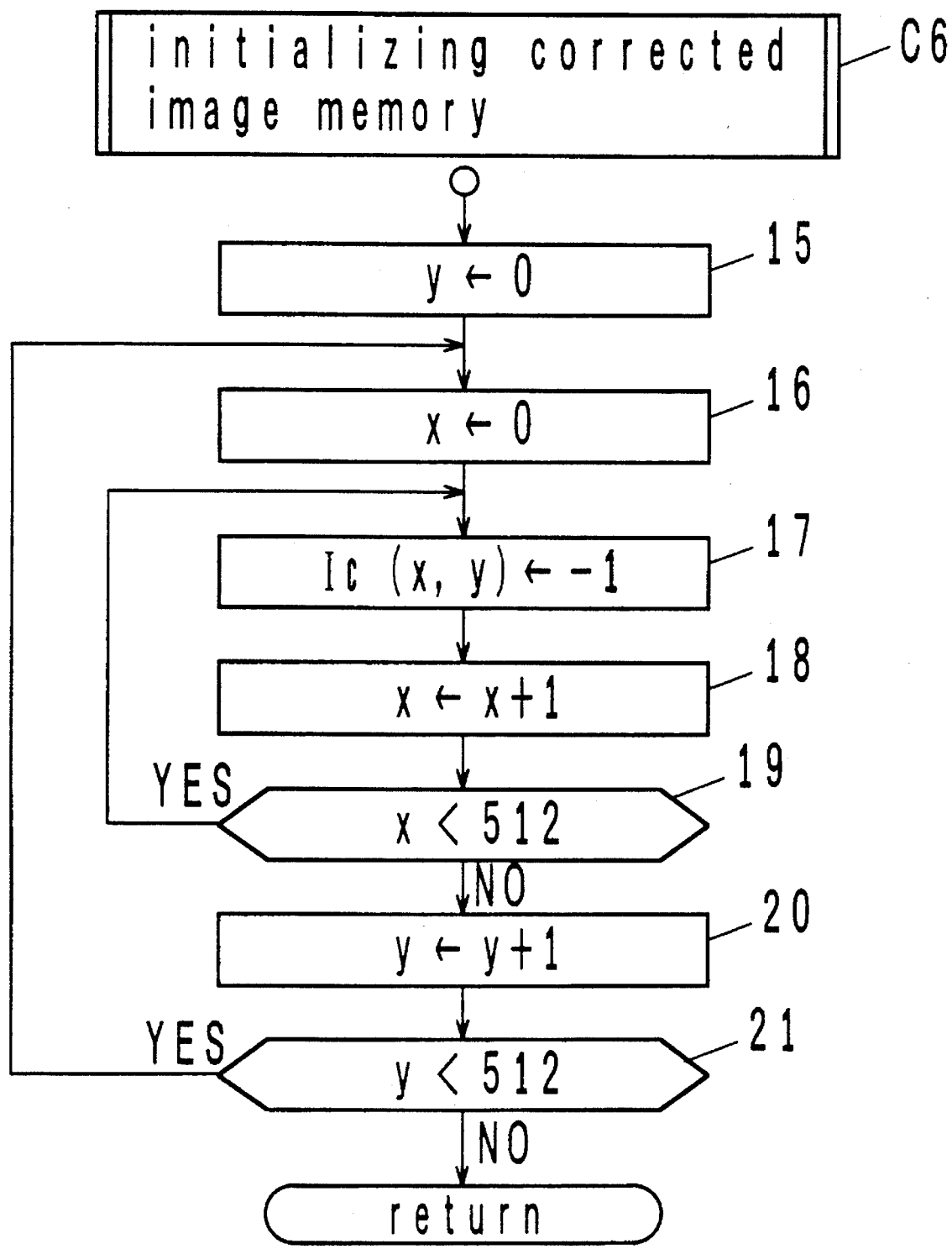
FIG. 9 is a flow chart showing "corrected image memory initialization" C6 shown in FIG. 4.

C6. "Initialization of corrected image memory" C6 (FIG. 9)

When such rotation and translation take place, there occurs some picture elements for which there is no gradation data on the corrected screen. In order to enable a later recognition of such picture elements, data representing "−1", which do not exist in the image data (gradation data) as photographed, is written into the corrected image memory at all addresses during the "initialization of corrected image memory" C6. The detail of this operation is illustrated in FIG. 9.

C7. "Rotation and translation of image" C7 (FIG. 10)

Figure 10:
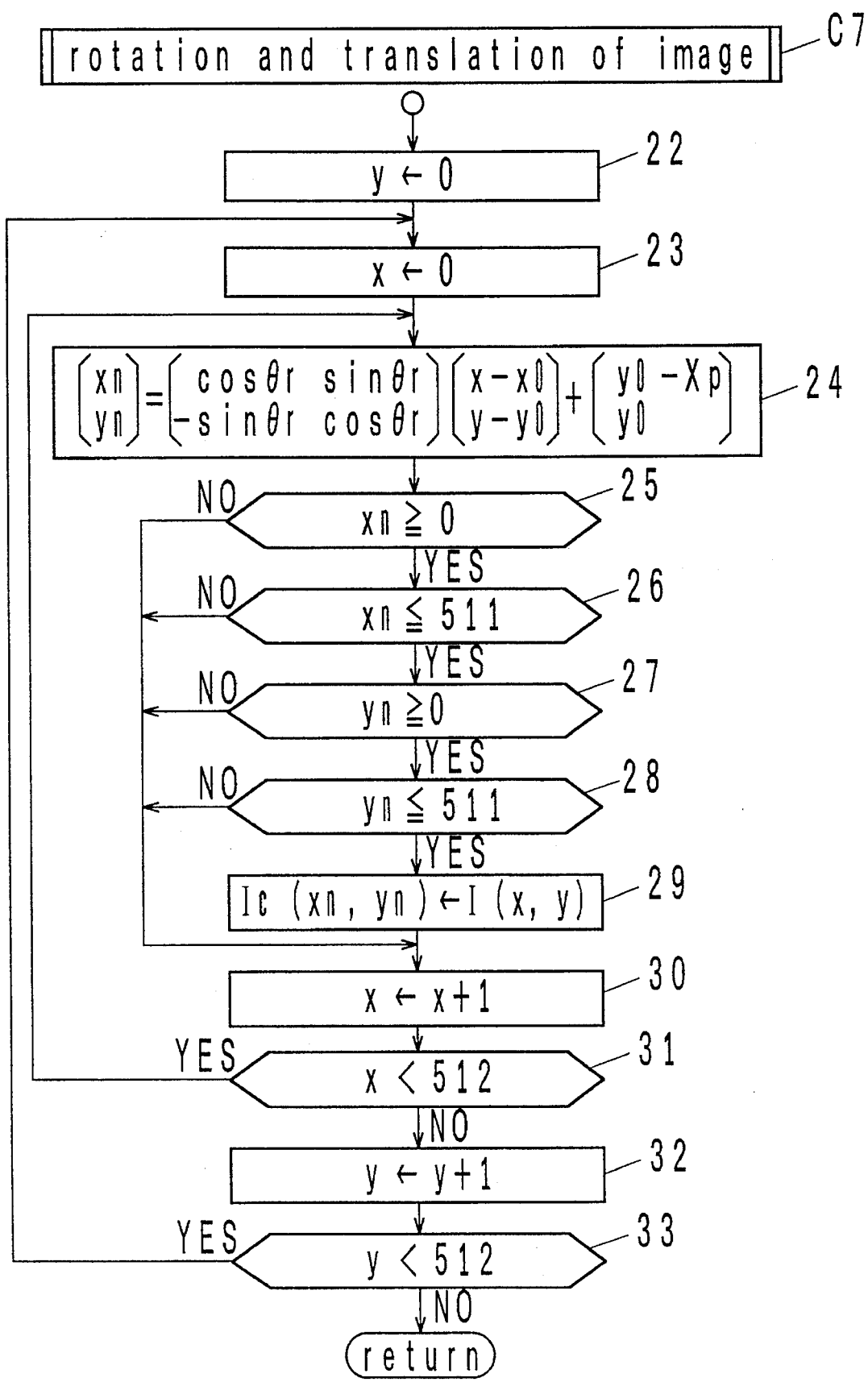
FIG. 10 is a flow chart showing "rotation and translation of image" C7 shown in FIG. 4 in detail.

The detail of this processing is illustrated in FIG. 10 where each of the addresses (x, y) (for x=0 to 511 and y=0 to 511) of the input data memory is converted into a corresponding address (x', y') (for x'=0 to 511 and y'=0 to 511) in a screen coordinate system in which a picture taken is displayed with θr=0 and Xp=0 (or corrected image memory) (at steps 22 to 28 and steps 30 to 33). Then, the gradation data in the input data memory at an address (x, y) is written into the corrected image memory at an address (x', y') (step 29). When the gradation data in the corrected image memory is displayed on CRT 4b, an image will be displayed as shown in FIG. 16 in which both the roll angle θr and the pan travel Xp, which appeared in FIG. 8a, are substantially null. However, as a result of such "rotation and translation of image", there occurs addresses in the corrected image memory where no gradation data is present (or empty picture elements), as mentioned previously, and data indicating "−1" is left in these picture elements as a result of the "initialization of corrected image memory" C6.

Figure 11A:
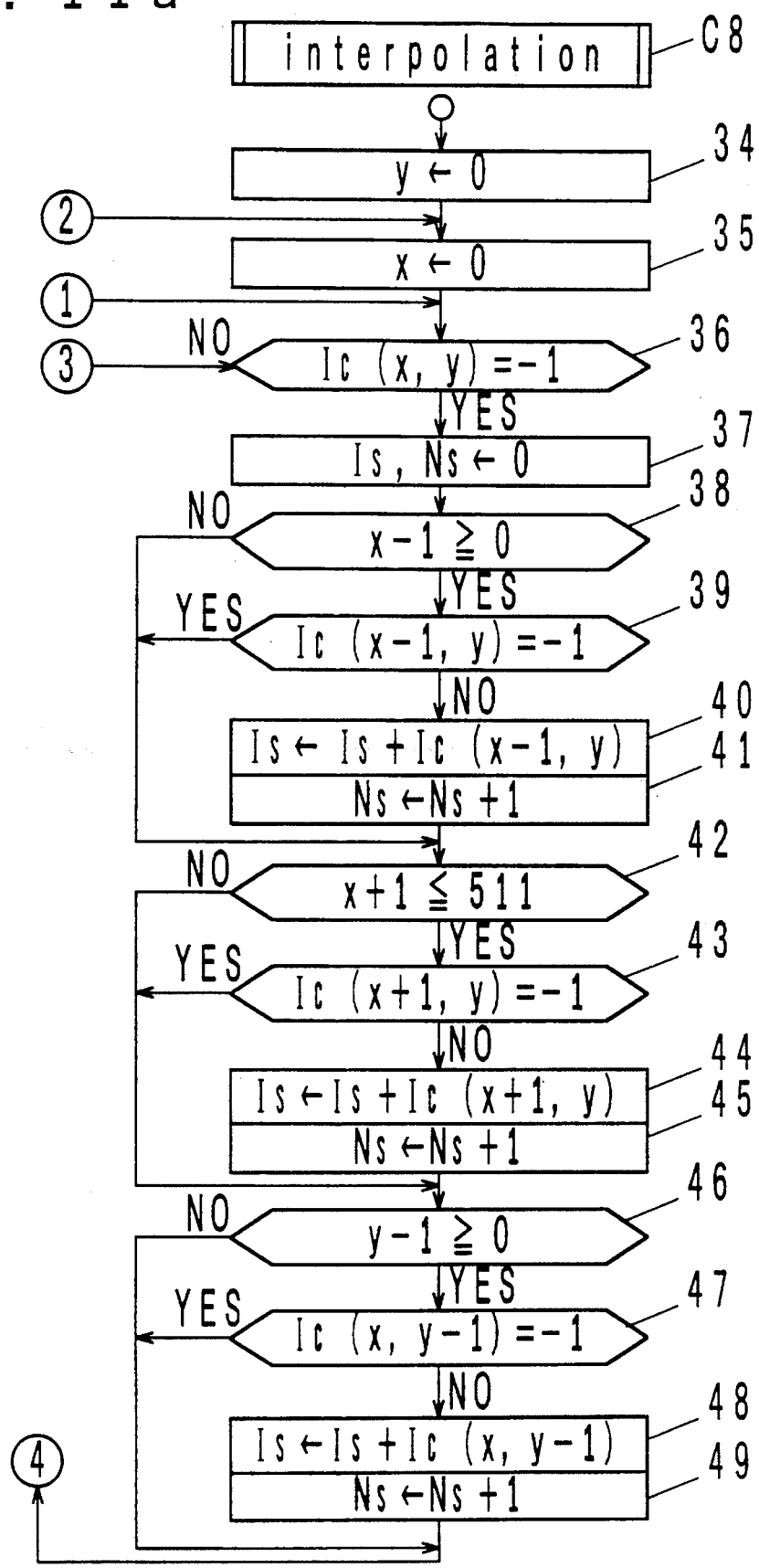
FIG. 11a is a flow chart showing part of "interpolation" C8 shown in FIG. 4 in detail.
Figure 11B:
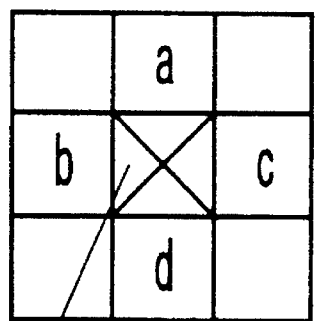
FIG. 11b is a plan view showing a picture element being processed (marked by X) and reference picture elements a to c which are used in the "interpolation" C8 shown in FIG. 4.
Figure 12:
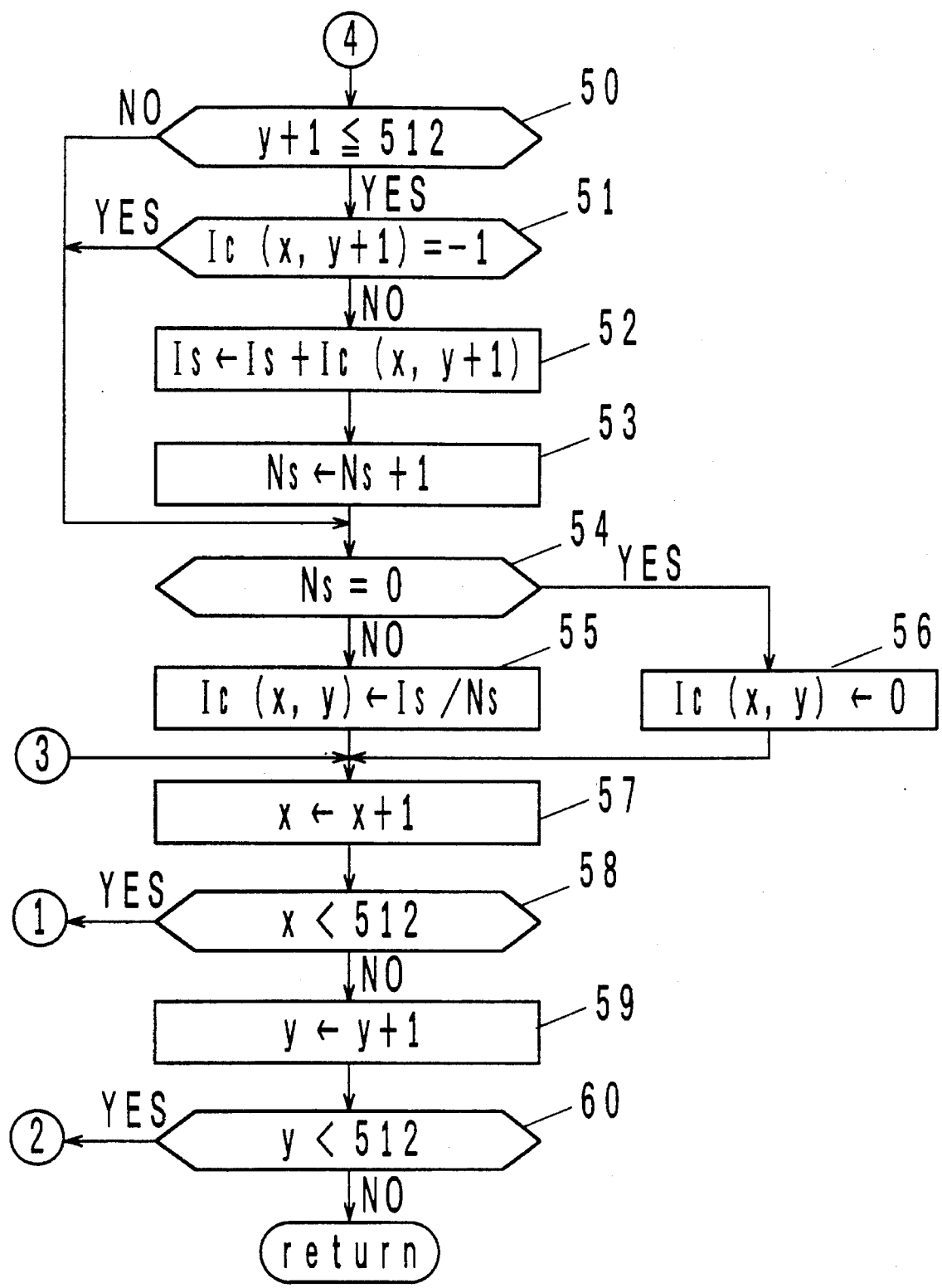
FIG. 12 is a flow chart showing the remainder of the "interpolation" C8 shown in FIG. 4 in detail.

C8. "Interpolation" C8 (FIGS. 11a and 12)

In the "interpolation" C8, a mean value of gradation data of four picture elements which surround a particular picture element for which there is no gradation data is allocated to such particular picture element. When any one of the surrounding four picture elements is or are empty picture elements, such allocation does not take place. The detail of the "interpolation" C8 is shown in FIGS. 11a and 12. Specifically, an address (picture element) in the corrected image memory is sequentially is specified, and it is examined if it represents an empty picture element where the memory data contains "−1" (step 36). If the picture element in question is found to be an empty picture element, an examination is made to see if a picture element b which is adjacent to the left thereof, a picture element c which is adjacent to the right thereof, a picture element a located above it, and a picture element d which is located below it contain gradation data. If any one of these four picture elements happens to be an empty picture element, the processing of the picture element in question is then completed, the empty picture element is left intact, and the picture element in question is shifted to the next (steps 39–42, steps 42 to 46, steps 46 to 50 and steps 50 to 54). If the examination reveals that each of the four picture elements contains gradation data, such data is added to the content of an accumulation register Is, the resulting sum is stored in the accumulation register is to update it (steps 40, 44, 48 and S2), and a count register Ns is incremented by one (steps 41, 45, 49 and 53). If such operation is completed with all of the four picture elements, a mean value Ic(x, y) of the gradation data of these picture elements is calculated, and stored into the picture element in question (steps 54 and 55).

This completes the "correction of screen" C (FIG. 3), and CPU 1 then executes "own vehicle's lane detection" D.

D. "Own vehicle's lane detection" D (FIG. 13)

Figure 13:
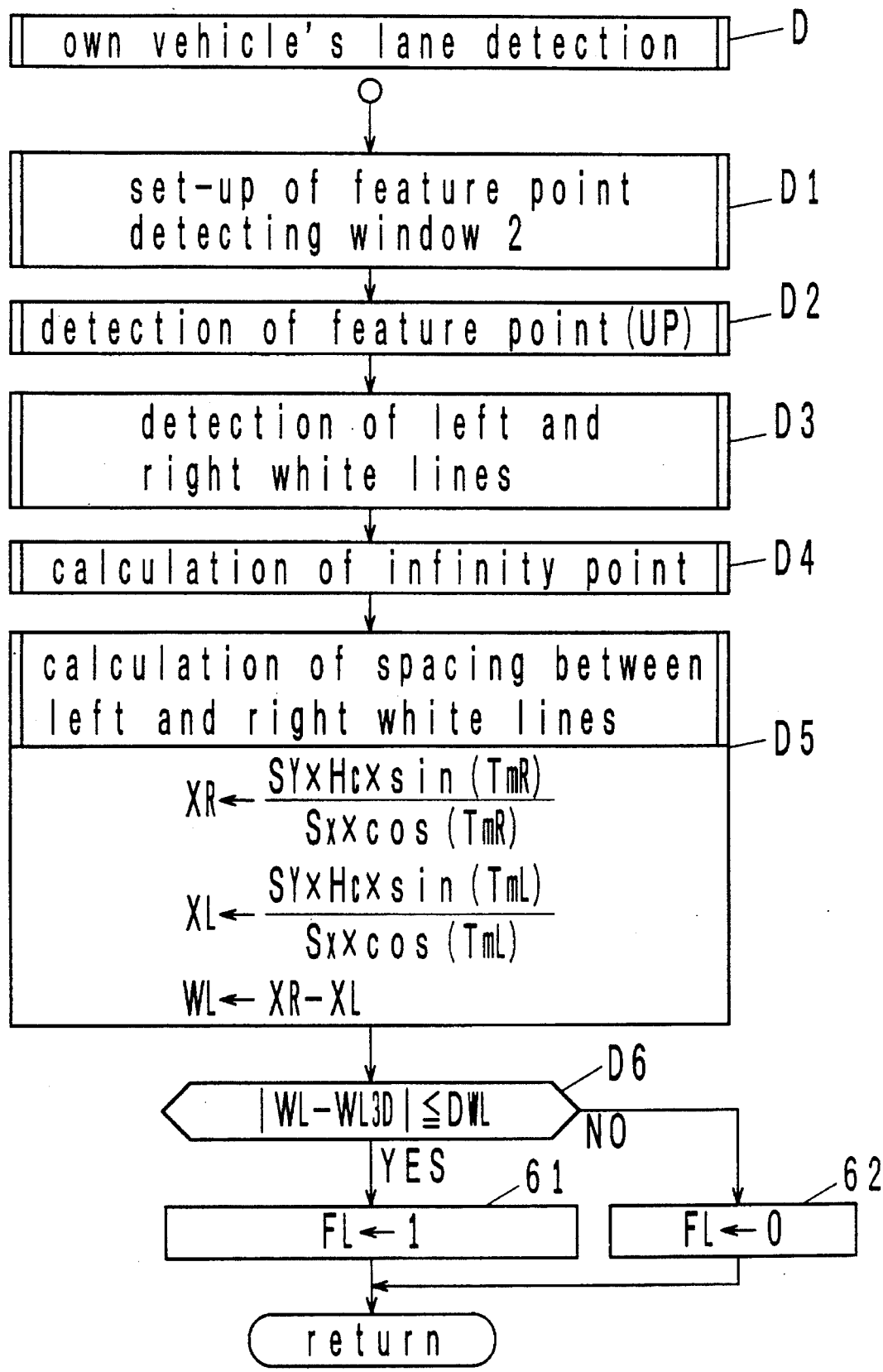
FIG. 13 is a flow chart of a subroutine "detection of own vehicle's lane" D shown in FIG. 3 in detail.

The detail of this processing is shown in FIG. 13. Initially, "set-up of feature point detecting window 2" D1 is executed.

Figure 14A:
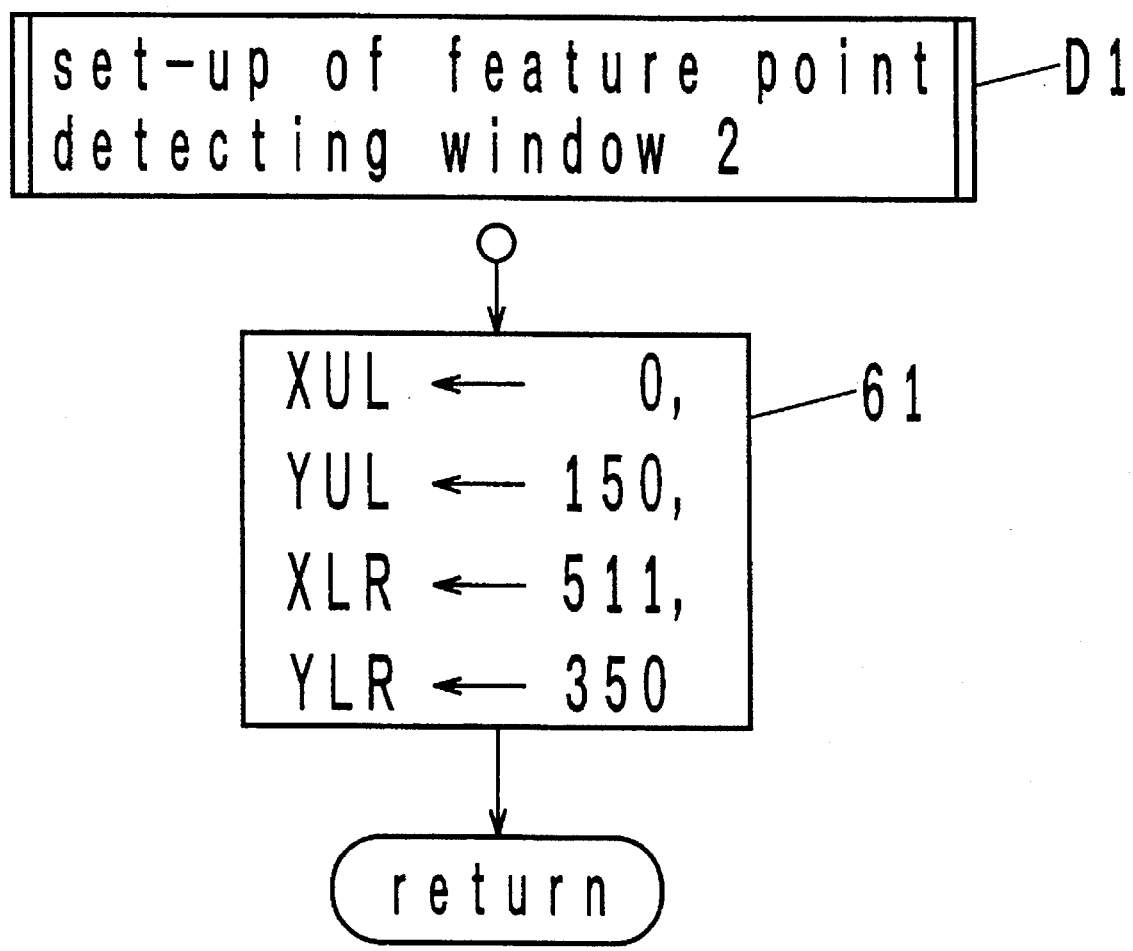
FIG. 14a is a flow chart showing "set-up of feature point detecting window 2" D1 shown in FIG. 13 in detail.

D1. "Set-up of feature point detecting window 2" D1 FIG. 14a)

Figure 14B:
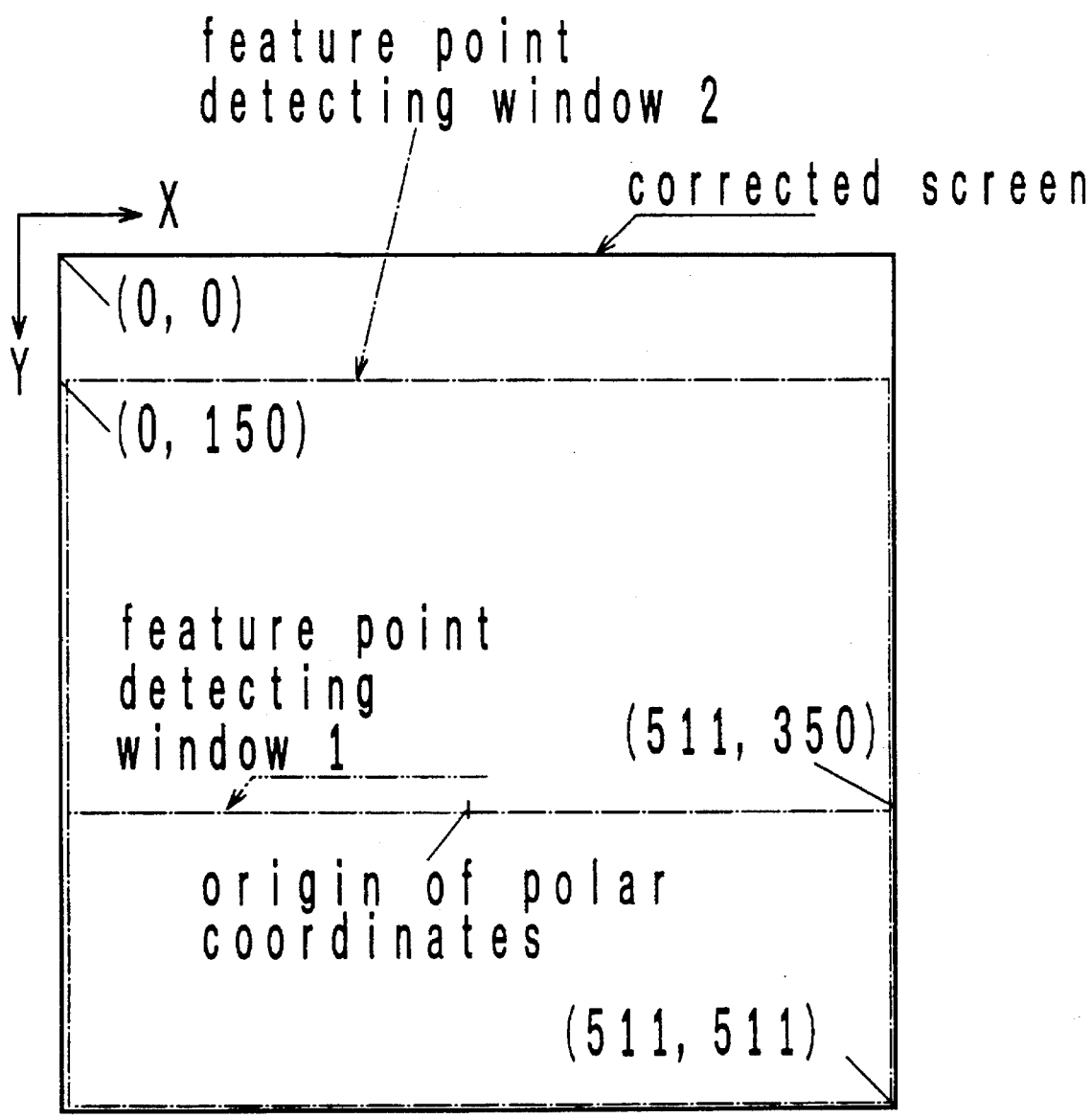
FIG. 14b is a plan view indicating a region of a window 2 which is to be established on a corrected screen obtained by the "interpolation" C8 shown in FIG. 4.

This processing is similar to the "set-up of feature point detecting window 1" C1 (FIG. 5a) mentioned above, but the window 2 has a size and a position, both of which are different from those of the window 1. In addition, the memory to which the window 2 is applied is the corrected image memory. As shown in FIGS. 14b and 16, the window 2 is located on top of the window 1.

D2. "Detection of feature point (UP)" D2

When the window 2 is set up, feature points located within the window 2 in the corrected image memory are detected. The detection takes place in the similar manner as in the "detection of feature points (UP)" C2, and data "1" representing a feature point is also written into the binary data table E(Xs, Ys) in the "detection of feature points (UP)" D2. The difference lies in that the region being detected is within the window 2 and that the data being processed are data in the corrected image memory.

Figure 15:
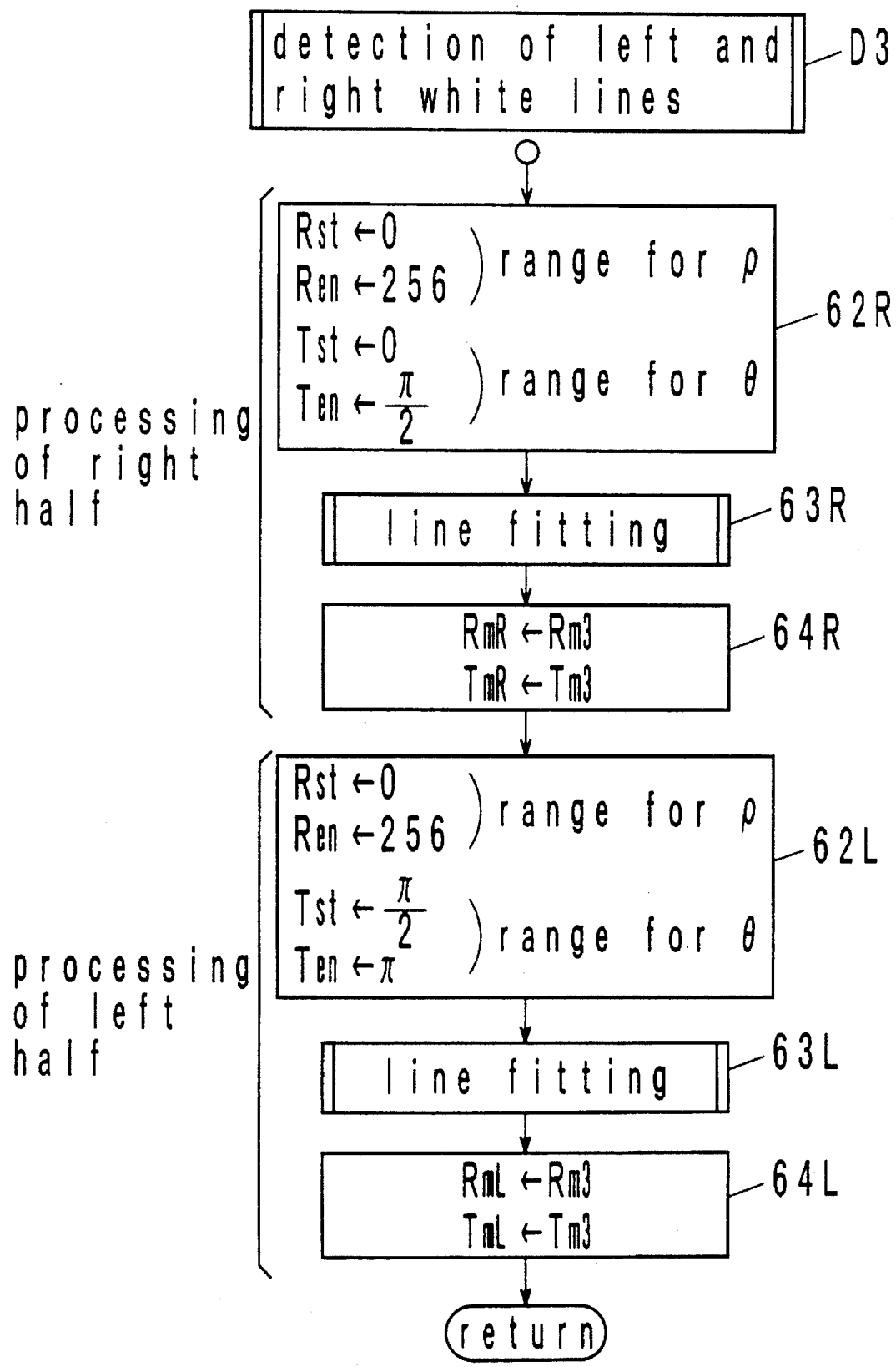
FIG. 15 is a flow chart showing "lateral white line detection" D3 shown in FIG. 13 in detail.

D3. "Detection of left and right white lines" D3 (FIG. 15)

Here, a process similar to that used in the is "detection of bonnet" C3 is utilized to detect rectilinear lines which approximate white lines located at the right and the left end of the one's own vehicle's lane. However, because the window 2 has a size and a location which are different from those of the window 1, the origin of the polar coordinates is distinct (FIG. 16)(i.e. the origin of the polar coordinates is (255,350)). Because the detailed description of the "line fitting" 13R, 13L has been omitted in the description of the "detection of bonnet" C3, the "line fitting" 63R will be described in detail here.

63R. "Line fitting" 63R (FIGS. 17 and 18)

Figure 17:
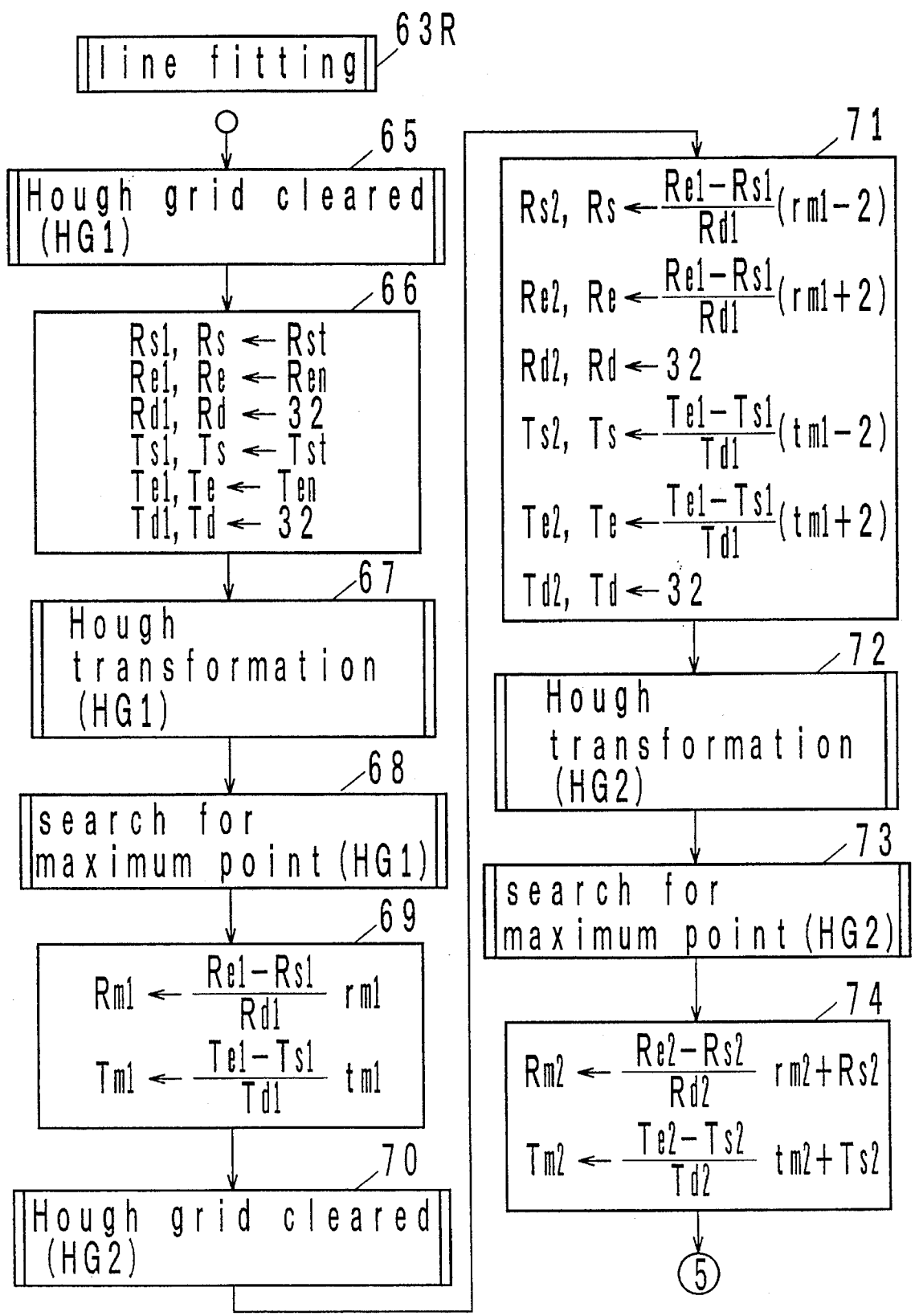
FIG. 17 is a flow chart of part of "line fitting" 63R shown in FIG. 15 in detail.
Figure 18:
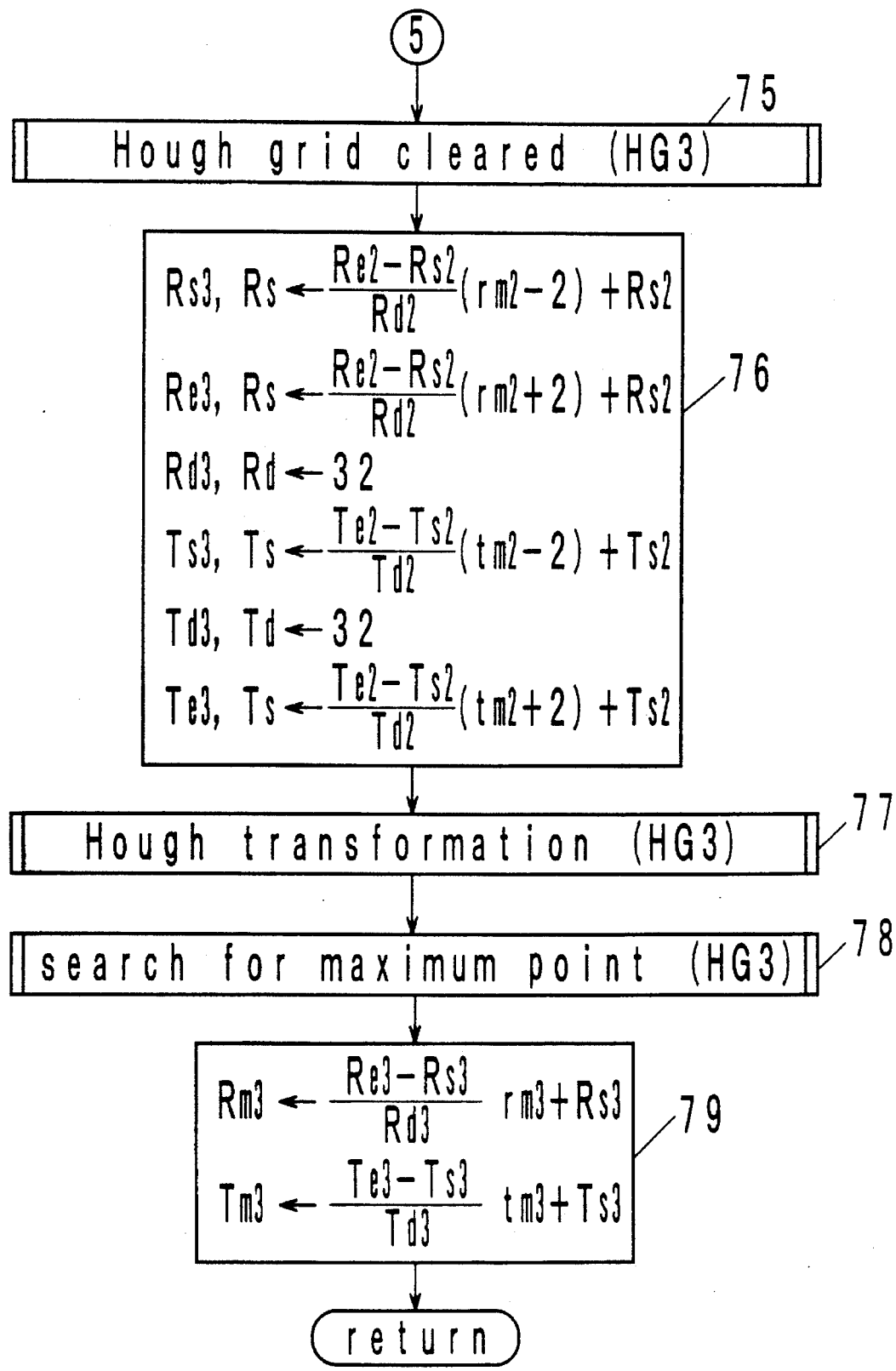
FIG. 18 is a flow chart of the remainder of "line fitting" 63R shown in FIG. 15 in detail.
Figure 19:
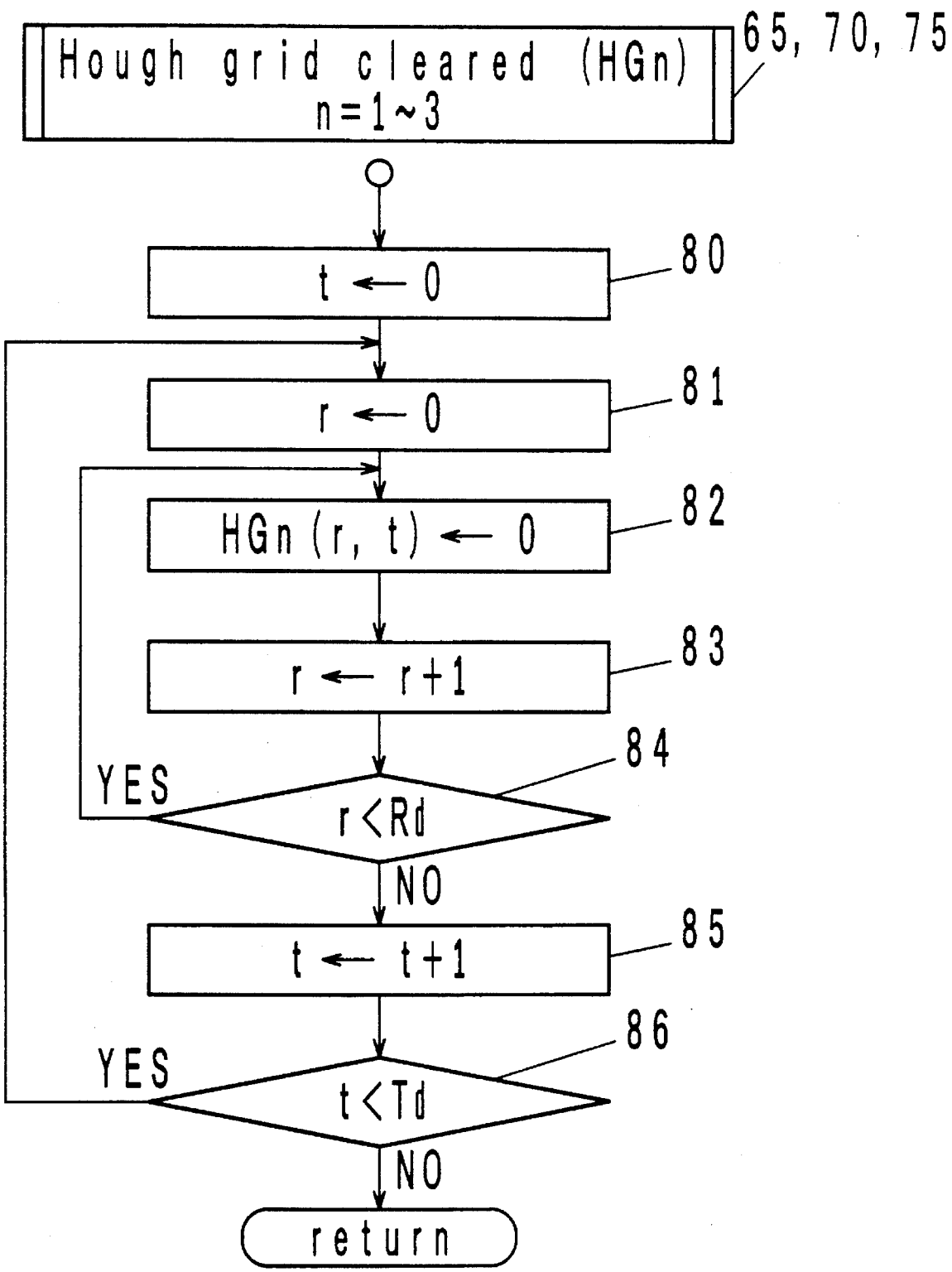
FIG. 19 is a flow chart showing in general terms "Hough grid cleared (HG1)" 65, "Hough grid cleared (HG2)" 70 and "Hough grid cleared (HG3)" 75 shown in FIGS. 17 and 18 in detail, n appearing in FIG. 19 being either one of 1, 2 or 3.

The detail of the "line fitting" is shown in FIGS. 17 and 18. Initially, it is to be noted that the "line fitting" 63R is applied to the right half of the window 2. Initially, feature points on the binary data table E(Xs, Ys) are converted into the ρ-θ polar coordinates, and the number of curve passages through each point (r, t) on the polar coordinate system is counted and written into an area, referred to as data table HGn(r, t), of the image memory 5a. Initially when n=1, any data in this table is cleared (step 65 in FIG. 17, the detail of which is shown in FIG. 19). Parameters (region subject to transformation and the density) of the Hough transformation are set up (step 66 in FIG. 17), allowing a first Hough transformation (HGI) to be performed (step 67 in FIG. 17, the detail is shown in FIG. 20).

Figure 20:
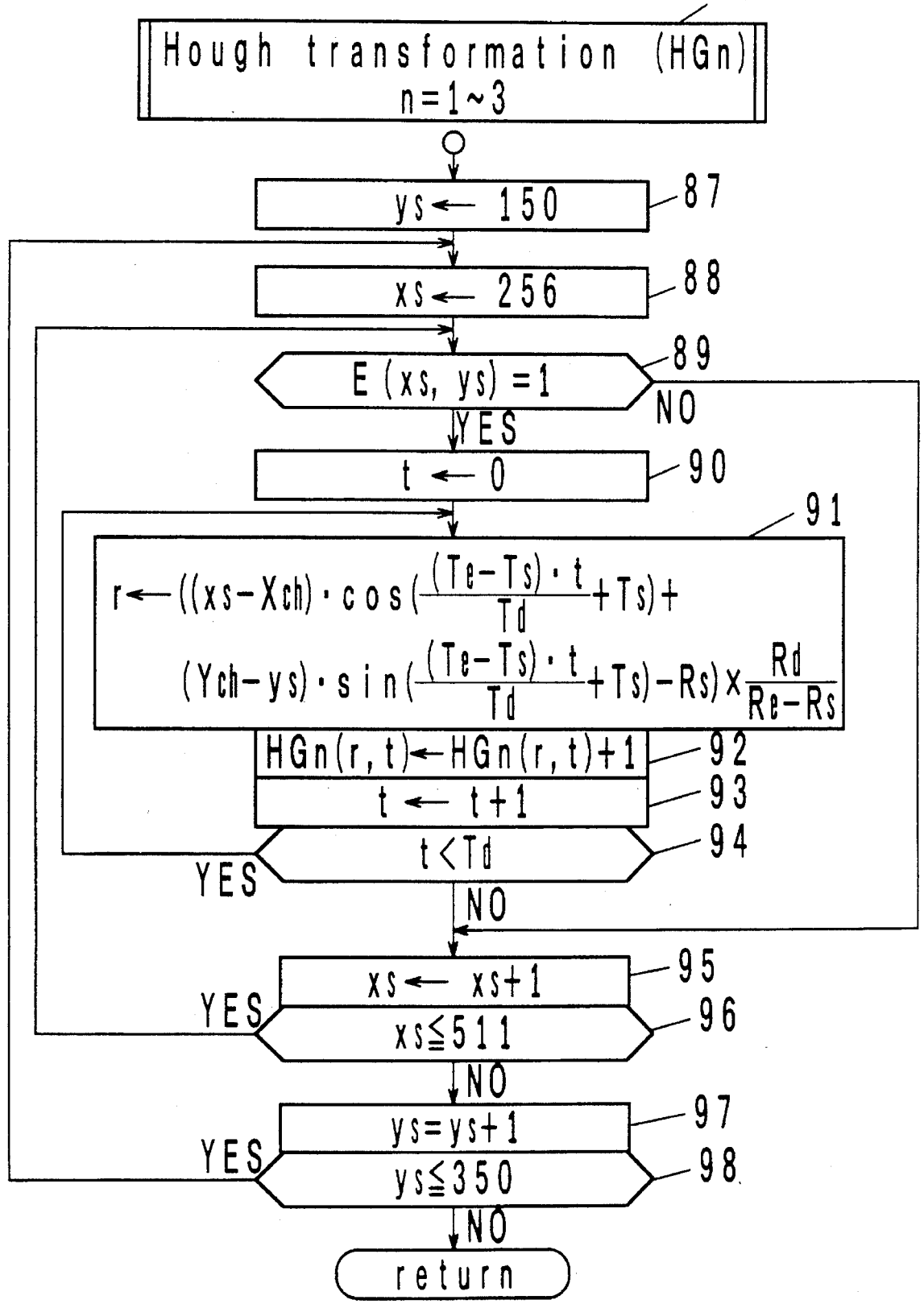
FIG. 20 is a flow chart showing in general terms "Hough transformation (HG1)" 67, "Hough transformation (HG2)" 72 and "Hough transformation (HG3)" 77 shown in FIGS. 17 and 18 in detail, n appearing in FIG. 20 being either one of 1, 2 or 3.

"Hough transformation (HG1)" 67 (FIG. 20)

Referring to FIG. 20, an examination is made (at steps 87 to 89 and steps 95 to 98) to see if feature point information "1" exists in the right half of a region of the binary data table E(Xs, Ys), which corresponds to the window 2 of the screen corresponding to the corrected image memory. In other words, the region has a start point (255, 150) and an end point (511, 350). For each feature point found, such feature point is converted into a position (r, t) on the polar coordinate ρ-θ system having its origin at Xch=255 and Ych=350 in the X-Y coordinates, and having θ which changes in a range from zero to π/2 and in which θ is incremented in unit of (π/2)×(1/32). For the position (r, t), t assumes a value from 0 to 31, and r assumes a value which is calculated according to an equation indicated in a block representing a step 91 in FIG. 20. Data in the data table Hgn (where n=1) at an address corresponding to the position (r, t) is incremented by one (steps 90 to 94). As mentioned previously, a single point on the X-Y coordinate system corresponds to a curve When converted into the polar coordinates ρ-θ, and accordingly the positions (r, t) which are converted are 32 in number corresponding to t=0 to 31, and their succession represents a curve. Since data in the data table Hgn at each address allotted to such position (r, t) is incremented by one, it will be seen that the data located at each address represents the number of curve passages on the ρ-θ coordinates for each of the feature points on the X-Y coordinates.

Step 91 in FIG. 20 calculates is $$r=\{(Xs-Xch)\cdot\cos\,[(t\cdot(Te-Ts)/Td)+Ts]+(Ych-Ys)\cdot\sin\,[(t-(Te-Ts)/Td)+Ts]-Rs\}\times Rd/(Re-Rs) \quad (1)$$

and stores the calculated value r into a register r. The equation (1) can be rewritten as follows:

$$r/Rd/(Re-Rs)+Rs=(Xs-Xch)\cdot\cos\,[(t\cdot(me-ms)/Td)+Ts]+(Ych-Ys)\cdot\sin\,[(t\cdot(me-rs)/Td)+Ts] \quad (1a)$$

This in turn can be again rewritten as follows:

$$r/d+c=(Xs-Xch)\cdot\cos\,(a-t+b)+(Ych-Ys)\cdot\sin\,(a\cdot t+b) \quad (1b)$$

where a=(me-ms)/Td, b=Ts, c=Rs and d=Rd/(Re-Rs).

In the equation (1), (Xch, Ych) represents a position on the X-Y coordinates of the origin of the polar coordinates (i.e., Xch=255 and Ych 350). Xs and Ys represent X and Y coordinates of the feature point on the X-Y coordinate system.

Representing θ as follows:

$$\theta=[(t\cdot(Te-Ts)/Td)+Ts]$$

and considering $$(Te-Ts)/Td=(\pi/2)/32$$

$$Ts=0$$

as a result of the set-up in the step 62R in FIG. 15 and the step 66 in FIG. 17, we have $$\theta=t\cdot(\pi/2)/32=(\pi/64)t$$

$a=\pi/64$, $b=0$, $c=0$ and $d=\frac{1}{8}$.

Since t assumes a value from 0 to 31, 32 values r of ρ for θ=0, θ=π/64, θ=2π/64, θ=3π/64), ... 31π/64 are calculated. Thus, during this first Hough transformation, each of the feature points in the right half of the window 2 is converted into a position (r, t) on the plane of the polar coordinates defined by θ which extends between 0 and π/2 and changes in unit of π/64.

As a result of the set-up in the step 62R in FIG. 15 and the step 66 in FIG. 17, we have $$Rd/(Re-Rs)=32/256$$

This means that since θ=π/64 is chosen as the unit of t, or since π/2 is divided into 32 equal portions, the extent of ρ from 0 to 256 is similarly divided into 32 portions in a corresponding manner. In other words, the unit of r is equal to 256/32.

To summarize, in the "Hough transformation (HG1)" 67, the equation (1) is specifically defined as follows:

$$r=\{(Xs-255)\cdot\cos\,[(t-(\pi/64)]+(350-Ys)\cdot\sin\,[(t-(\pi/64)]\}\times\frac{1}{8} \quad (1\text{-}1)$$

This can be rewritten into a form corresponding to the equation (1b) as follows:

$$r/d+c_m=(Xs-Xch)\cdot\cos\,(a_1-t+b_1)+(Ych-Ys)\cdot\sin\,(a_1-t+b_1) \quad (1\text{-}1b)$$

where $a_1=\pi/64)$ $b_1=0$, $c_1=0$, and $d_1=\frac{1}{8}$.

In this manner, the unit by which θ is changed is equal to π/64 and the unit chosen for the ρ is equal to 256/32, both of which are rough in the first Hough transformation. Accordingly, the number of calculations required to convert the feature point is (Xs, Ys) into the ρ-θ polar coordinates or the number of times t is changed or the calculation according to the equation (1) is minimized. In addition, the number of bits representing r data is small; the rate at which the feature point is converted into the ρ-θ polar coordinates is fast; and the counting operation to count the number of curve passages is high.

Figure 21:
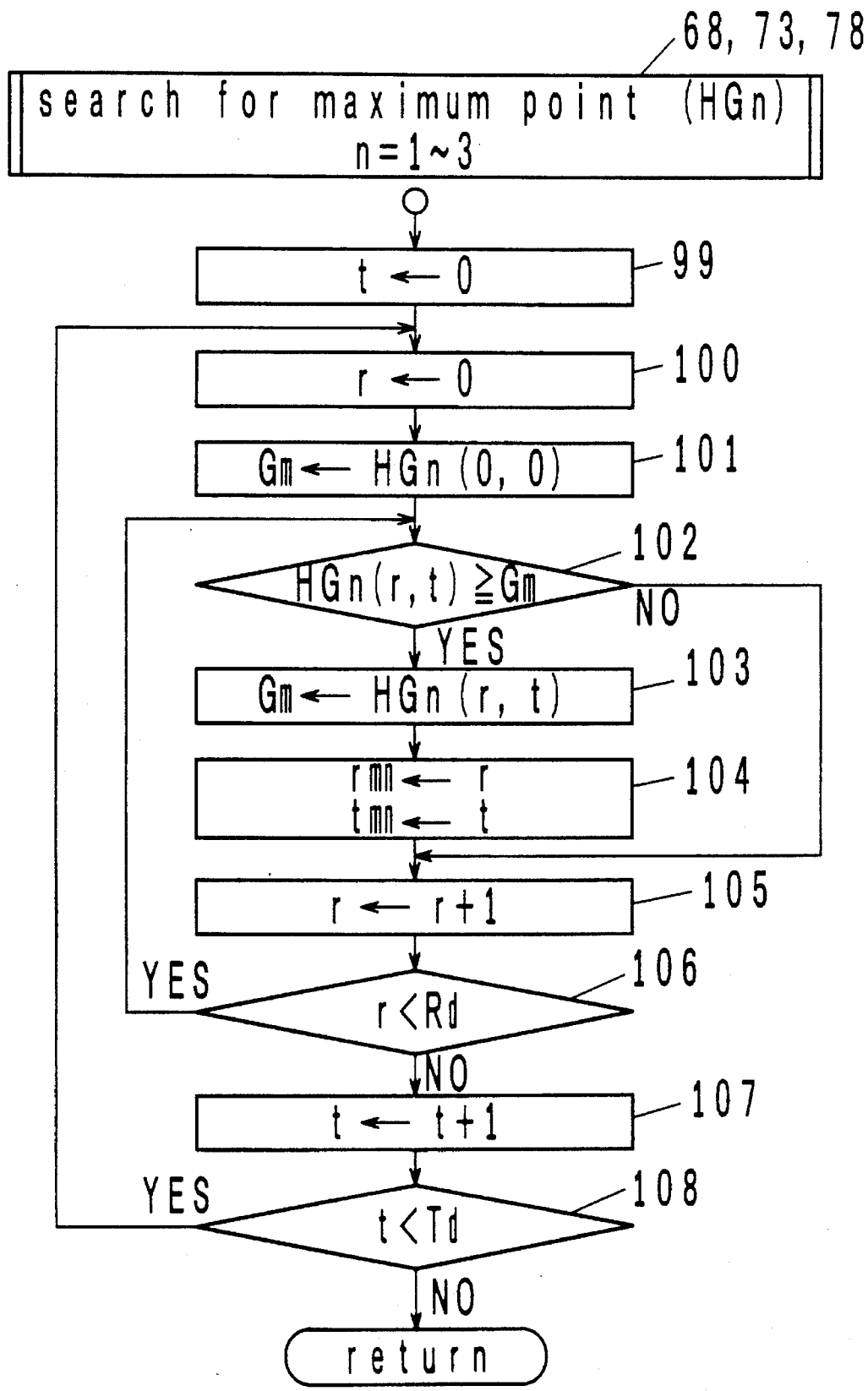
FIG. 21 is a flow chart showing in general terms "search for maximum (HG1)" 68, "search for maximum (HG2)" 73 and "search for maximum (HG3)" 78 shown in FIGS. 17 and 18 in detail, n appearing in FIG. 21 being either one of 1, 2 or 3.

Returning to FIG. 17, upon completion of the "Hough transformation (HG1)" 67, which is the first Hough transformation, CPU 1 executes "search for maximum (HG1)" 68, the detail of which is shown in FIG. 21.

"Search for maximum (HG1)" 68 (FIG. 21) Data (the number of curve passages) in the data table Hgn (where n=1) at each address (r, t) is sequentially read out (steps 99, 100, and 105 to 108 in FIG. 21). The data read out is compared against data stored in a register Gm, and when the data which is read out is greater, it is stored in the register Gm to update it. The r of the address (r, t) for the data which is read out is stored in a register rm1 while is stored in a register tm1 (steps 101 to 104). When such processing operation has been completed with all the addresses of the data table Hgn, the register Gm then stores a maximum value of the number of curve passages which are stored in the data table Hgn, while the registers rm1, tm1 store an address (rm1, tm1) where such maximum is stored.

Returning to FIG. 17, upon completion of the "search for maximum (HG1)" 68, CPU 1 then converts the address (rm1, tm1) which are expressed in the r-t polar coordinates into an address (Rm1, Tm1) in the ρ-θ polar coordinates which corresponds to the X-Y coordinates (step 69). Specifically, $$Rm1 = rm1 \cdot (Re1 - Rs1)Rd1 \qquad (2)$$

$$Tm1 = tm1 \cdot (Te1 - Ts1)Td1 \qquad (3)$$

sare calculated, and the calculated Rm1 is stored in a register Rm1 and the calculated Tm1 is stored in a register Tm1. As a result of the set-up in the step 62R in FIG. 15 and the step 66 in FIG. 17, $$(Re1 - Rs1) = 256$$

$$Rd1 = 32$$

$$(Te1 - Ts1) = \pi/2$$

$$Td1 = 32$$

and hence, the equation (2) means that $Rm1 = 8 \cdot rm1$ and the equation (3) means that $Tm1 = (\pi/64) \cdot tm1$. Substitution of the address (Rm1, Tm1) into the equation for conversion into the X-Y coordinates yields an equation for a rectilinear line which is detected by the low density Hough transformation 67 (which will be hereafter referred to as a first run detection) and which lies in the right half of the window 2 on the screen which displays image data in the corrected image memory.

CPU 1 then clears data in the data table Hgn(r, t), where n=2, now allocated to a given region in the image memory 5a (step 70 in FIG. 17). Then conversion parameters for "Hough transformation (HG2)" 72, which is a second Hough transformation (step 71 in FIG. 17), are set up. In the first Hough transformation, the extent of θ, or Ts~Te has been chosen from 0 to π/2, changing in a unit (Te~Ts)/Td equal to π/64, and the extent of ρ, or Rs to Re has been chosen from 0 to 256, changing in a unit Rd/(Re−Rs) equal to ⅛. However, in the second Hough transformation, the extent of θ and ρ is chosen to be a small range centered about (Rm1, Tm1), while also reducing the unit by which θ and ρ are changed. Specifically, the set-up is as follows:

$$Rs = 8(rm1 - 2)$$

$$Re = 8(rm1 + 2)$$

$$Rd = 32$$

$$Ts = (\pi/64)(tm1 - 2)$$

$$Te = (\pi/64)(tm1 + 2)$$

$$Td = 32$$

It is to be noted that $rm1 = Rm1/8$, and $tm1 = Tm1/(\pi/64)$. The "Hough transformation (HG2)" 72 then takes place.

"Hough transformation (HG2)" 72

The detail of the "Hough transformation (HG2)" 72 is similar to the "Hough transformation (HG1)" 67 which has been described above with reference to FIG. 20, except that a different value of R is used, namely, now n=2 and that a different equation is used within the block 91 (corresponding to the equation (1) mentioned above). Specifically, the calculation in the step 91 of FIG. 20, based on the parameters which are set up at step 71, takes place according to the following equation, which corresponds to the equation (1):

$$r = \{(Xs-255)\cdot\cos\,[(\pi/512)+\pi(tm1-2)/64]+(350-Ys)\cdot\sin\,[t\cdot(\pi/512)+ \\ \cdot(tm1-2)/64] - 8(rm1-2)\} \times (\,1/1) \qquad (1-2)$$

This can be rewritten into a form corresponding to the equation (1b) as follows:

$$r/d_2 + C_2 = (Xs-Xch)\cdot\cos\,(a_2\cdot t+b_2)+(Ych-Ys)\cdot\sin\,(a_2\cdot t+b_2) \qquad (1-2b)$$

By contrast to the values obtained, $a_1=(\pi/64)$, $b_1=0$, $c_1=0$, $d_1=⅛$ during the first transformation, we have the following different values: $a_2=(\pi/512)$, $b_2 = \pi/(tm1-2)/64$, $c_2=8$ (rm1−2), and $d_2=1$. Since t assumes values from 0 to 31, $$\begin{aligned}
\theta &= & & \pi(tm1-2)/64, \\
\theta &= & (\pi/512) &+ \pi(tm1-2)/64, \\
\theta &= & 2(\pi/512) &+ \pi(tm1-2)/64, \\
\theta &= & 3(\pi/512) &+ \pi(tm1-2)/64, \\
&\vdots \\
\theta &= & 31(\pi/512) &+ \pi(tm1-2)/64,
\end{aligned}$$

In this manner, values of r corresponding to θ, which assumes 32 values that change in a unit of (π/512), are calculated. Thus, during the second Hough transformation, each of the feature points in the right half of the window 2 is converted into a position (r, t) on the polar coordinate plane in a range from $\theta = \pi(tm1-2)/64$ to $\theta = 31(\pi/512)+\pi(tm1-2)/64$ in units of (π/512). The range ρ extends from 8(rm1−2) to 8 (rm1+2), and the unit of ρ is chosen to divide such range into 32 portions. In other words, the unit for r is equal to 32/32=(1/1)=1. Accordingly, the second Hough transformation (72) converts the feature points in the right half of the window 2 into the polar coordinates in a restricted range and at a higher density than those associated with the first Hough transformation (67). In the conversion into the polar coordinates of one of the feature points, t is changed from 0 to 31, and the calculation needs to be repeated 32 times also in the second Hough transformation (72). Thus, the second Hough Transformation (72) requires the same order of processing time as that required for the first Hough transformation (67). However, the number of calculations required to convert one of the feature points (Xs, Ys) into the ρ-θ polar coordinates is greatly reduced, the number of bits used for r data is reduced, each feature point is converted into the r-θ polar coordinates rapidly, and the count of curve passages can be processed at a higher rate.

Returning to FIG. 17, upon completion of the "Hough transformation (HG2)" 72, which is the second Hough transformation, CPU 1 executes "search for maximum (HG2)" 73. The detail of this search is generally similar to the detail of the "search for maximum (HG1)" 68 mentioned previously, except that now n=2. Upon completion of the search, the maximum value of the number of curve passages stored in the data table HGn is stored in the register Gm, and registers rm2, tm2 store the address (rm2, tm2) at which the maximum value is located.

Referring to FIG. 17 again, upon completion of the "search for maximum (HG2)" 73, CPU 1 converts the address (rm2, tm2) expressed in the r-t polar coordinates into the address (Rm2, Tm2) in the ρ-θ polar coordinates which corresponds to the X-Y coordinate screen (step 74). This calculation takes place according to the following formulae:

$$Rm2 = rm2 \cdot (Re2-Rs2)/Rd2 + Rs2 \quad (4)$$

$$Tm2 = tm2 \cdot (Te2-Ts2)/Td2 + Ts2 \quad (5)$$

The calculated Rm2 is stored in a register Rm2, and the calculated Tm2 is stored in a register Tm2 (step 74). As a result of the set-up made in the step 71 in FIG. 17, we have $$(Re2-Rs2) = 32$$

$$Rd2 = 32$$

$$(Te2-Ts2) = \pi/16$$

$$Td2 = 32$$

and accordingly, the equation (4) is specifically written as follows:

$$Rm2 = rm2 + 8rm1 - 16 \quad (4\text{-}1)$$

and the equation (5) is specifically defined as follows:

$$Tm2 = tm2 - (\pi/512) + (\pi/64) \cdot (tm1-2) \quad (5\text{-}1)$$

Substitution of the address (Rm2, Tm2) into the equation for conversion into the X-Y coordinate system, yields an equation representing a rectilinear line (which is detected by the intermediate density Hough transformation 72, and referred to hereafter as a second run detection) lying in the right half of the window 2 on the screen which displays image data stored in the corrected image memory.

CPU 1 then clears data in data table HGn(r, t), where n=3, which is allocated to a given area in the image memory 5a (step 75 in FIG. 18). The conversion parameters to be used in "Hough transformation (HG3)" 77, which is a third Hough transformation, are set up (step 76 in FIG. 18). In this instance, the extent of ρ and θ are chosen in a range centered about (Rm2, Tm2) which is further reduced than the range used for the "Hough transformation (HG2)" 72, and the unit by which ρ or θ is changed is reduced (step 76). Specifically, $$Rs = rm2 + 8rm1 - 18$$

$$Re = rm2 + 8rm1 - 14$$

$$Rd = 32$$

$$Ts = (\pi/512)tm2 + (\pi/64)tm1 - 9\pi/256$$

$$Te = (\pi/512)tm2 + (\pi/64)tm1 - 7\pi/256$$

$$Td = 32$$

It is to be noted that rm2 and tm2 are defined by the equations (4-1) and (5-1) corresponding to Rm2 and Tm2, respectively. "Hough transformation (HG3)" 77 then takes place.

"Hough transformation (HG3)" 77.

The detail of this transformation is similar to the "Hough transformation (HG2)" 72 mentioned above, except that now n=3 and that the calculation which occurs within the block 91 shown in FIG. 20 takes place in accordance with a different equation (corresponding to the equation (1) mentioned above). On the basis of parameters set up in the step 76, the calculation occurring in the step 91 shown in FIG. 20 takes place according to the following equation:

$$r = \{(Xs - 255) \cdot \cos[t \cdot (\pi/4096) + (\pi/512)tm2 + (\pi/64)tm1 - 9\pi/256] + (350 - Ys) \cdot \sin[t \cdot (\pi/4096) + (\pi/512)tm2 + (\pi/64)tm1 - 9\pi/256] - rm2 - 8\,rm1 + 18\} \times 8 \quad (1\text{-}3)$$

This equation can be rewritten into a form corresponding to the equation (1b) as follows:

$$r/d_3 + C_3 = (Xs - Xch) \cdot \cos(a_3 \cdot t + b_3) + (Ych - Ys) \cdot \sin(a_3 \cdot t + b_3) \quad (1\text{-}3b)$$

It is to be noted that in contrast to the values obtained as a result of the first and the second transformation as indicated below:

$$a_1 = (\pi/64), \quad b_1 = 0, \quad c_1 = 0, \quad d_1 = 1/8$$

$$a_2 = (\pi/512), \quad b_2\pi = (tm1-2)/64, \quad c_2 = 8(rm1-2), \quad d2 = 1$$

We have the following values for the third Hough transformation:

$$a_1 = (\pi/4096), \quad b_3 = (\pi/512)tm2 + (\pi/64)tm1 - 9\pi/256,$$

$$c_3 = rm2 + 8rm1 - 18, \quad d_3 = 8$$

In this manner, values of θ which change in unit of (π/4096) to assume 32 values (t=0 to 31) are calculated, as indicated below.

$$\theta = (\pi/512)tm2 + (\pi/64)tm1 - 9\pi/256,$$

$$\theta = (\pi/4096) + (\pi/312)tm2 + (\pi/64)tm1 - 9\pi/256,$$

$$\theta = 2(\pi/4096) + (\pi/512)tm2 + (\pi/64)tm1 - 9\pi/256,$$

$$\theta = 3(\pi/4096) + (\pi/512)tm2 + (\pi/64)tm1 - 9\pi/256,$$

$$\vdots$$

$$\theta = 31(\pi/4096) + (\pi/512)tm2 + (\pi/64)tm1 - 9\pi/256,$$

Thus, in the third Hough transformation, each of the feature points in the right half of the window 2 is converted into a position (r, t) in the polar coordinates for a range of θ from θ=(π/512)tm2+(π/64) tm1−9π/256 to θ=31 (π/4096)+(π/512) tm2+(π/64)tm1−97/256, changing in unit of (π/4096). The range of ρ is from Rs=rm2+8rm−18 to Re= rm2+8rm1−14, and the unit of ρ is chosen to divide such range into 32 portions. In other words, the unit of r is equal to 4/32=1/8. Accordingly, the third Hough transformation (77) converts the feature points in the right half of the window 2 into the polar coordinates in a more restricted range and at a higher density than those used for the second Hough transformation (72). The conversion of one of the feature points into the polar coordinates takes place by changing t from 0 to 31 during the third Hough transformation (77), thus requiring that the calculation be repeated 32 times. Therefore the processing time required is on the same order as that required for the second Hough transformation (72). However, the number of calculations required to convert one feature point (Xs, Ys) into the ρ-θ polar coordinates is greatly reduced, the number of bits per r data is reduced, the rate at which each feature point is converted into the ρ-θ polar coordinates is fast, and the processing rate at which the count of curve passages is processed is high.

Returning to FIG. 18, upon completion of the "Hough transformation (HG3)" 77, which is the third Hough transformation, CPU 1 executes "search for maximum (HG3)" 78. The detail of this search is similar to the "search for maximum (HG1)" 68 mentioned previously, except that now n=3. Upon completion of the search, the register Gm has stored therein the maximum value of the number of curve passages stored in the data table Hgn, and registers rm3, tm3 have stored therein the address (rm3, tm3) at which the maximum value is located.

Referring to FIG. 18, upon completion of the "search for maximum (HG3)" (78), CPU 1 converts the address (rm3, tm3) expressed in the r-t polar coordinates into the address (Rm3, Tm3) in the ρ-θ polar coordinates which corresponds to the screen in the X-Y coordinates (step 79). Calculation takes place according to the following equations:

$$Rm3 = rm3 \cdot (Re3 - Rs3)/Rd3 + Rs3 \quad (6)$$

$$Tm3 = tm3 \cdot (Te3 - Ts3)/Td3 + Ts3 \quad (7)$$

The calculated Rm3 is stored in a register Rm3, and the calculated Tm3 is stored in a register Tm3 (step 79). As a result of the set-up used in the step 76 shown in FIG. 18, we have $$(Re - Rs3) = 4$$

$$Rd3 = 32$$

$$(Te3 - Ts3) = \pi/128$$

$$Td3 = 32$$

and accordingly, the equation (6) is specifically defined as follows:

$$Rm3 = (1/8) \cdot rm3 + rm2 + 8rm1 - 18 \quad (6\text{-}1)$$

and the equation (7) is specifically defined as follows:

$$Rm3 = (Tr/128) \cdot tm3 + (\pi/512) tm2 + (\pi/64) tm1 - 9\pi/256 \quad (7\text{-}1)$$

Substitution of the address (Rm3, Tm3) into the equation for conversion into the X-Y coordinates yields an equation for a rectilinear line (which is detected by the high density Hough transformation 77, and hereafter referred to as a third run detection) lying in the right half of the window 2 on the screen which displays image data from the corrected image memory. This completes the "line fitting" 63R shown in FIG. 15 (and equivalently corresponding to the line fitting shown in FIGS. 17 and 18).

What has been described above is the obtaining of a rectilinear line (the third run detection) representing a most typical rectilinear line in the image disposed in the right half of the window 2. The window 2 is chosen to be an optimum region for detection of the white lines located on the left and right ends of the own vehicle's lane. If there is the image of a white line corresponding to the right end in the right half of the window 2, it is concluded that the probability is high that the rectilinear line found by the third run detection represents a rectilinear line which approximates this white line. Accordingly, the "line fitting" 63R represents the detection of a white line appearing on the right end of the own vehicle's lane in the right half of the window 2.

Returning to FIG. 15, CPU 1 stores Rm3 from the data (Rm3, Tm3) representing the rectilinear line of the third run detection into a register RmR and Tm3 from such data into a register TmR (step 64R). Thus, data for a rectilinear line which represents the white line lying at the right end of one's own vehicle's lane is stored in registers RmR, TmR (step 64R).

Detection of left white line 62L to 64L (FIG. 15)

Figure 22:
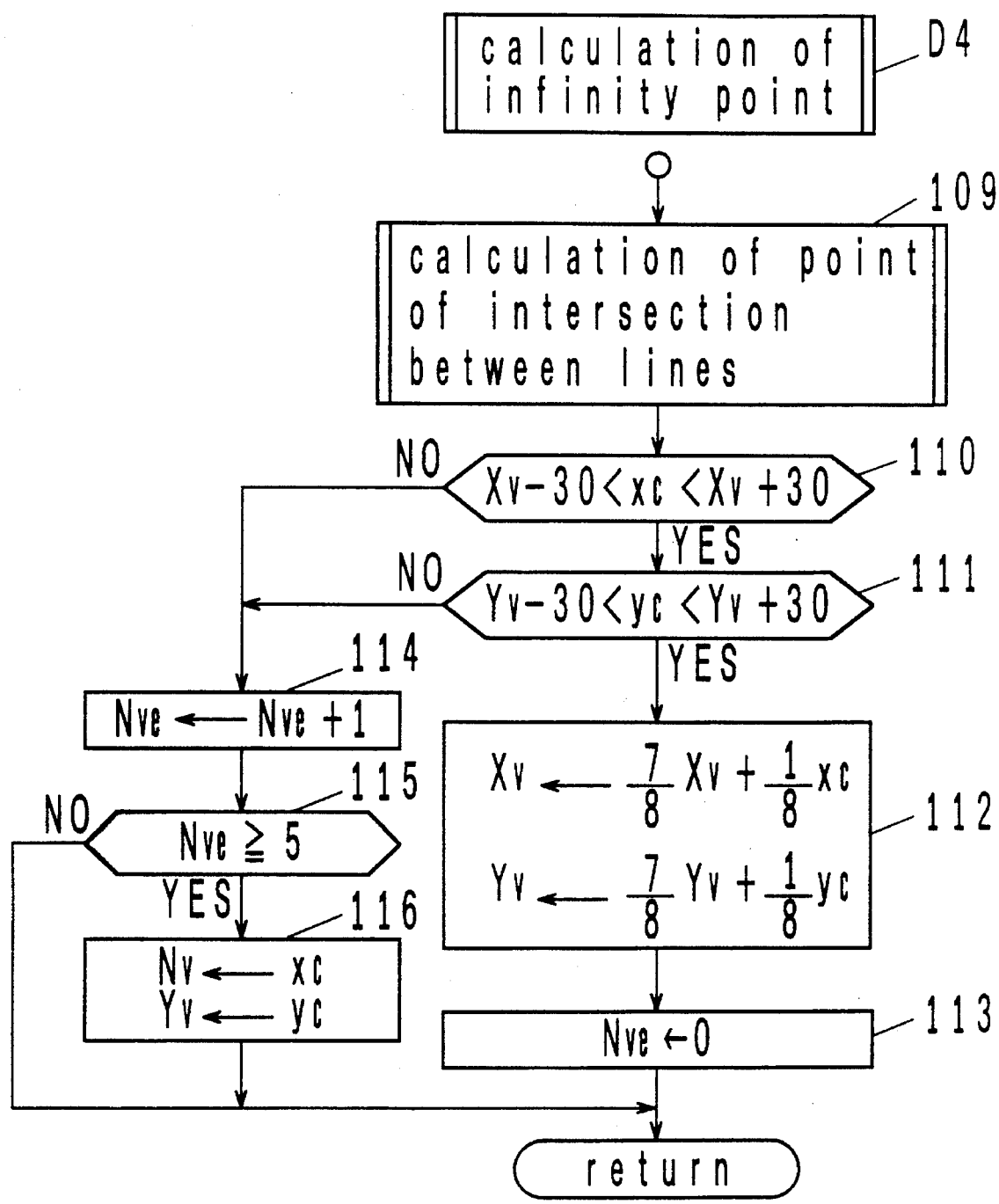
FIG. 22 is a flow chart showing "calculation of infinity point" D4 shown in FIG. 13 in detail.

CPU 1 then applies a processing operation (62R to 64R) similar to that applied to the right half of the window 2 mentioned above to the left half of the window 2 in order to detect a rectilinear line which represents a white line at the left end of one's own vehicle's lane. Then, such data is stored in registers RmL, TmL (62L to 64L). This completes the "detection of left and right white lines" D3. CPU 1 then performs "calculation of infinity point" D4, the detail of which is shown in FIG. 22.

D4. "Calculation of infinity point" D4 (FIG. 22)

Initially, a point of intersection (Xc, Yc) between the rectilinear line indicated by data stored in registers RmR, TmR (which has been estimated as representing the white line located at the right end of the own vehicle's lane) and the rectilinear line represented by data stored in the registers RmL, TmL (which has been estimated as representing the white line located at the left end of the own vehicle's lane) is calculated in "calculation of point of intersection between lines" 109. An examination is then made to see if the point of intersection (Xc, Yc) thus calculated exists in a region defined by 60 lateral picture elements ×60 longitudinal picture elements which are centered about a point of infinity (Xv, Yv). The point of infinity (Xv, Yv) is already obtained by a weighted smoothing or averaging of point of intersection data which are previously calculated and arranged in a time sequence (steps 110 and 111). If the point of intersection lies in this region, there is a high reliability that the new point of intersection (Xc, Yc) obtained really represents a point of infinity. Accordingly, the point of infinity data (Xv, Yv) is updated by applying a weight of 1/8 to the newly obtained point of intersection (Xc, Yc) and adding it to the previous point of infinity data (Xv, Yv) to which a weight of 7/8 is applied (step 112). A register Nve which counts the number of times the tracking of the point of infinity has failed is cleared (step 113).

When the new point of intersection (Xc, Yc) does not exist in the region defined by the 60×60 picture elements mentioned above, a failure of the tracking of the point of infinity is declared and the register Nve is incremented by one (step 114). The failure may be caused as a result of the calculation of the new point of intersection or the previous point of infinity data (Xv, Yv) being in error. An examination is then made to see if the content of the register Nve has reached 5 (step 115). If this register has a count of 5, the calculation of the point of intersection has erred five times consecutively. In this event, the point of infinity data (Xv, Yv) which has been held is regarded as being in error, and the point of infinity data (Xv, Yv) is updated to the new point of intersection (Xc, Yc) (step 116).

Figure 23:
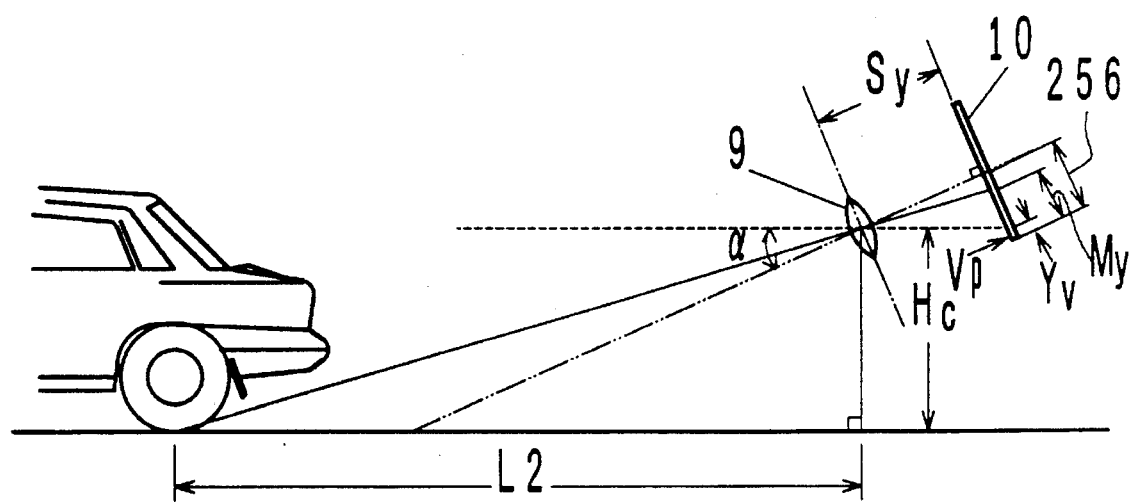
FIG. 23 is a schematic illustration of a geometrical relationship between a lens and a photographing element located within the television camera 6b shown in FIG. 1 and another vehicle which is located ahead of the own vehicle.

D5. "Calculation of spacing between left and right white lines (WL)" Ds (FIGS. 13 and 23)

Returning to FIG. 13, CPU 1 then calculates the spacing WL (or lane width) between the right and left white lines of one's own vehicle's lane (D5). At this end, the X position of the right white line on the screen (RmR, TmR) is converted to an on-road position XR, and similarly the X position of the left white line on the screen (RmL, TmL) is converted to an on-road position XL. The positions XR and XL are referenced to the position where the center line (shown by the two dot phantom line in FIG. 23) of the field of the sight of the camera 6b intersects with the road surface, and the spacing is calculated as WL=XR - XL. It is to be noted that Sx and Sy shown in the calculation block D5 shown in FIG. 13 represent the lateral and longitudinal scale factors of the camera 6b, and Hc represents the height of the center of the lens 9 of the camera 6b from the road surface, as shown in FIG. 23.

CPU 1 then examines if the calculated lane spacing WL is proper or if one's own vehicle's lane has been successfully detected (D6). This examination takes place by seeing if a deviation of WL with respect to a reference value WL3D is within a permissible range DwL. In the present embodiment, considering that the lane width of the highway in Japan is 3.5±0.2 m, the reference value WL3D is chosen to be 3.5 m and the permissible range is chosen to be DwL=0.3 m.

When the deviation of WL from the reference value WL3D is within the permissible range DwL, one's own vehicle's lane has been successfully detected, and this is recognized by writing "1" into a register FL (step 61). If the deviation exceeds the permissible range DwL, a failure of detecting one's own vehicle's lane is recognized by writing "0" into the register FL (step 62). This completes the "detection of own vehicle's lane" D shown in FIG. 3. When one's own vehicle's lane has been successfully detected, the register FL contains "1".

Figure 24A:
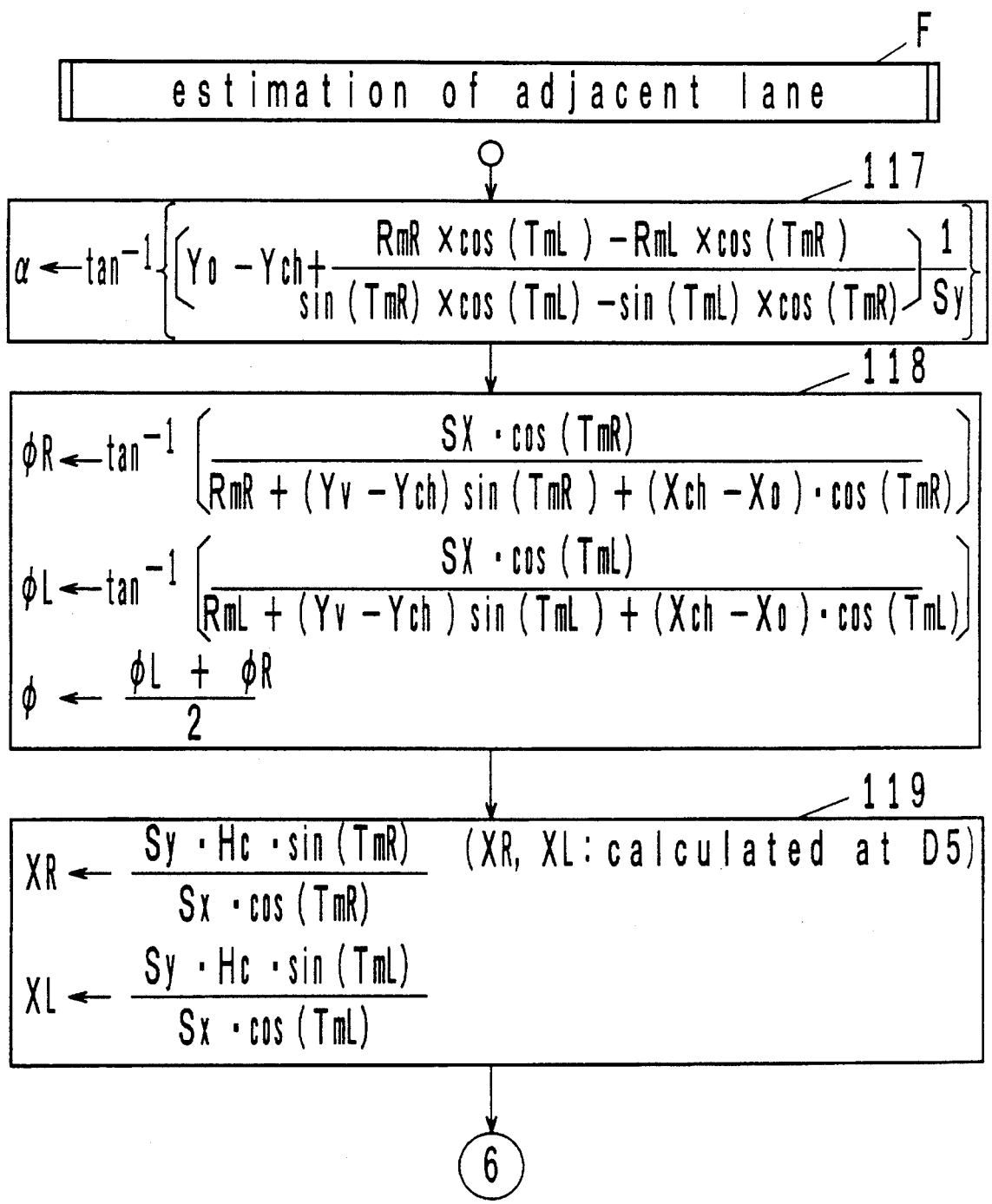
FIG. 24a is a flow chart showing part of "estimation of adjacent lane" F shown in FIG. 3 in detail.

Returning to FIG. 3, upon completion of the "detection of own vehicle's lane" D, CPU 1 examines data stored in the register FL, and when the register indicates "1", CPU1 executes "estimation of adjacent lane" F, the detail of which is shown in FIGS. 24a and 24b.

Figure 25:
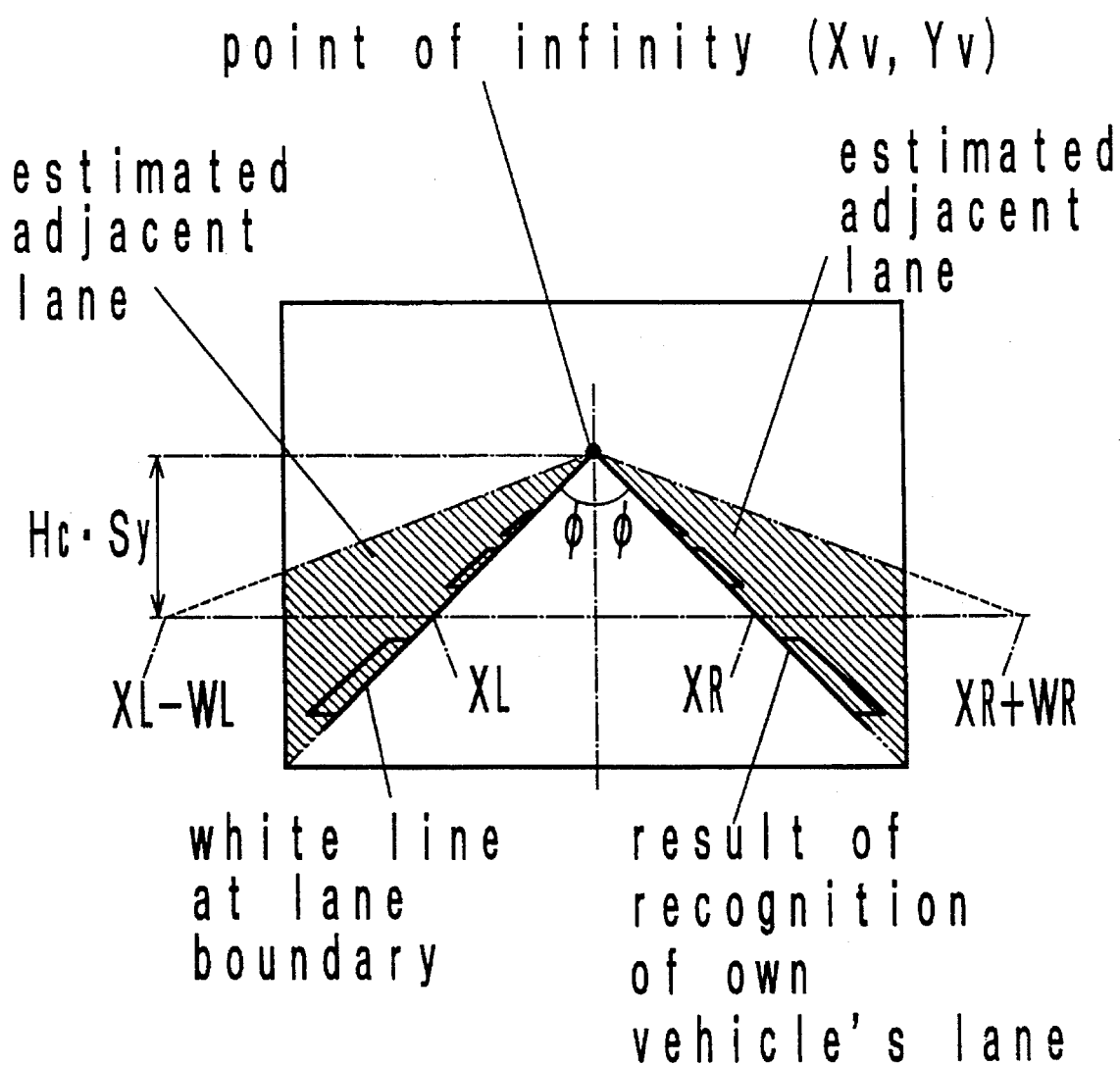
FIG. 25 is a schematic illustration of an adjacent lane, shown hatched, which is estimated by the "estimation of adjacent lane" F and appearing on the corrected screen obtained by the "interpolation" C8 shown in FIG. 4.

F. "Estimation of adjacent lane" F (FIGS. 24a, 24b and 25)

Referring to FIG. 24a, an angle $\alpha$ by which the camera 6b is directed downward with respect to the horizontal is initially calculated (step 117). In the equation of calculation shown in the block corresponding to the step 117, Yo represents the Y coordinate of the center of the screen, and Ych represents the Y coordinate of the bottom of the screen as defined by the "calculation of point of intersection between lines" C4 of the "correction of screen" C. Then, angles $\phi R$ and $\phi L$, formed by the white lines at the right and the left end of one's own vehicle's lane with respect to the running direction of the vehicle are calculated, and their average value $\phi$ is determined. In the screen which has been subjected to the "correction of screen" C, where the running direction of the vehicle is brought into alignment with the central bisector (Y=255) which laterally divides the screen into equal portions, the angles $\phi R$ and $\phi L$ are angles which the white lines at the right and the left end form with respect to this bisector. As shown in FIG. 25, the line having the average angle value $\phi$ on the opposite sides represents the center line of the own vehicle's lane. In a block representing next step 119, equations are shown for calculating the distances XR and XL to the right and left white lines from the point of intersection of the center line of the field of sight of the camera 6b with the road surface. The values calculated in the "calculation of spacing between left and right white lines (WL)" D5 are used as XR and XL. At next step 120, disregarding the presence or not of the right white line of an adjacent lane which is located to the right of the right white line of one's own vehicle's lane, it is assumed that the right white line of the right adjacent lane exists. By so assuming, it is then assumed that a rectilinear line which joins the point of infinity with a point which is located by a distance of lane width WL (which has been calculated at D5) horizontally to the right of the point XR represents the white line at the right end of the right adjacent lane, which is expressed by an equation Y=AX+B. The value Aex1 of the coefficient A of proportionality (the tangential value of an angle TMRR which it forms with the horizontal line or X axis) is calculated, as is the value Bex11 of a constant term B (step 120). Similarly, values Aex2 and Bex2 representing the left white line of the left adjacent lane are calculated (step 121). These values Aex1, Bex1 and Aex2, Bex2 are converted into the $\rho$-$\theta$ polar coordinates (steps 122 and 123). This completes the determination of two other rectilinear lines which define the left adjacent lane and the right adjacent lane, in addition to the white lines located at the both ends of one's own vehicle's running lane.

Figure 26:
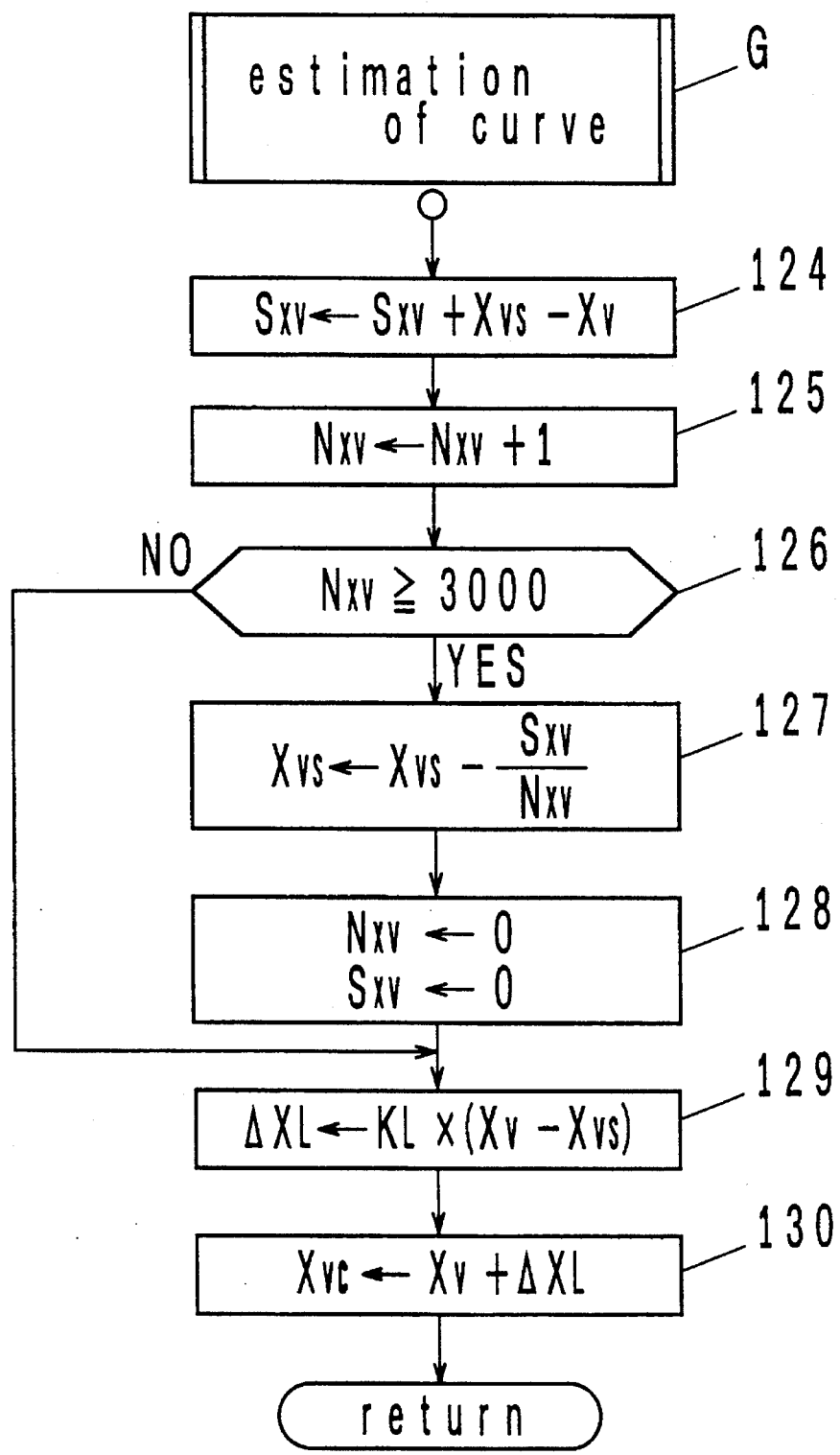
FIG. 26 is a flow chart showing "estimation of curve" G shown in FIG. 3 in detail.

Returning to FIG. 3, upon completion of the "estimation of adjacent lane" F, CPU 1 executes "estimation of curve" G, the detail of which is shown in FIG. 26.

Figure 27:
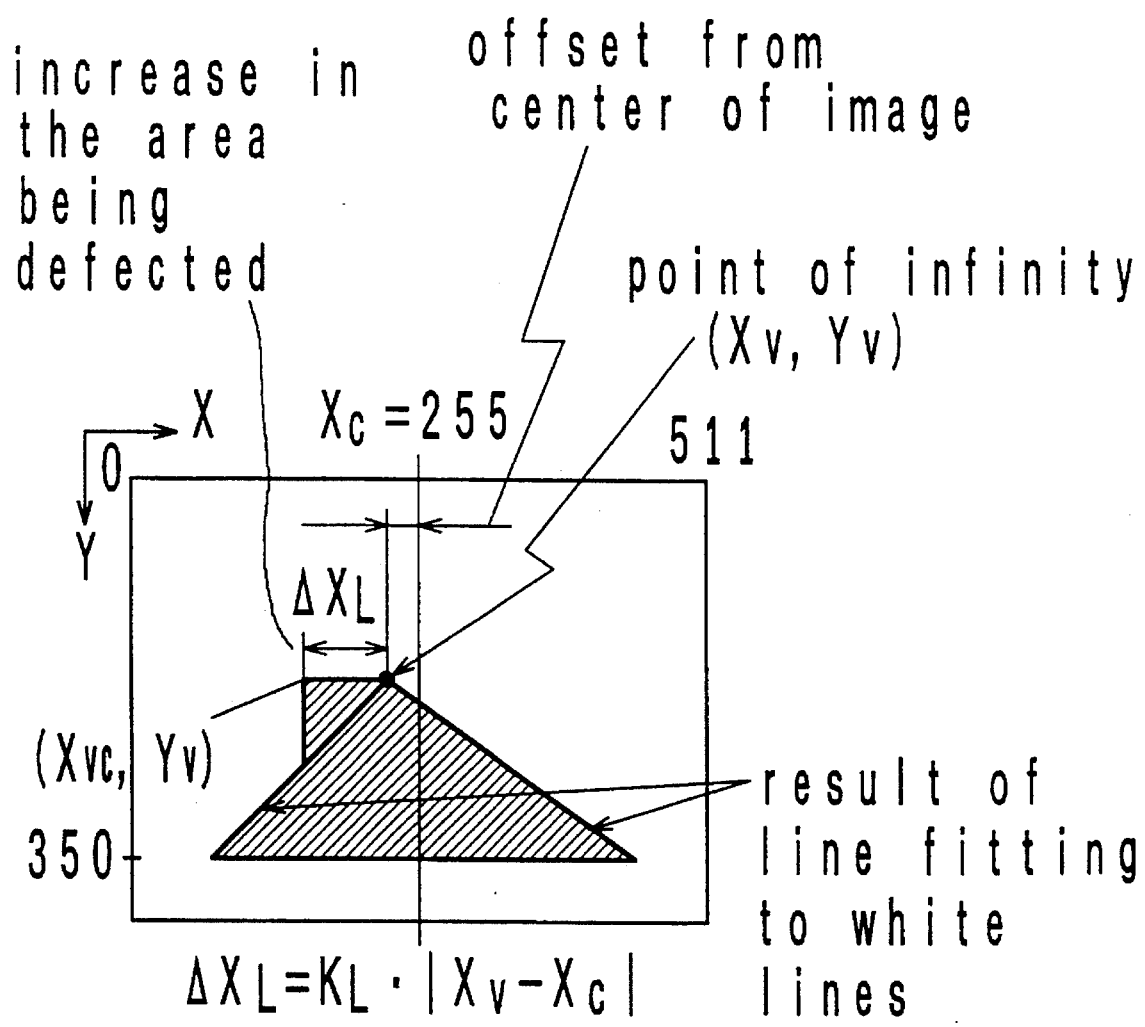
FIG. 27 is a schematic illustration, in the form of a plan view, of a lane region of own vehicle, shown hatched, which is estimated by "detection of own vehicle's lane" D and "estimation of curve" G and appearing on the corrected screen obtained by the "interpolation" C8 shown in FIG. 4.

G. "Estimation of curve" G (FIGS. 26 and 27)

In the screen which has been subjected to the "correction of screen" C, the longitudinal axis of the vehicle is in substantial alignment with the centerline (X=255) of the screen, and accordingly, where one's vehicle's lane extends straightforward, the point of infinity (Xv, Yv) substantially lies on the centerline (Xv=255). However, since the point of infinity (Xv, Yv) represents a point of intersection between the extensions of the left and right white lines located immediately ahead of the vehicle, if one's vehicle's lane is curved, the point of infinity (Xv, Yv) will be located to the right (for a right curve) or to the left (for a left curve) of the centerline X=255 of the screen. Accordingly, in the "estimation of curve" G, the presence of a curve is determined from the direction and the magnitude of an offset, either to the left or right from the centerline of the screen, of the point of infinity (Xv, Yv), and a far point of one's own vehicle's lane where the left and right white lines of the lane appear to intersect with each other is estimated. However, since the vehicle is subject to oscillations due to its driving condition or the road surface and is also subject to a change in the attitude of the car body, a pitching or rolling of the forward scene will be experienced when the camera 6b views a scene located ahead of it. In addition, the running direction of the vehicle or the longitudinal direction thereof may deviate temporarily from its parallel relationship with respect to the vehicle's lane. Accordingly, when the prevailing running direction of the vehicle or the centerline of the screen is taken as a reference, the detection of a curve may fail. Accordingly, in the present embodiment, the estimation of a curve is based on the choice as a reference line of a line which is parallel to the Y axis and which passes through a mean value Xvs averaged over a time sequence of X coordinate values Xv of the detected point of infinity (Xv, Yv).

Initially, a sum is formed from the contents of a deviation accumulation register Sxv and a mean value register Xvs. The X coordinate value Xv of the point of infinity, obtained by the "calculation of the point of infinity" D4, is subtracted from the sum, and the result is stored to update the deviation accumulation register Sxv (step 124). A count register Nxv is then incremented by one (step 125). An examination is made to see if the count of the register has reached 3000 (step 126), whereupon the content of the register Xvs from which Sxv/Nxv is subtracted is stored to update the register Xvs, and the registers Nxv and Sxv are cleared (step 128).

As a result of such processing operation, each time the "estimation of curve" G is executed 3000 times, the content of the register Xvs is updated to a value corresponding to the prevailing value from which Sxv/3000 is subtracted, and the registers Nxv and Sxv are cleared. Thus, going back from the present time, the "calculation of point of infinity" has been repeated 3000 times during the latest interval, and, further going back from the start of the latest interval, it has been repeated 3000 times during the previous interval to produce a mean value Xvs (previous mean value). Data stored in the register Xvs is updated to a value which is equal to the mean value Xvs. The mean value Xvs is determined during the previous interval from which a mean value of deviations from this mean value Xvs occurring during each run of the latest interval is subtracted. In other words, the register Xvs stores a weighted mean value of the time sequence of the individually calculated Xv.

During each run of the "estimation of curve" G, a deviation of a latest calculated Xv with respect to the mean value Xvs (which is made as the reference value in a determination of the curve) is calculated, and is multiplied by a coefficient KL (which may be 4.7, for example). The coefficient KL is determined on the basis of experiments to produce a value $\Delta$XL (step 129), which is then added to Xv to provide a value Xvc which is then stored in a register Xvc (step 130). In this manner, a far point of the curve where the left and right white lines appear to intersect with each other is determined to be (Xvc, Yv).

Figure 28:
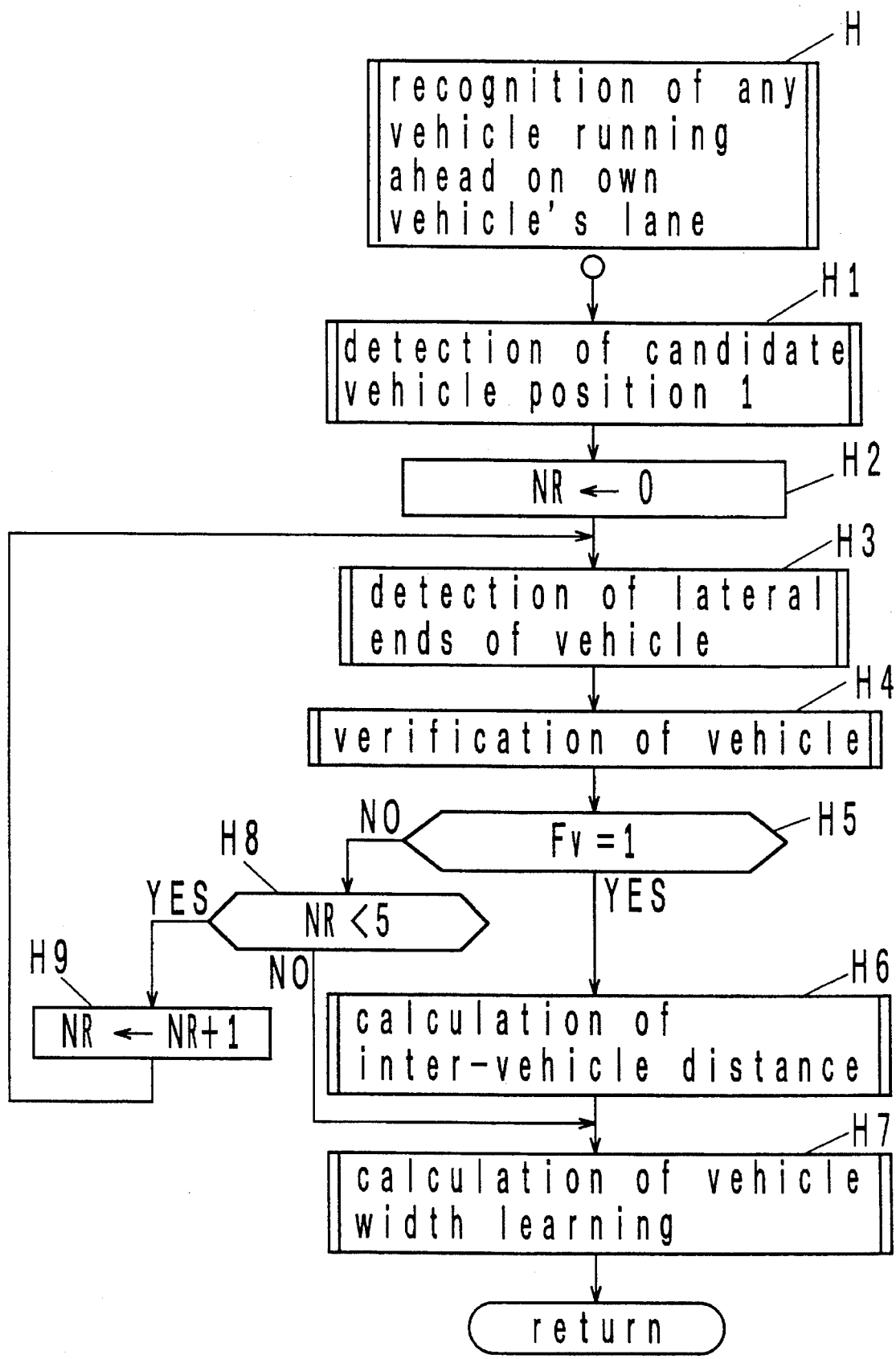
FIG. 28 is a flow chart showing "recognition of any vehicle running ahead of own vehicle on the own vehicle's lane and determination of distance" H shown in FIG. 3 in detail.

Returning to FIG. 3, upon completion of the "estimation of curve" G, CPU 1 executes "recognition of any vehicle running ahead on the own vehicle's lane and determination of distance" H, the detail of which is shown in FIG. 28.

H. "Recognition of any vehicle running ahead on the own vehicle's lane and determination of distance" H (FIGS. 28 and 29 to 46)

Figure 29:
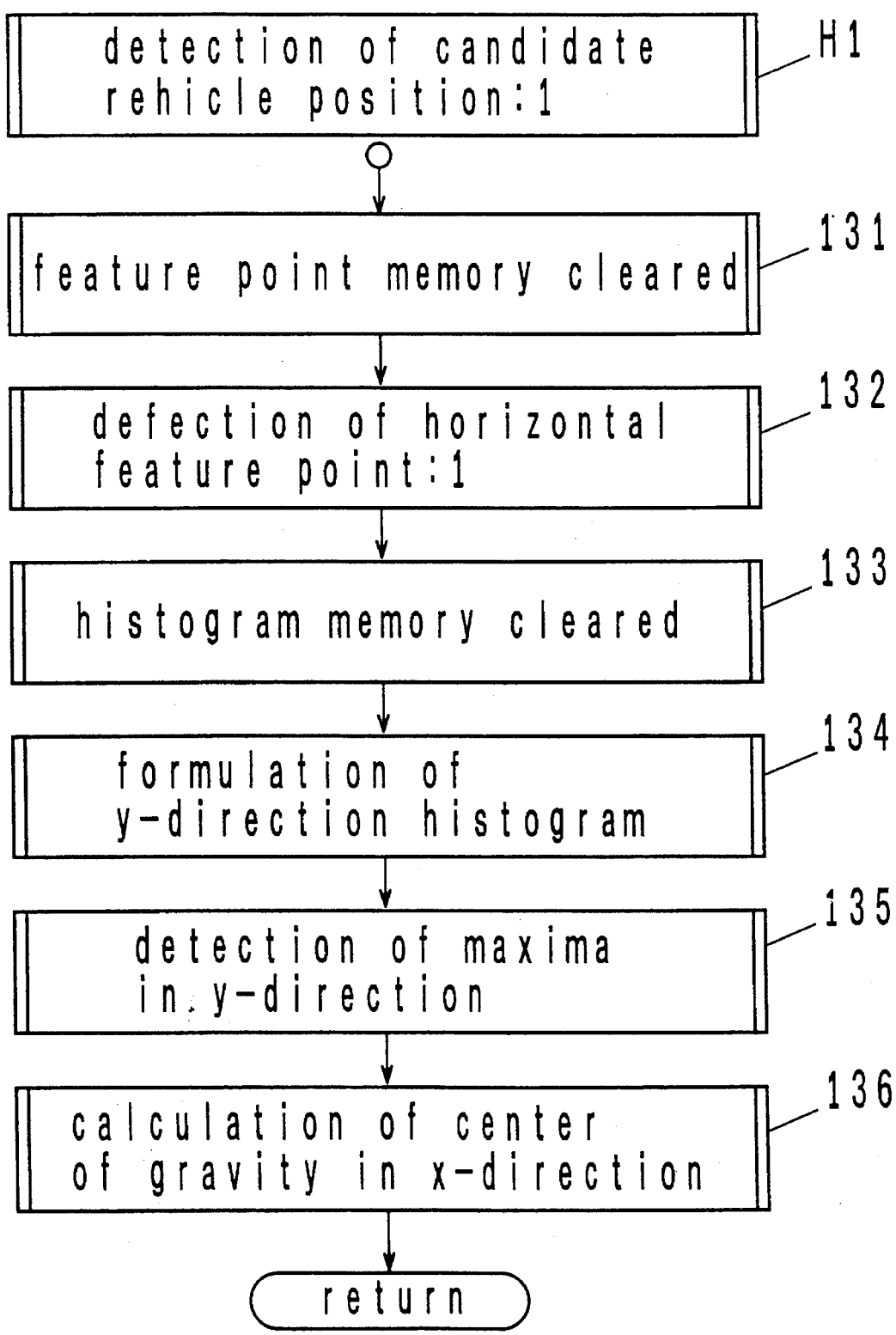
FIG. 29 is a flow chart showing "detection of candidate vehicle position 1" H1 shown in FIG. 28 in detail.
Figure 30:
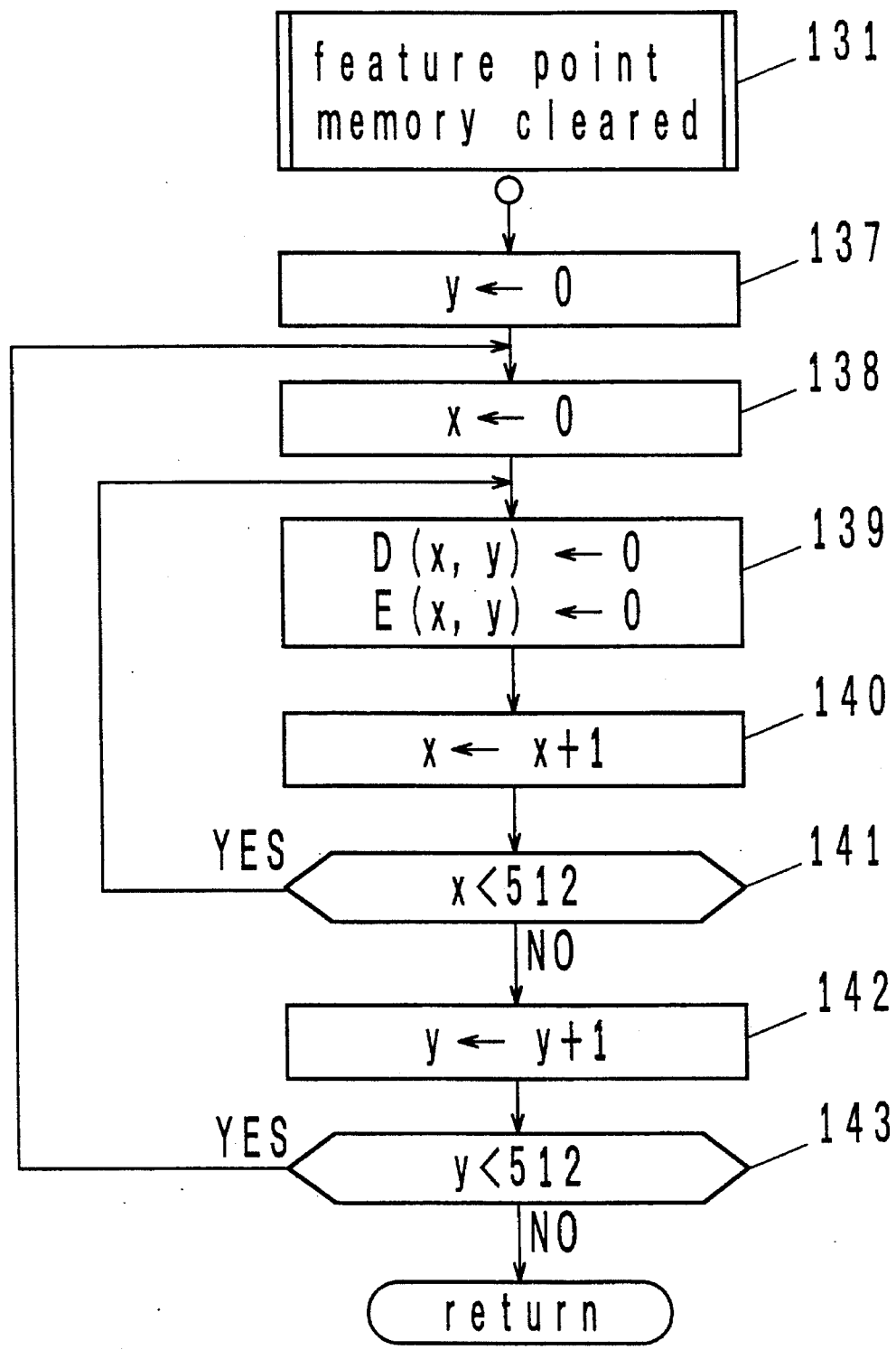
FIG. 30 is a flow chart of "clearing feature point memory" 131 shown in FIG. 29 in detail.

Initially, "detection of candidate vehicle position 1" H1, the detail of which is shown in FIG. 29, is executed.

H1. "Detection of candidate vehicle position 1" H1 (FIG. 29)

At "clearing feature point memory" 131, gradation data memory D(x, y) and binary data memory E(x, y) having a number of picture elements which are equal in number to the number of picture elements in the corrected image memory are cleared. This is shown in detail in FIG. 30. Then, "detection of horizontal feature point" 132 is executed, the detail of which is shown in FIG. 31.

"Detection of horizontal feature point" 132

Figure 31A:
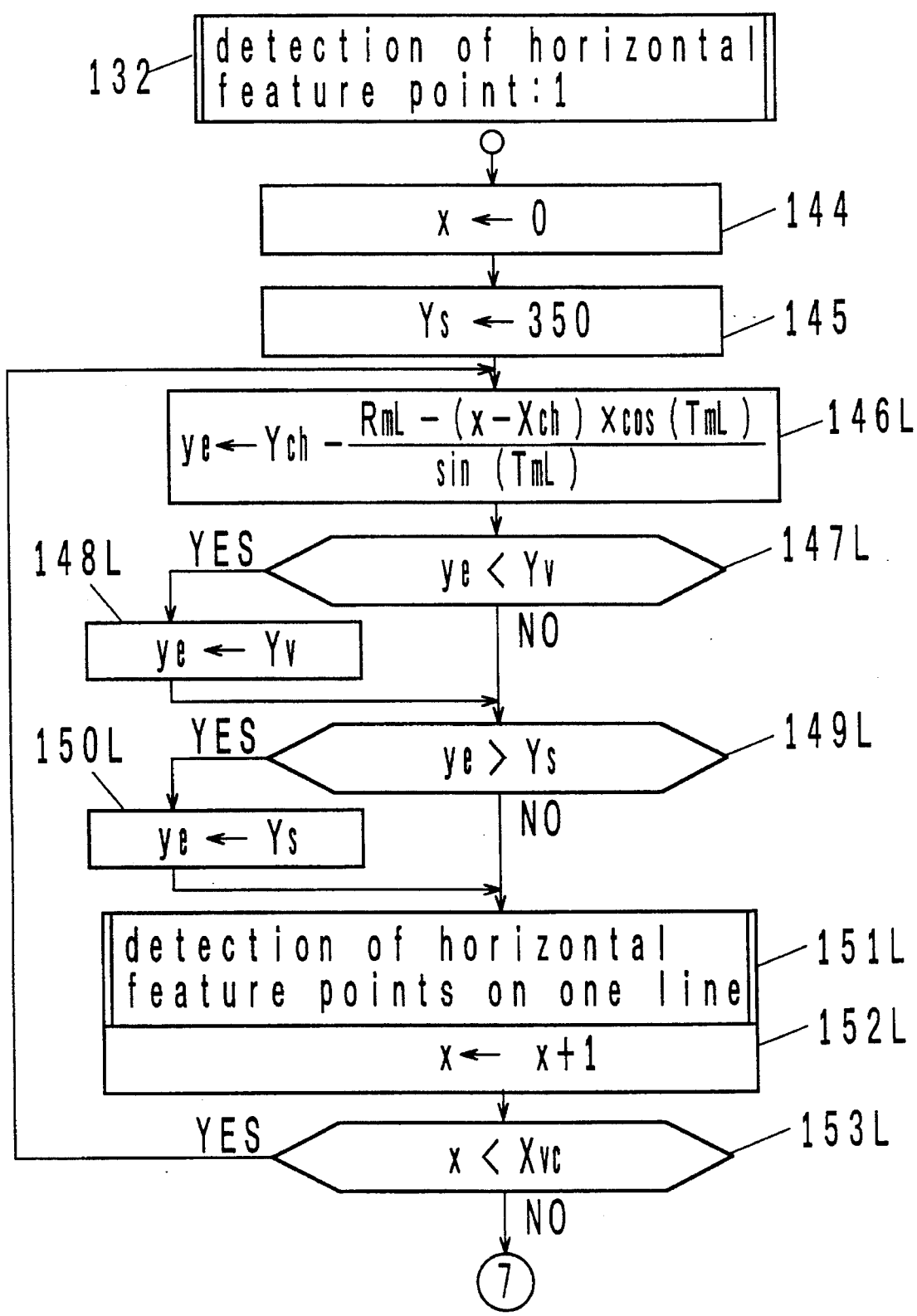
FIG. 31a is a flow chart showing part of "detection of horizontal feature point 1" 132 shown in FIG. 29 in detail.
Figure 31B:
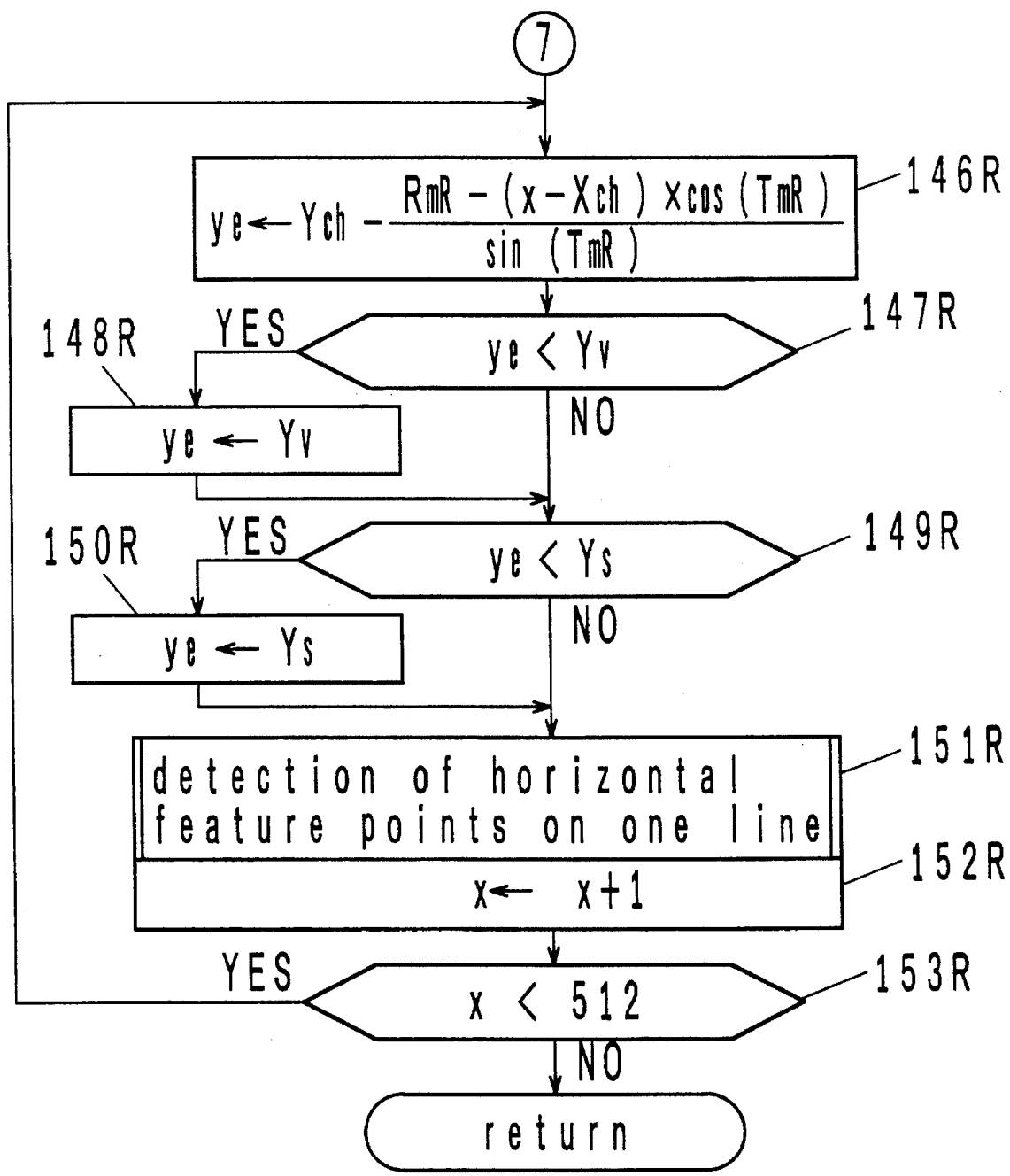
FIG. 31b is a flow chart showing the remainder of "detection of horizontal feature point" 132 shown in FIG. 29 in detail.
Figure 32A:
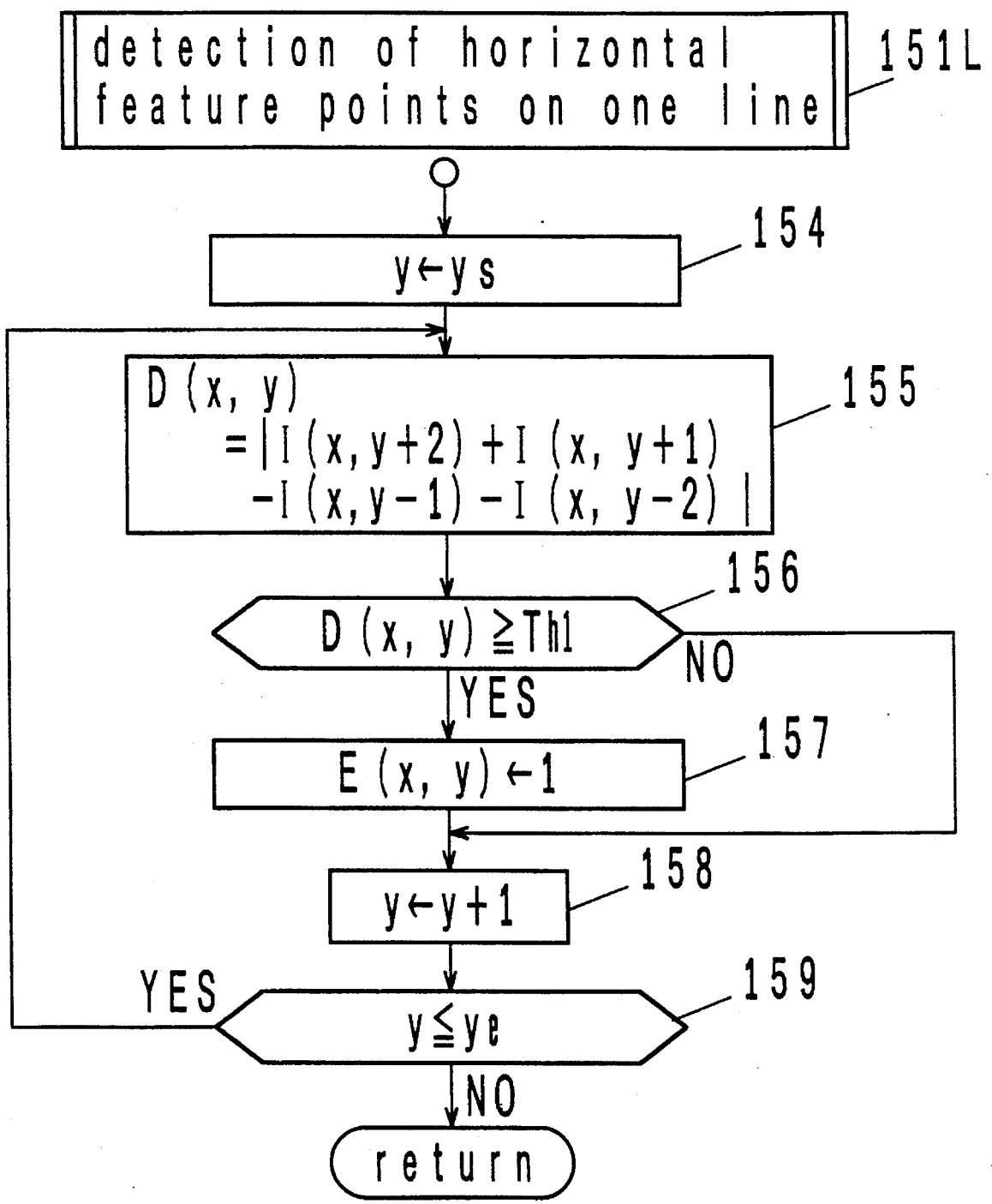
FIG. 32a is a flow chart showing "detection of one line horizontal feature point" 151L shown in FIG. 31 in detail.
Figure 32B:
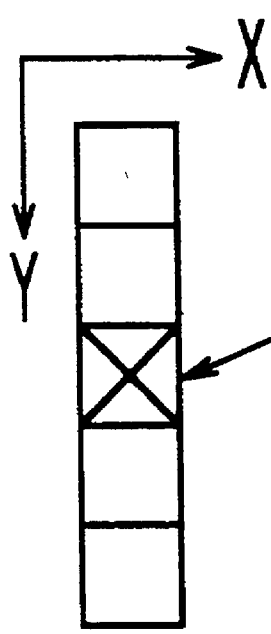
FIG. 32b is a schematic illustration of a point in question marked by X or a picture element being calculated and reference points shown as squares in white or reference picture elements, which are used when calculating the derivative of image data in the Y direction on the corrected screen which is obtained by the "interpolation" C8 shown in FIG. 4 in order to detect a horizontal feature point.
Figure 33:
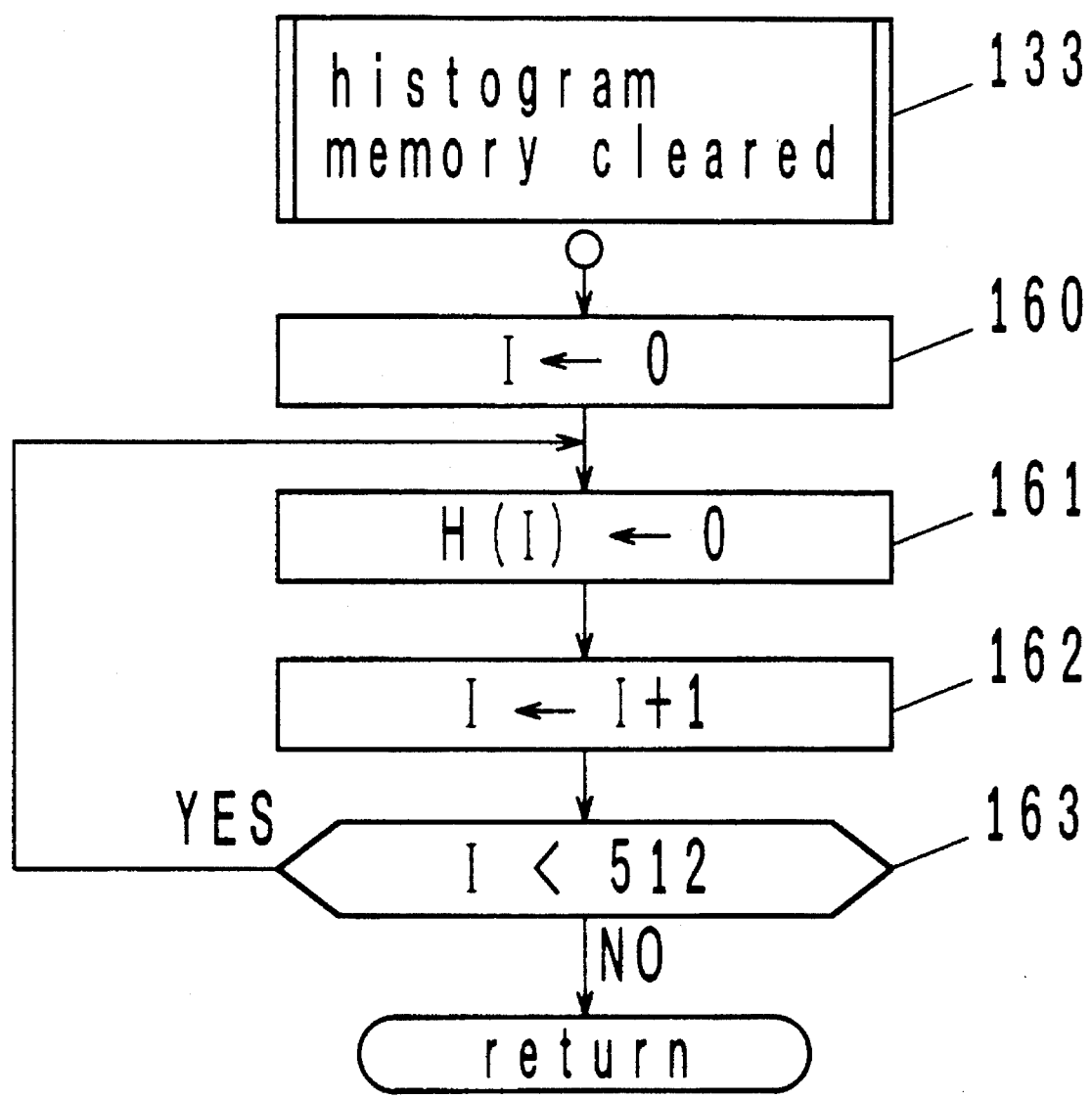
FIG. 33 is a flow chart showing "clearing histogram memory" 133 shown in FIG. 29 in detail.

Reference is made to FIGS. 31 and 27. On the screen shown in FIG. 27, the combination of a triangle having the horizontal line Y=350 as a base and having the point of intersection of left and right white lines of one's own vehicle's lane as its apex and another triangle defined by three apices including (Xv, Yv), (Xvc, Yv) and a point of intersection with either left or right white line of a line extending parallel to the Y axis from the point (Xvc, Yv) defines one's own vehicle's lane region. A subregion to the left of a line extending parallel to the Y axis and defined by X=Xvc is considered. The interior of this subregion is scanned in the Y direction from bottom to top. Such scan is repeated while updating the X position (steps 146L to 150L and steps 152L to 153L in FIG. 31) in order to calculate the derivative in the Y direction of image data contained in the corrected image memory, and a point having a derivative value equal to or greater than a threshold value is detected as a feature point (step 151L). In this manner, "detection of horizontal feature point on one is line" 151L is executed. Its detail is shown in FIG. 32. The processing operation 151L is similar to "detection of feature point (UP)" C2 described above in connection with FIG. 6, and therefore will not be specifically described.

Next, a subregion of one's own vehicle's lane region which is located to the right of a line extending parallel to the Y axis and defined by X=Xvc is considered. The interior of this subregion, inclusive of X=Xvc, is scanned in a Y direction from bottom to top. Such scan is repeated while updating the X position (steps 146R to 150R and steps 152R to 153R in FIG. 31) in order to calculate the derivative in the Y direction of image data contained in the corrected image memory, and a point having a derivative value equal to or greater than a threshold value is detected as a feature point (step 151R).

As a result of the detection of feature points in one's own vehicle's lane region, the binary data memory E(x, y) has "1" written thereunto at an address corresponding to the feature point. Since the binary data memory E(x, y) is previously cleared at the "clearing feature point memory" 131 (writing "0" into all addresses), the binary data memory E(x, y) will have "1" written only at addresses which correspond to the feature points in one's own vehicle's lane region. CPU 1 then clears a histogram memory (step 133 in FIG. 29) in a manner indicated in detail in FIG. 33. CPU 1 then performs "formulation of y-direction histogram" 134, the detail of which is shown in FIG. 34.

Figure 34:
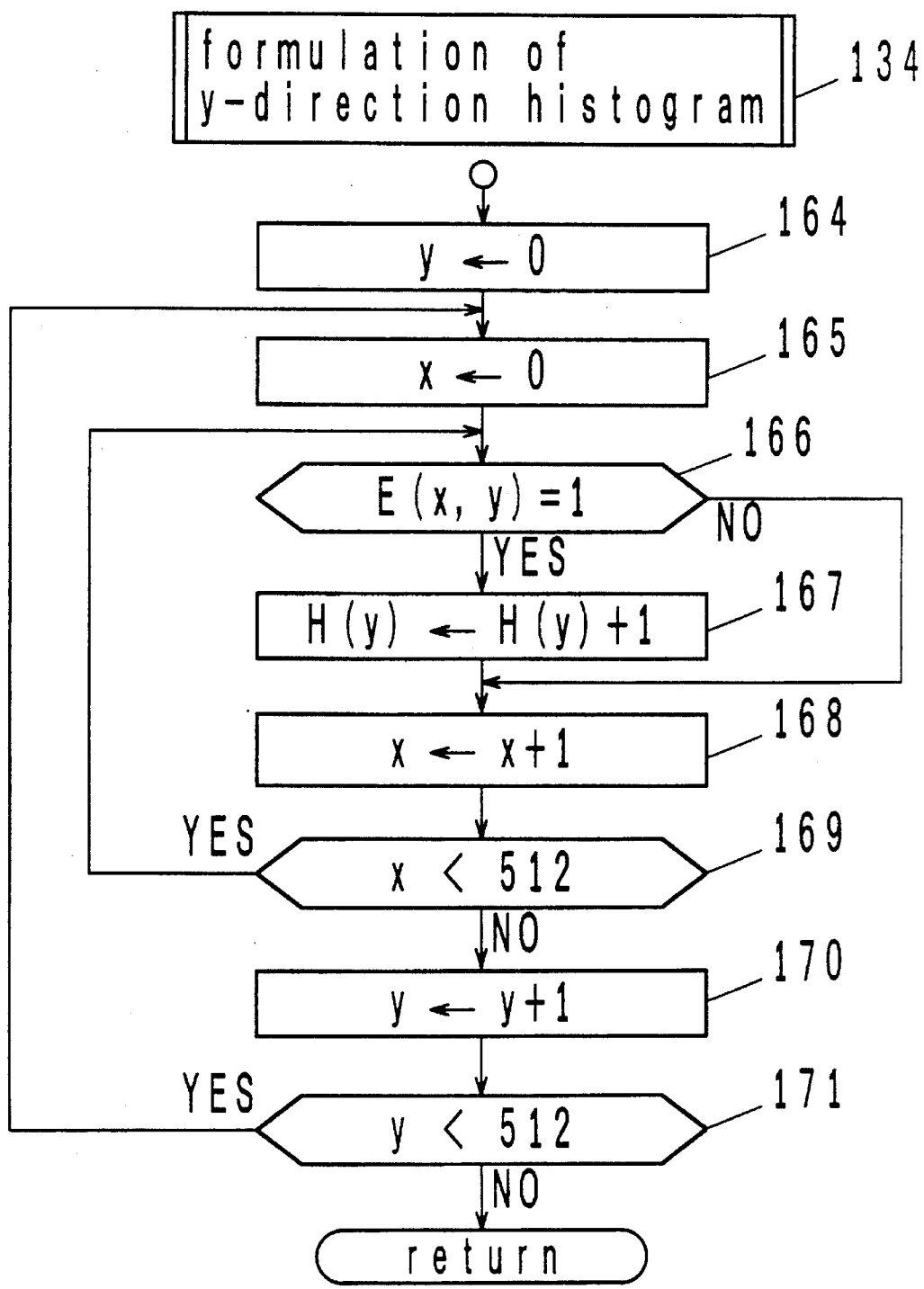
FIG. 34 is a flow chart showing "formulation of Y direction histogram" 134 shown in FIG. 29 in detail.

"Formulation of y-direction histogram" 134 (FIG. 34).

The number of "1"'s (feature points) on each of the lines extending parallel to the X-axis and defined by Y=0 to Y=511 (which can be called as X scan lines; namely, a succession of picture elements in the X direction) on the binary data memory E(x, y) is counted, and the count obtained is written into a histogram memory H(y) at a Y address corresponding to each scan line.

Figure 35:
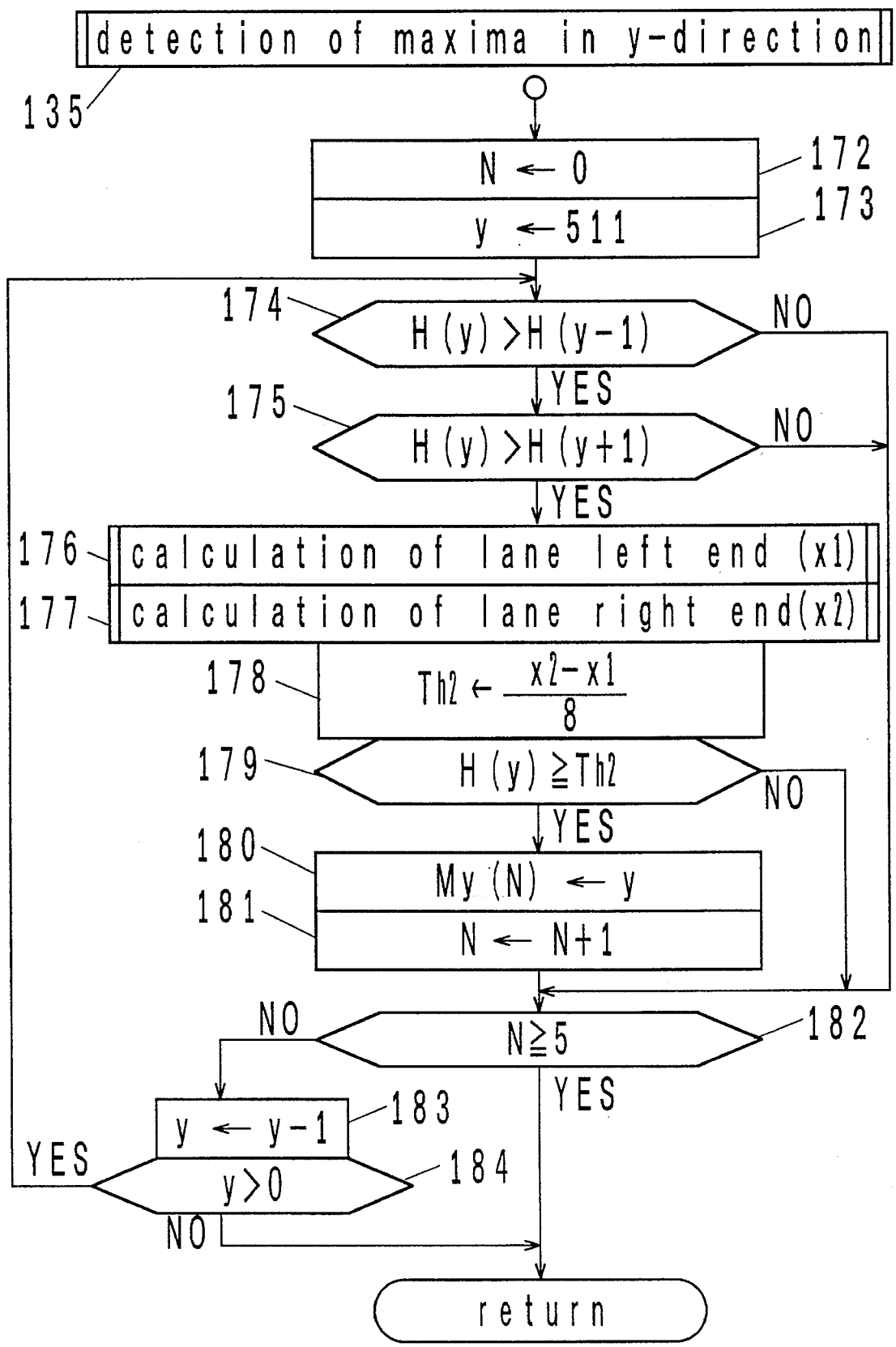
FIG. 35 is a flow chart showing "detection of local maxima in Y direction" 134 shown in FIG. 29 in detail.

"Detection of maxima in y direction" 135 (FIG. 35)

Figure 36A:
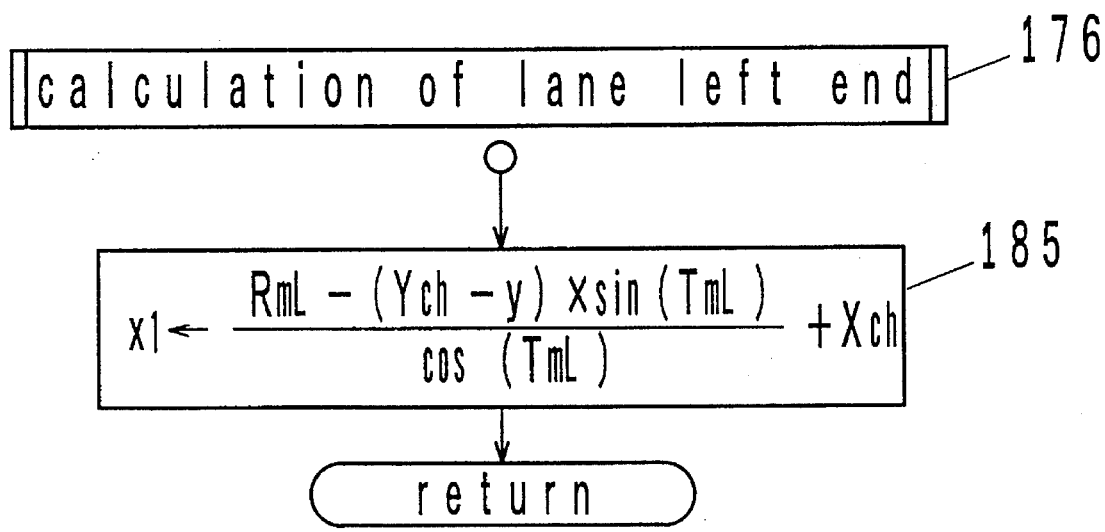
FIG. 36a is a flow chart showing "detection of left-hand lane end" 176 shown in FIG. 35 in detail.
Figure 36B:
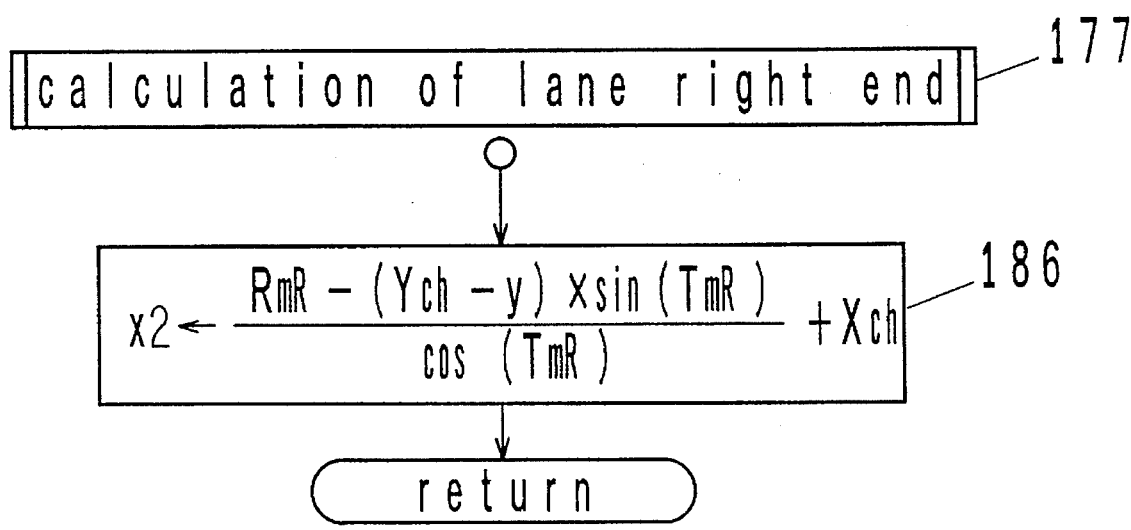
FIG. 36b is a flow chart showing "detection of right-hand lane end" 177 shown in FIG. 35 in detail.

Beginning with an address Y=511 in the histogram memory H (y) and continuing sequentially until Y=1 is reached, the count H(y) of a particular line (y) in question is compared against the count H(y−1) on the scan line (y−1) at an address which is by one less and the count H(y+1) on another scan line (y+1) having an address which is by one greater (steps 174 and 175 in FIG. 35). When H(y) is greater than both H(y−1) and H(y+1), indicating that the line (y) in question represents a peak position of the count, the left end point (X1) and the right end point (X2) of the own vehicle's lane at the Y address corresponding to the line (y) in question are calculated (steps 176 and 177; the formula for calculation is shown in FIG. 36). A threshold value Th2 is chosen to be equal to (X2−X1)/8 (step 178), and if the count H(y) on the line (y) in question is equal to or greater than the threshold Th2, it is assumed that there is an image contour line which extends laterally on the line (y) in question. The address (Y coordinate) of the is line (y) in question is written into a memory My(N) at an address N (step 180). A register N is then incremented by one. When the register N has a value equal to or greater than 5, indicating that an image contour line has been detected on six different scan lines, or upon completion of the described operation with respect to the last scan line Y=1, the "detection of maxima in y direction" 135 is completed.

It will be seen from FIG. 16 that when a vehicle is running ahead on one's own vehicle's lane, the image of the rear portion of the vehicle running ahead will appear within the window 2. The image of the rear portion includes a number of horizontally extending image contour lines such as those of a bumper, the lower edge of which appear as a horizontal line exhibiting a high contrast, a number plate, a brake lamp panel, a rear window, a roof or the like. Accordingly, the positions or Y coordinates of six image contour lines which are closest to one's own vehicle or having greater Y coordinate values will have been written into the memory My(N) at addresses 0 to 5.

It is to be understood that the threshold Th2 is chosen to be equal to (X2−X1)/8 at step 178 in order to modify the threshold value depending on the distance of an image contour lying on the line (y) in question from the camera 6b, which is estimated by (X2−XI), inasmuch as the nearer the image contour line is located with respect to the camera 6b, it exhibits a higher contrast and more feature points are detected while an image contour line is located far exhibits a lower contrast with detection of less feature points.

Figure 37:
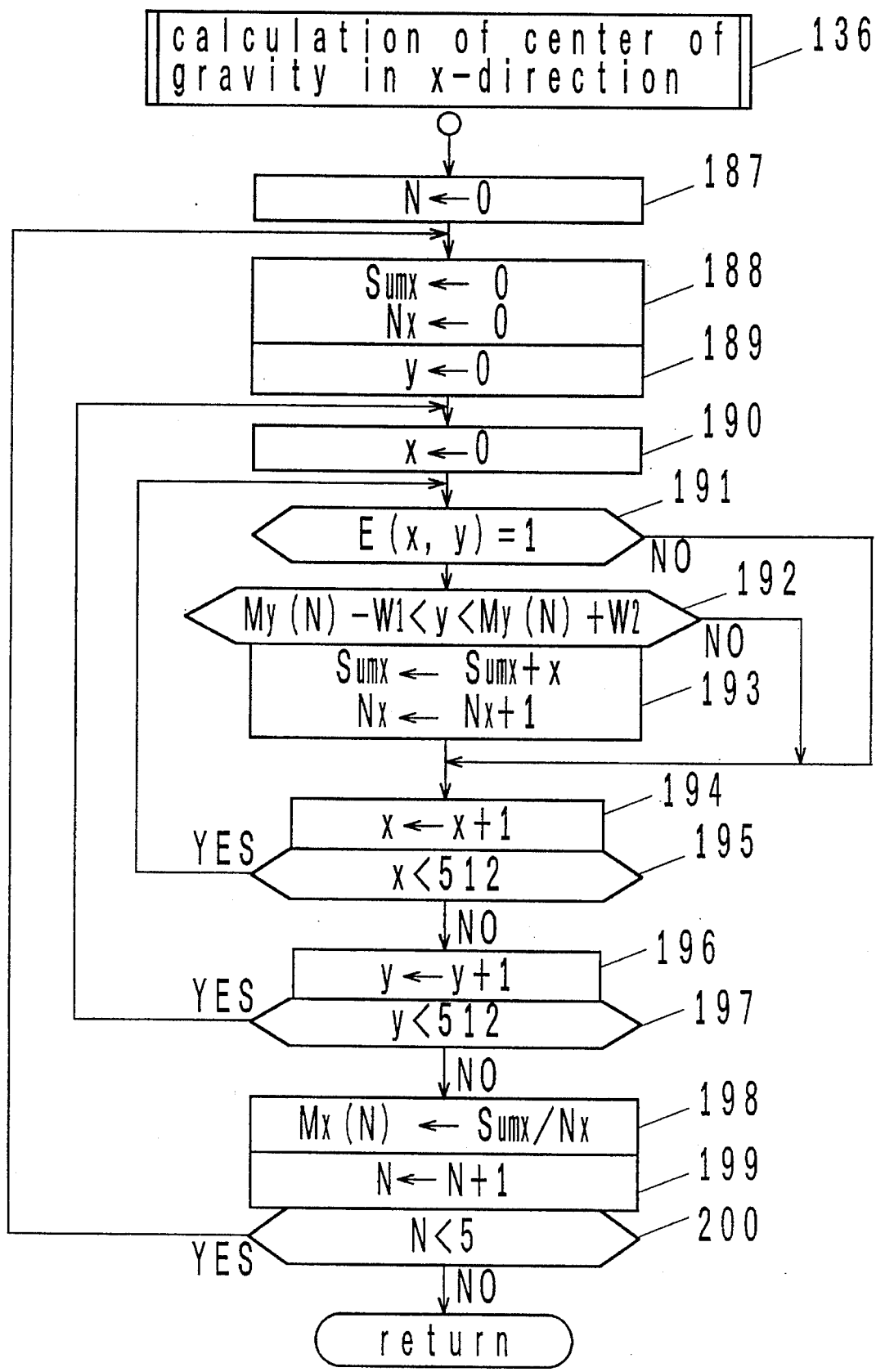
FIG. 37 is a flow chart showing "calculation of center of gravity in X direction" 136 shown in FIG. 29 in detail.

"Calculation of center of gravity in X direction" 136 (FIG. 37)

For each of the positions (Y coordinate values) of the image contour lines written into the memory My(N), the X coordinate values of any feature point in the binary data memory E(x, y) for a region which is defined by a preset value W1 less than and by another preset value W2 greater than that position (namely, a feature point located within the own vehicle's lane region shown hatched in FIG. 27) are added to an accumulation register Sumx. The number of additions is counted by a register Nx (steps 187 to 197) in order to calculate the X coordinate of the center of gravity (or a mean coordinate value) which is then written into a memory Mx(N) (step 198). As a result of this, the position of the center of gravity in the X direction (X coordinate value) for each of the horizontally extending image contour lines detected by in the "detection of maxima in y direction" 135 are contained in the memory Mx(N). It is to be noted that the position representing the center of gravity in the Y direction is contained in the memory My(N).

This completes the "detection of candidate vehicle position" H1 shown in FIG. 28 (and the detail of which is shown in FIG. 29). The CPU 1 then clears register NR for later use (H2), and executes "detection of lateral ends of vehicle" H3, the detail of which is shown in FIG. 38.

H3. "Detection of lateral ends of vehicle" H3 (FIG. 38)

Initially, "estimation of lateral end positions of vehicle" 201 is executed. The detail of this estimation is shown in FIG. 39.

Figure 39:
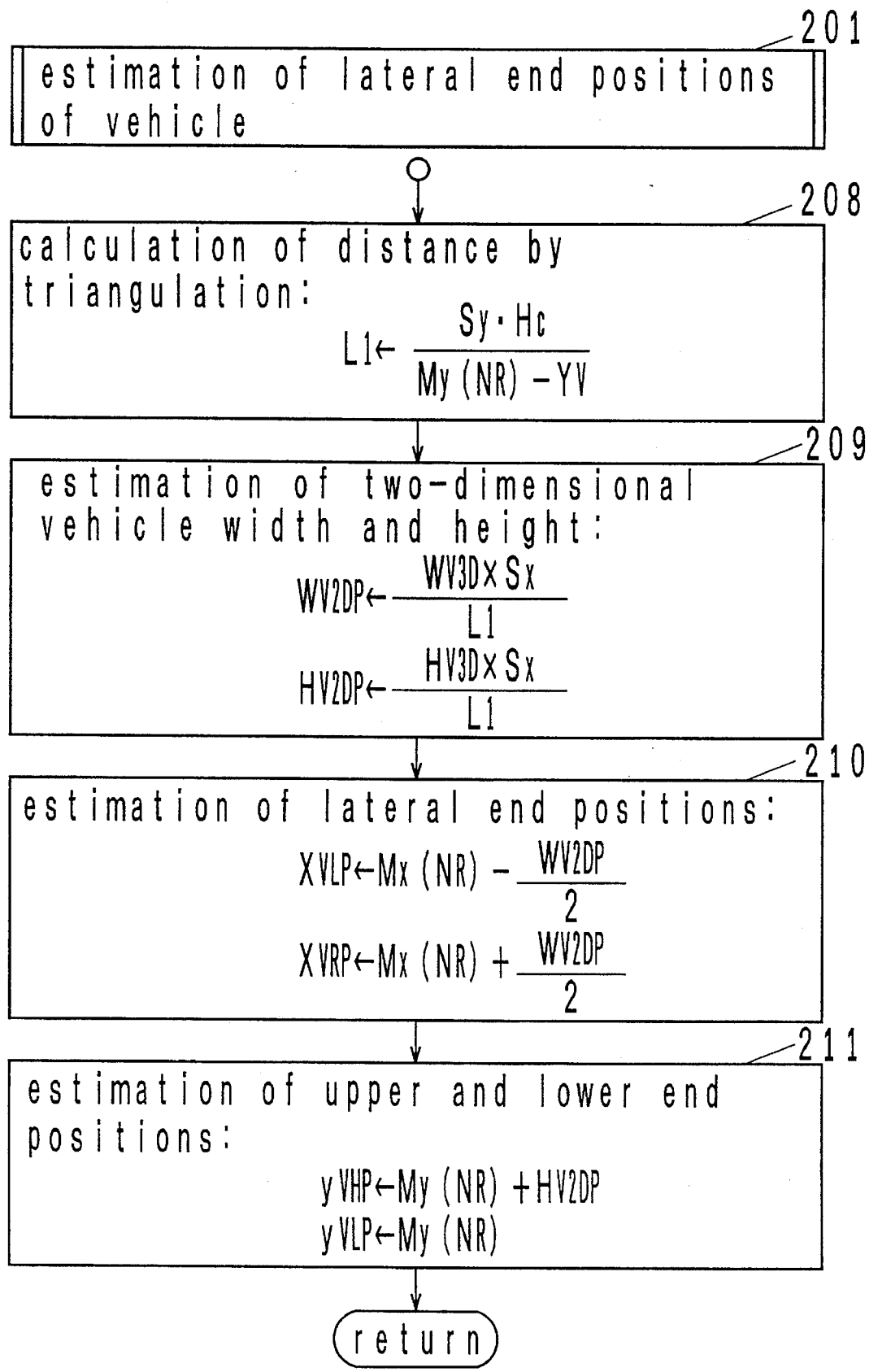
FIG. 39 is a flow chart showing "estimation of lateral end positions of vehicle" 201 shown in FIG. 38 in detail.

"Estimation of lateral end positions of vehicle" 201 (FIG. 39)

Data My(NR) having the greatest Y coordinate value among the image contour lines which are contained in the memory My(N) (data at an address N=NR=0), or the Y position of the image contour line which is located closest to the own vehicle is read out, and the horizontal distance L1, or the distance measured along the road surface from the camera to that position is calculated (step 208). Assuming that the image contour line is that of a vehicle located ahead (the correctness or falseness of this assumption will be verified in "verification of vehicle" H4, to be described later), the vehicle width Wv2Dp and vehicle height Hv2Dp on the screen are calculated (step 209). Wv3D used in this calculation is data stored in a register Wv3D (to be described later with reference to FIG. 46) which stores a learned vehicle width value (exemplified by a width 1.7 m of a typical vehicle unless a vehicle running ahead has not ever been detected). Hv3D represents a vehicle height of 1.2 m which also covers a mini-car. Using the vehicle width Wv2Dp on the screen and the position of the center of gravity of the image contour line Mx(NR) stored in the memory Mx(N), left and right end positions XvLp, XvRp of the object recognized ahead on the screen are calculated by estimation (step 210). Also, upper and lower ends yvHp, yvLp on the screen are also calculated by estimation (step 211).

Figure 40:
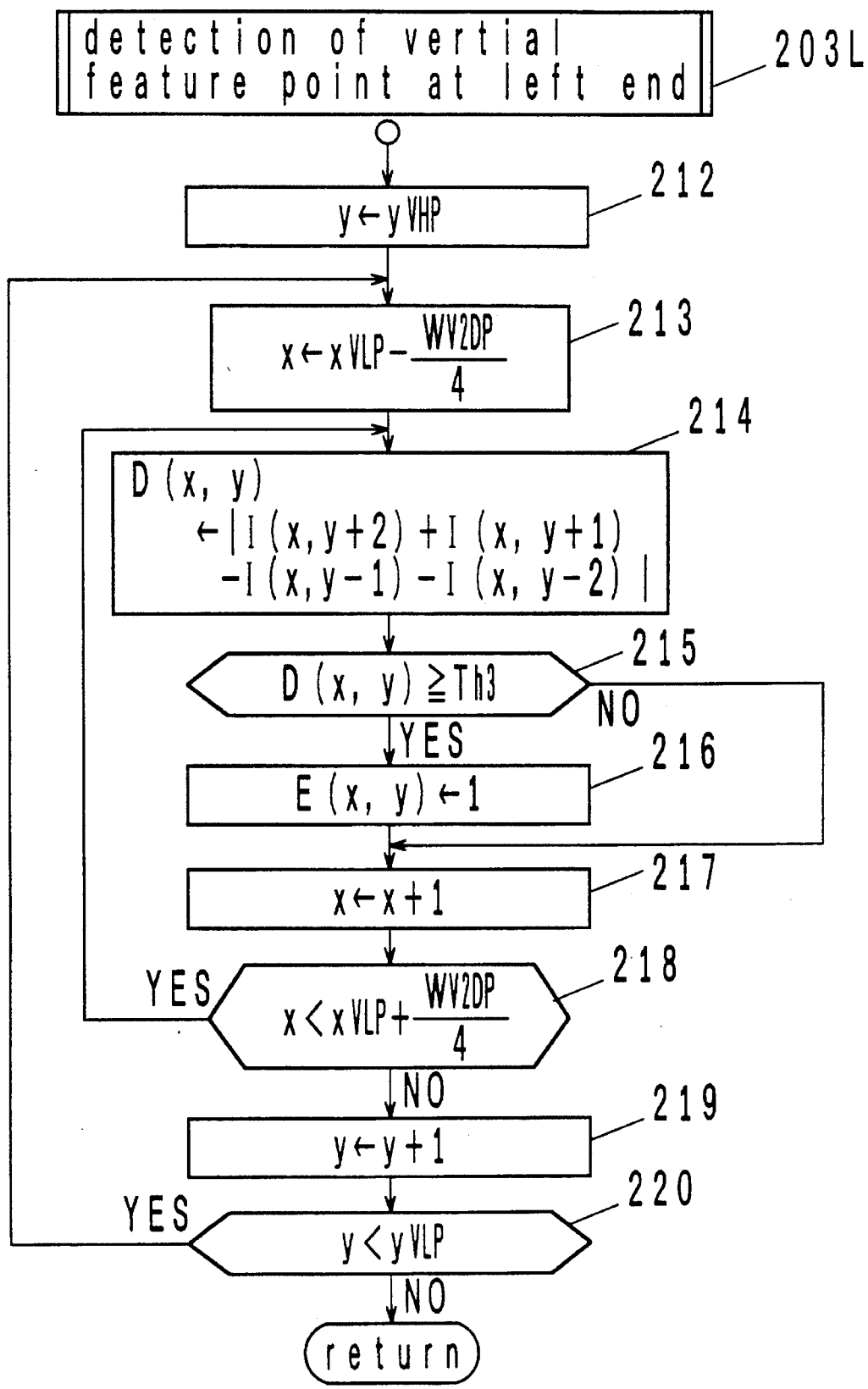
FIG. 40 is a flow chart showing "detection of vertical feature point along left end" 203L shown in FIG. 38 in detail.

Then, the gradation data memory D(x, y) and the binary data memory E(x, y) are cleared (step 202L), followed by the execution of "detection of vertical feature point at left end" 203L, the detail of which is shown in FIG. 40.

"Detection of vertical feature point at left end" 203L (FIG. 40)

A derivative in the Y direction of the image data in the corrected image memory for a region centered about the left end position XvLp on the screen and having a width ±Wv2Dp/4 located between the upper and lower ends yvHp, yvLp on the screen is calculated and is written into the gradation data memory D(x, y). The gradation data is compared against a threshold value Th3, and if it is equal to or greater than Th3, "1" is written into the binary data memory E(x, y). This detection of the feature point is processed in the similar manner as in the "detection of feature point (UP)" C2. CPU 1 then clears the histogram memory H(y) (step 204L), and then executes "formulation of x-direction histogram" 205L, the detail of which is shown in FIG. 41.

Figure 41:
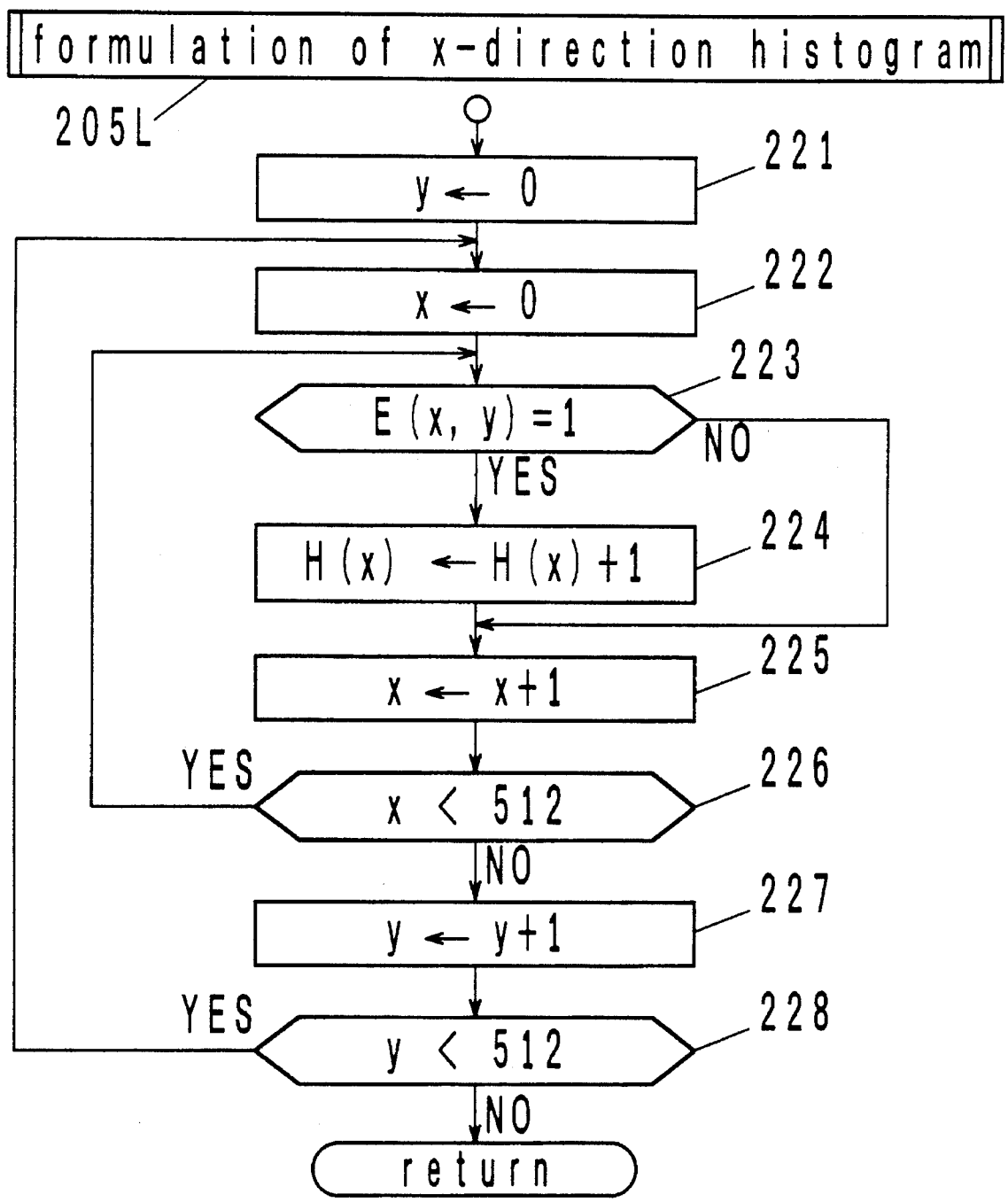
FIG. 41 is a flow chart showing "formulation of histogram in X direction" 205L shown in FIG. 38 in detail.

"Formulation of x-direction histogram" 205L (FIG. 41)

Feature points on a line extending parallel to the Y axis (a succession of picture elements) in a region detected in the "detection of vertical feature point at left end" 203L are counted on the line by line basis. The count is written into a histogram memory H(x) in accordance with the line address or X coordinate. Then the "detection of maximum point in x direction" 206L is executed, the detail of which is shown in FIG. 42.

Figure 42:
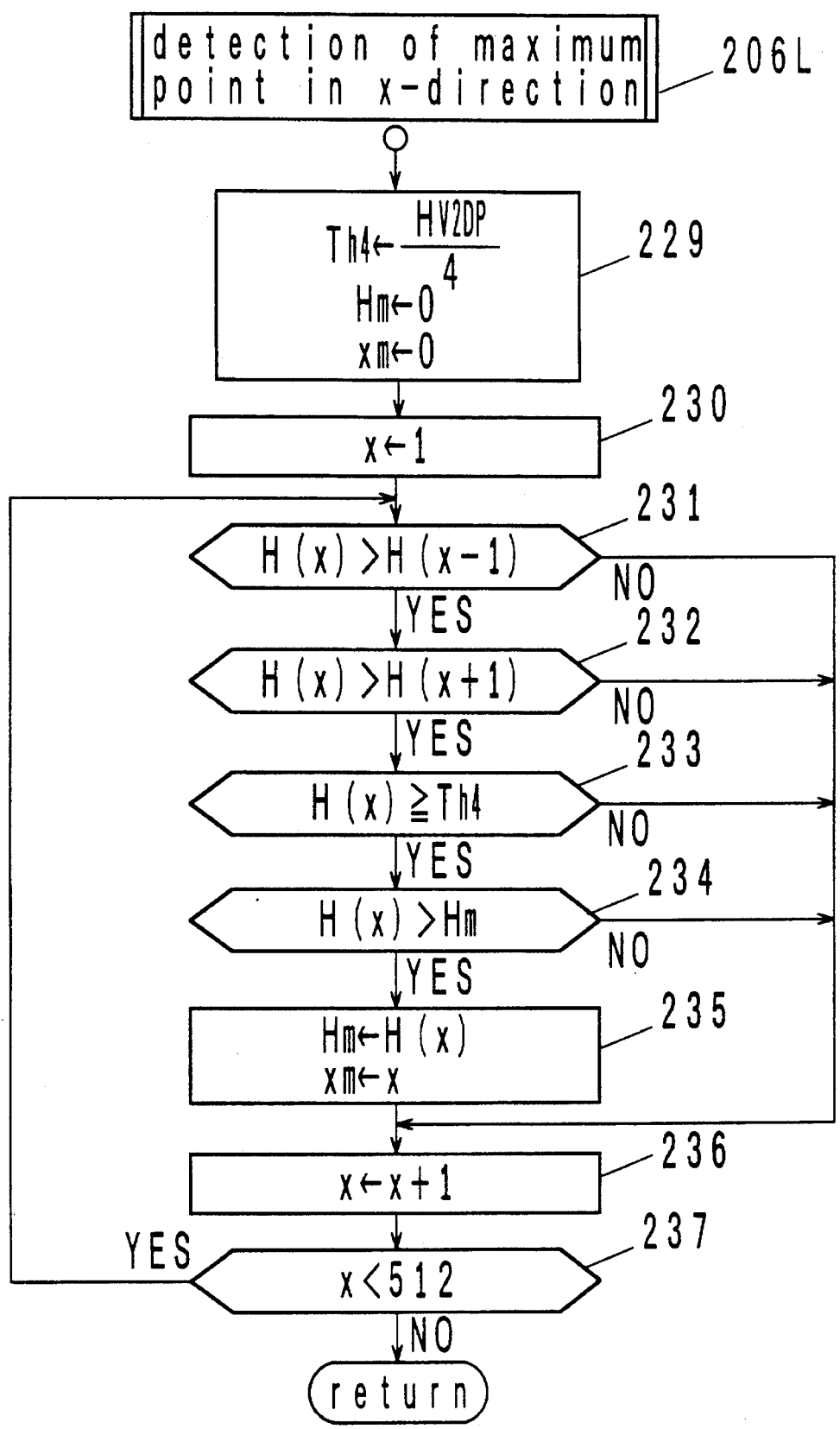
FIG. 42 is a flow chart showing "detection of maximum in X direction" 206L shown in FIG. 38 in detail.

"Detection of maximum point in x direction" 206L (FIG. 42)

This processing operation is generally similar to that of the "detection of maxima in y direction" 135 mentioned previously, but in which the Y axis is replaced by the X axis, and the detection is applied to a region in which feature points have been detected in the "detection of vertical feature point at left end" 203L. Specifically, since this region is narrow, a threshold value Th4 which is used to pick out maxima is a fixed value equal to Hv2Dp/4, and every time one of the maxima is detected, the count of feature points at such maxima is compared against data stored in a maxima memory Hm. If the detected maxima is greater, it is written into the maxima memory Hm to update it, and its X coordinate is written into a maxima point register Xm. When this processing operation has covered the entire region, the X coordinate of the line extending parallel to the Y axis, which means the left edge of the vehicle running ahead, on which there are a maximum number of feature points, will have been stored in the register Xm. This X coordinate is written into vehicle left end position register XvL (step 207L).

Figure 43:
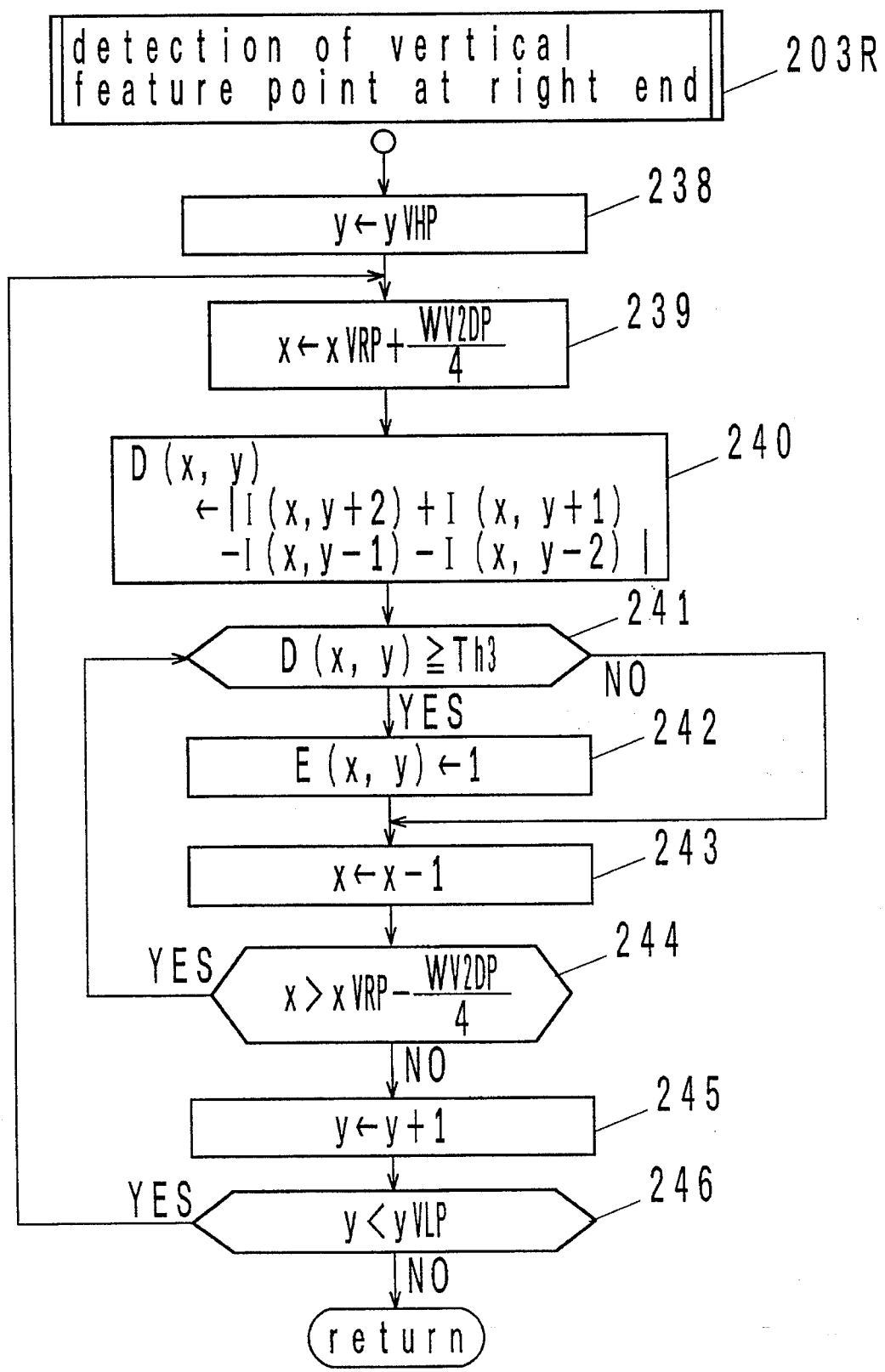
FIG. 43 is a flow chart showing "detection of vertical feature point along right end" 203R shown in FIG. 38 in detail.

A processing operation similar to that including the "clearing feature point memory" 202L to the "detection of maximum point in x direction" 206L is applied to a region centered about the right end position XvRp and having width of±Wv2Dp/4 and located between the upper and lower ends yvhp, yvlp on the screen (steps 202R to 206R in FIG. 38). The X coordinate of a line extending parallel to the Y axis on which there are a maximum number of feature points in the region (representing the right edge of a vehicle running ahead) is written into a vehicle right end position register XvR (step 207R). The detail of the "detection of vertical feature point at right end" 203R is shown in FIG. 43.

Figure 44:
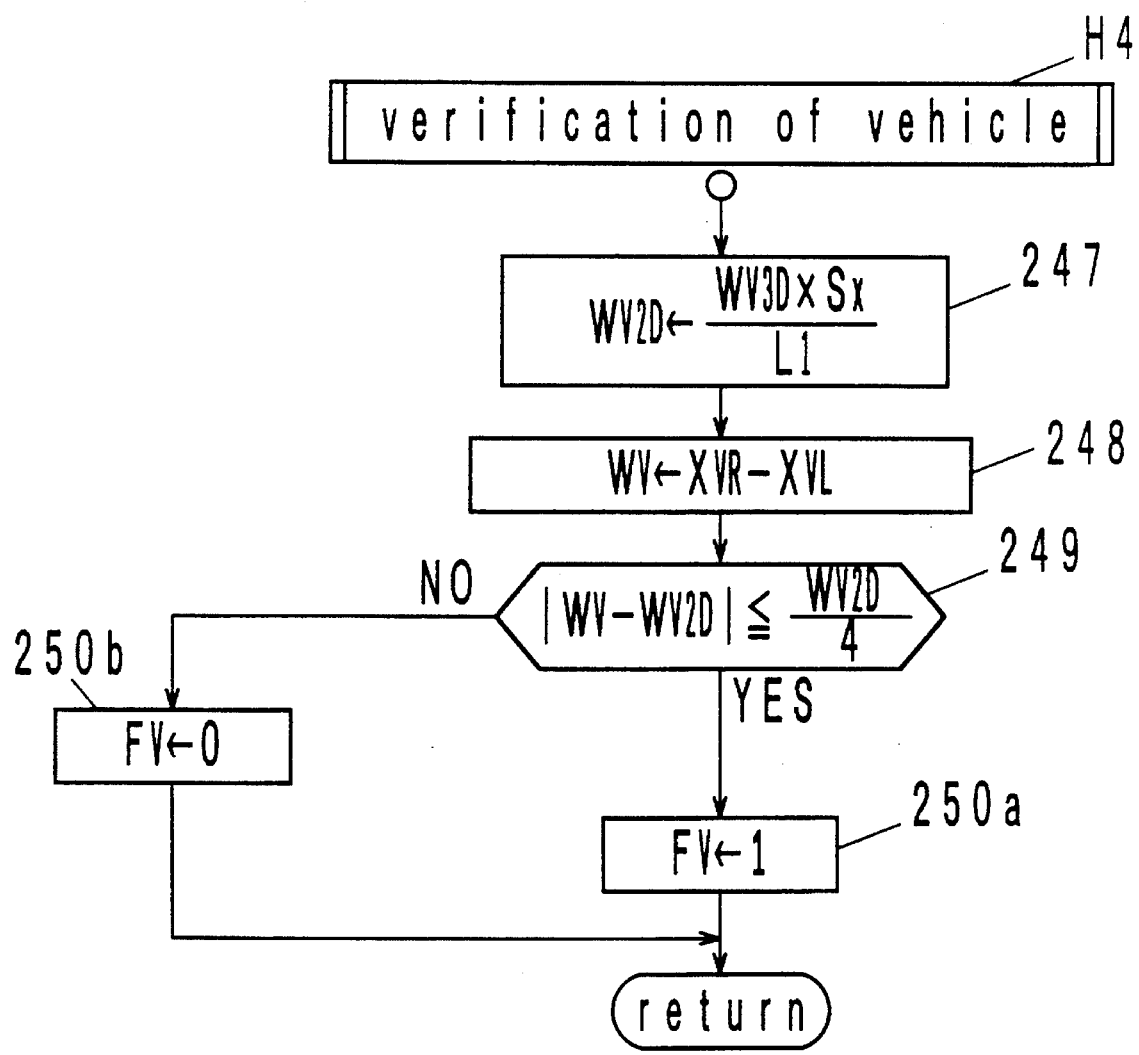
FIG. 44 is a flow chart showing "verification of vehicle" H4 shown in FIG. 28 in detail.

The above completes the "detection of lateral ends of vehicle" H3. CPU 1 then executes "verification of vehicle" H4, the detail of which is shown in FIG. 44.

H4. "Verification of vehicle" H4 (FIG. 44)

Here, the vehicle width Wv3D of the vehicle running ahead which is held in the register Wv3D storing the learned vehicle width value (to be described later with reference to FIG. 46) is converted into a vehicle width Wv2D on the screen using the distance L1 from one's own vehicle to the vehicle running ahead. The distance L1 has been calculated by the "estimation of lateral end positions of vehicle" 201 and the scale factor Sx of the camera 6b (step 247), and the vehicle width Wv on the screen is calculated from the lateral end positions XvL, XvR of the vehicle mentioned previously (step 248). Then, an examination is made to see if the difference therebetween Wv−Wv2D is within the range±Wv2D/4 (step 249). Specifically, this examination determines if the calculated vehicle width Wv on the screen substantially matches the width Wv2D on the screen or the actual width in the register Wv3D which stores the learned vehicle width value. If a substantial match is found, "1" is written into a register Fv which stores either a "1" or "0" indicating a detection or non-detection of any vehicle running ahead (step 250a). If match is not found, the register Fv is cleared (step 250b).

CPU 1 then proceeds to "calculation of distance between vehicles" H6, to be described later, if "1" has been written into the register Fv, but increments register NR by one (H5–H8–H9) and again executes the "detection of lateral ends of vehicle" H3 if "0" has been written into the register FV. In the initial run of the "detection of lateral ends of vehicle" H3, the execution begins with NR=0, indicating a horizontal contour line located closest to one's own vehicle. In the second and subsequent run of the "detection of lateral ends of vehicle" H3, NR is changed to 1, 2, ..., and accordingly, the horizontal contour line which is subject to the detection is sequentially changed to one which is located further and further from one's own vehicle. Since the maximum value of NR is 5 (it is to be noted that only five horizontal contour lines are detected in FIG. 35 for N=0 to 4), the "detection of lateral ends of vehicle" H3 is executed for five times at most. If the register Fv still does not have "1" therein, CPU 1 proceeds to "learning calculation of vehicle width" H7, thus bypassing "calculation of distance between vehicles" H6 which will be described next.

Figure 45:
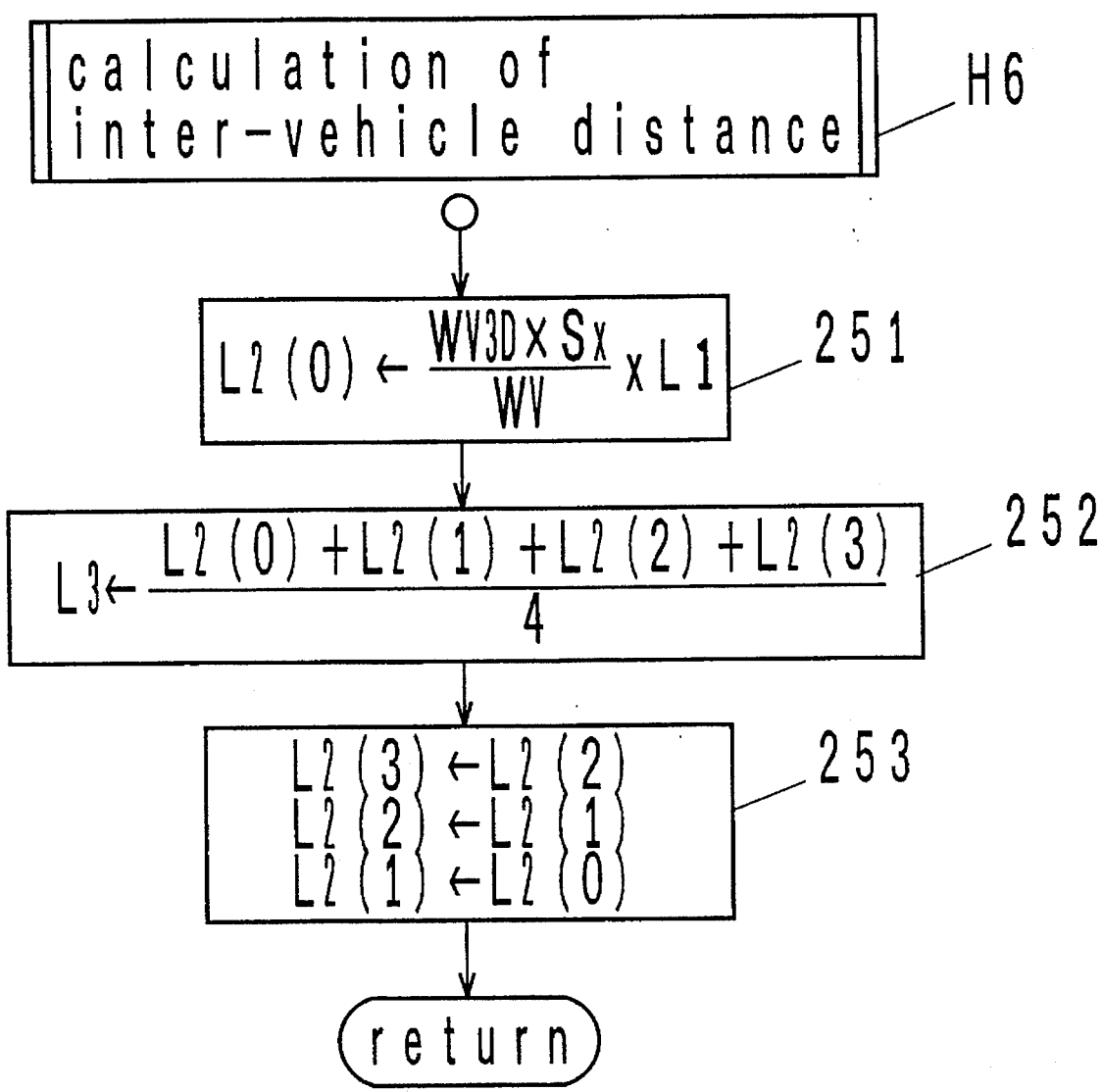
FIG. 45 is a flow chart showing "calculation of distance between vehicles" H6 shown in FIG. 28 in detail.

H6. "Calculation of distance between vehicles" H6 (FIG. 45)

When "1" has been written into the register Fv, an inter-vehicle distance L2(0) is calculated (step 251). The inter-vehicle distance L2(0) is calculated using the actual width Wv3D in the register Wv3D which stores a learned vehicle width value, a calculated value of vehicle width on the screen Wv, a horizontal distance L1 of an object located ahead as measured from one's own vehicle (actual distance along the road) as calculated by the "estimation of lateral end positions of vehicle" 201 and the scale factor Sx of the camera 6b (step 251). The calculated value L2(0) of the present run, the calculated value of the preceding run L2(1), the calculated value of the second preceding run L2(2), and the calculated value of the third preceding run L2(3) are used to derive a mean value, which is written into a register L3 (step 252), thus updating the preceding value L2(1), the second preceding value L2(2) and the third preceding value L2(3) (step 253). As a result of this, the register L3 will have stored therein the inter-vehicle distance to any vehicle running ahead on one's own vehicle's lane, which is a mean value averaged over the latest time sequence.

Figure 46:
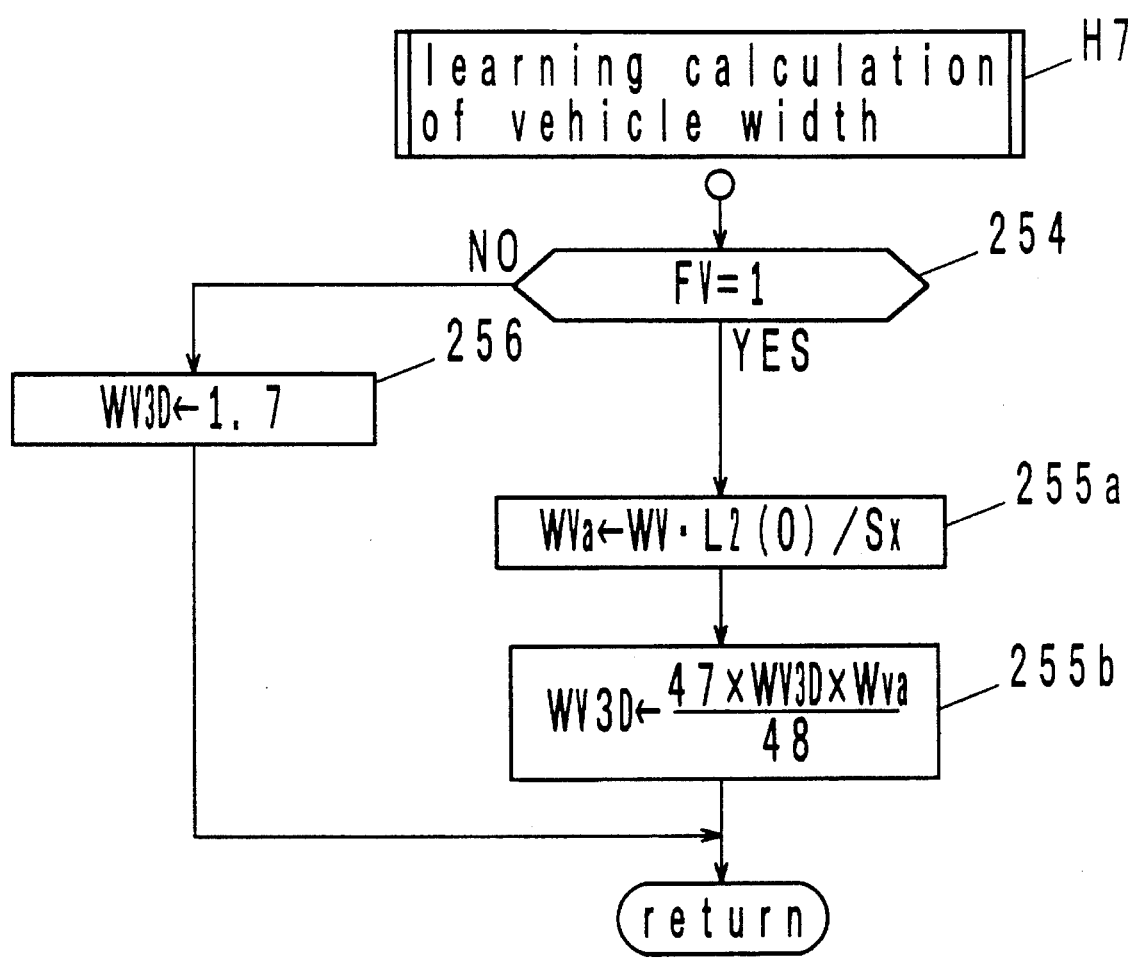
FIG. 46 is a flow chart showing "learning calculation of vehicle width" H7 shown in FIG. 28 in detail.

H7. "Learning calculation of vehicle width" H7 (FIG. 46)

When the inter-vehicle distance in the register L3 has been updated in the manner mentioned just above, CPU 1 converts the vehicle width Wv on the screen into an actual vehicle width Wva. Data in the register Wv3D (the learned vehicle width value Wv3D which is held until the present calculation of the inter-vehicle distance on the time axis) and the calculated vehicle width value Wva of the present run are added together at a weight ratio of 47:1. The sum is divided by 48 to provide a weighted mean value, which is stored to update the register Wv3D (steps 254, 255a and 255b). When the "learning calculation of vehicle width" H7 is entered without previously detecting the presence of any vehicle running ahead on the own vehicle's lane (Fv="0"), the vehicle width of 1.7 m of a most typical vehicle (passenger automobile) is written into the register Wv3D in the present embodiment (steps 254 and 256).

Figure 47:
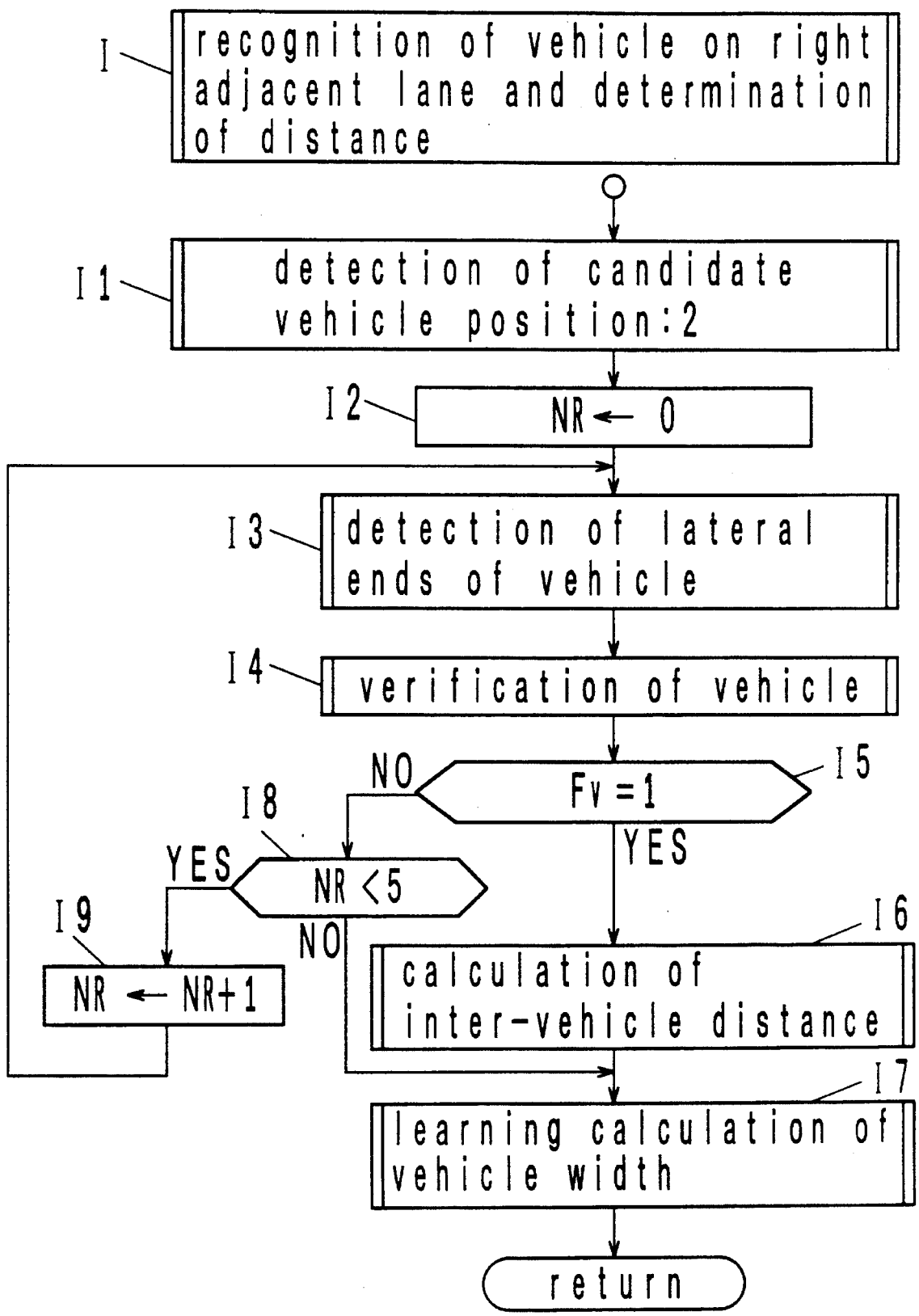
FIG. 47 is a flow chart showing "recognition of vehicle on right-hand adjacent lane and determination of distance" I shown in FIG. 3 in detail.

This completes the "recognition of any vehicle running ahead on the own vehicle's lane and determination of distance" H. CPU 1 then executes "recognition of any vehicle running ahead on the right adjacent lane and determination of distance" I, the detail of which is shown in FIG. 47. However, it is to be noted that during is the "detection of left and right white lines" D3, data (TmR, RmR) indicating the white line at the right end and data (TmL, RmL) indicating the white line at the left end of one's own vehicle are already stored in registers. Also, during the "estimation of adjacent lane" F, data (TmRR, RmRR) indicating (estimated) white line at the right end of the right adjacent lane and data (TmLL, RmLL) indicating (estimated) white line at the left end of the left adjacent lane are already stored in registers.

Figure 48:
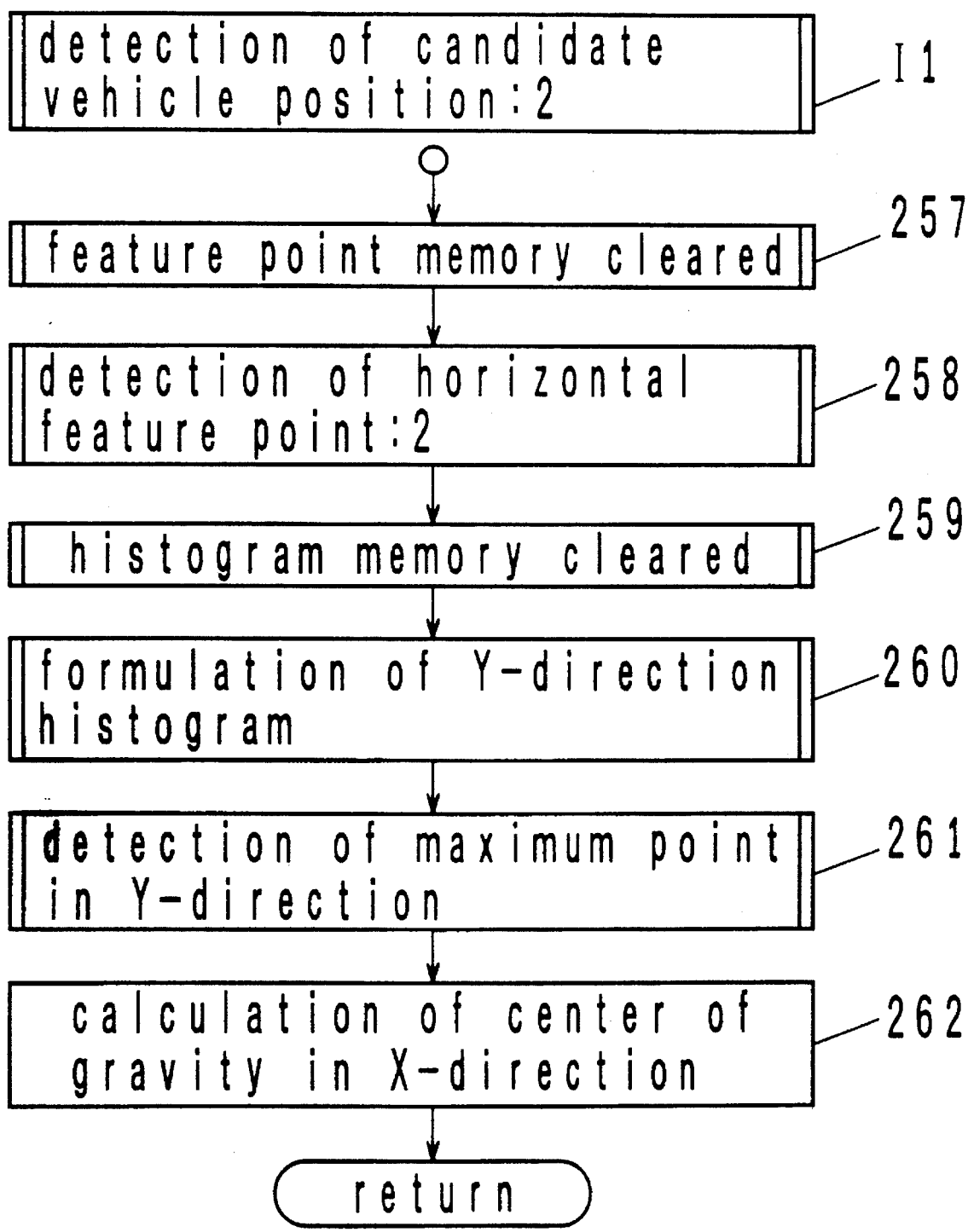
FIG. 48 is a flow chart showing "detection of candidate vehicle position 2" I1 shown in FIG. 47 in detail.
Figure 49:
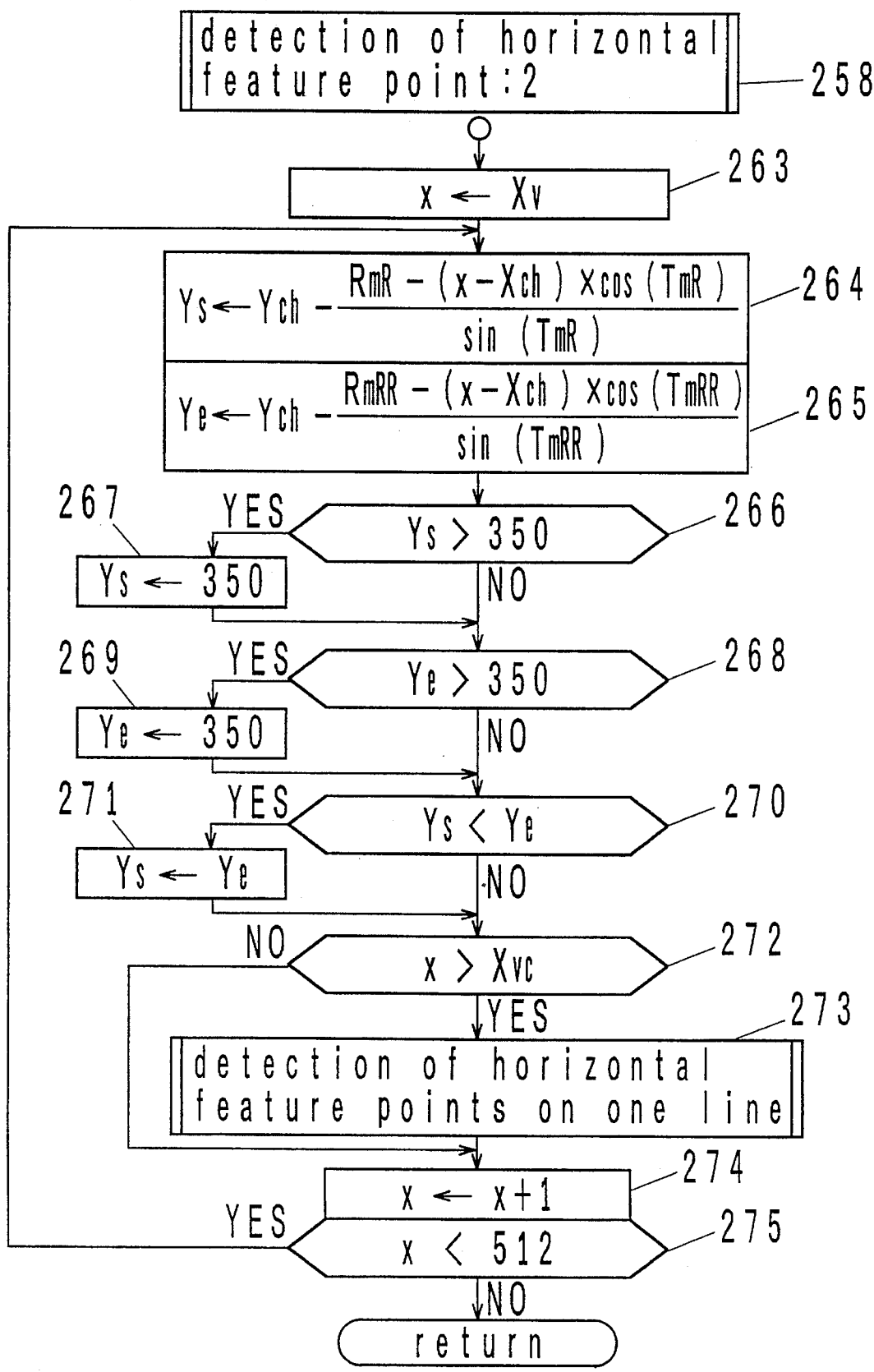
FIG. 49 is a flow chart showing "detection of horizontal feature point 2" 258 shown in FIG. 48 in detail.

I. "Recognition of any vehicle running ahead on the right adjacent lane and determination of distance" I (FIGS. 47, 48 and 49)

A processing operation similar to the "recognition of any vehicle running ahead on one's own vehicle's lane and determination of distance" H mentioned above is applied to the right adjacent lane region, namely, a region defined by the lower side (Y=350) of the window 2, the white line at the right end of the own vehicle's lane (TmR, RmR) and the white line (TmRR, RmRR) at the right end of the right adjacent lane, thereby detecting any object or vehicle which is located ahead of one's own vehicle on the right adjacent region, and the distance thereto from one's own vehicle is calculated.

Figure 50:
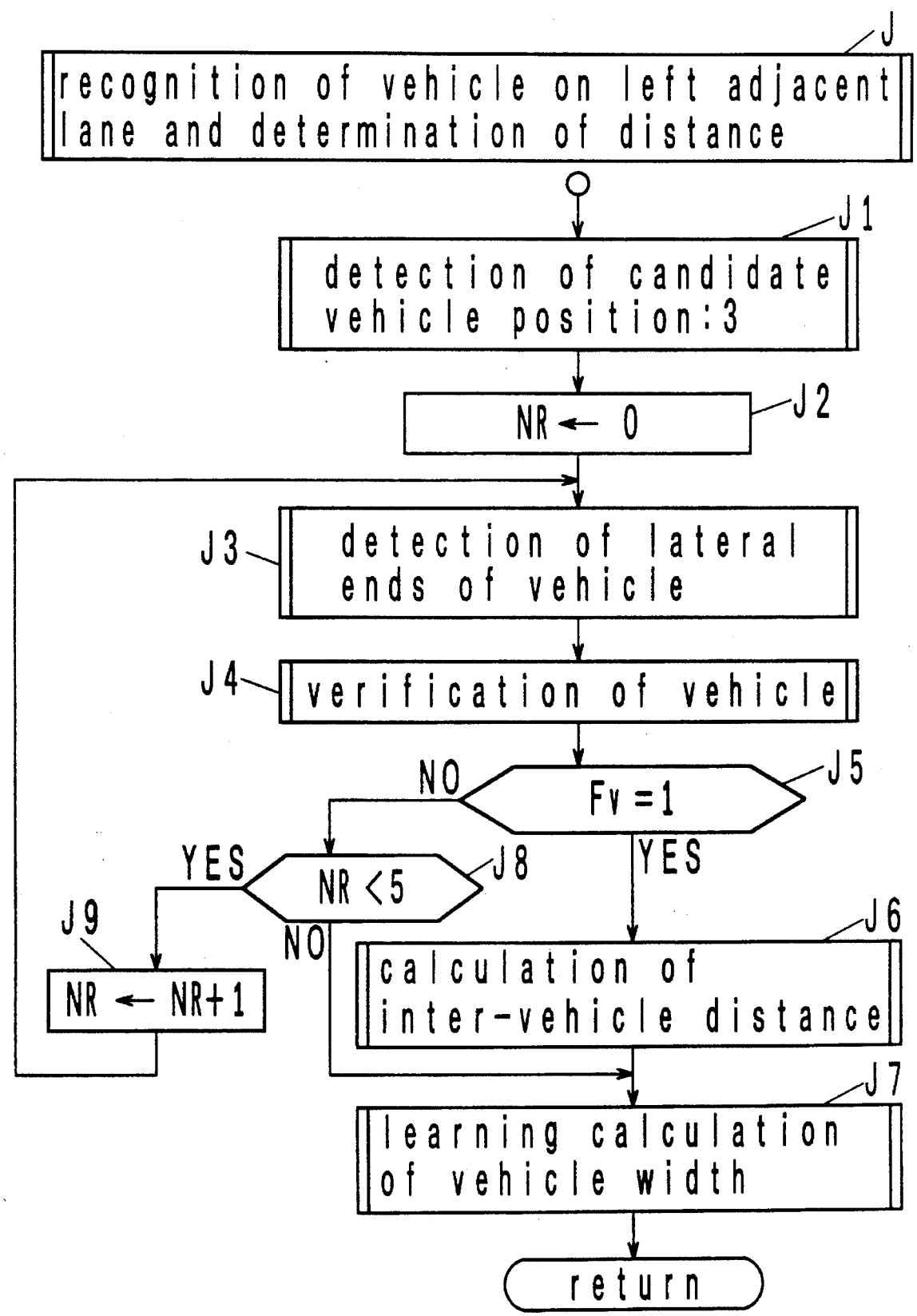
FIG. 50 is a flow chart showing "recognition of vehicle on left-hand adjacent lane and determination of distance" J shown in FIG. 3 in detail.
Figure 51:
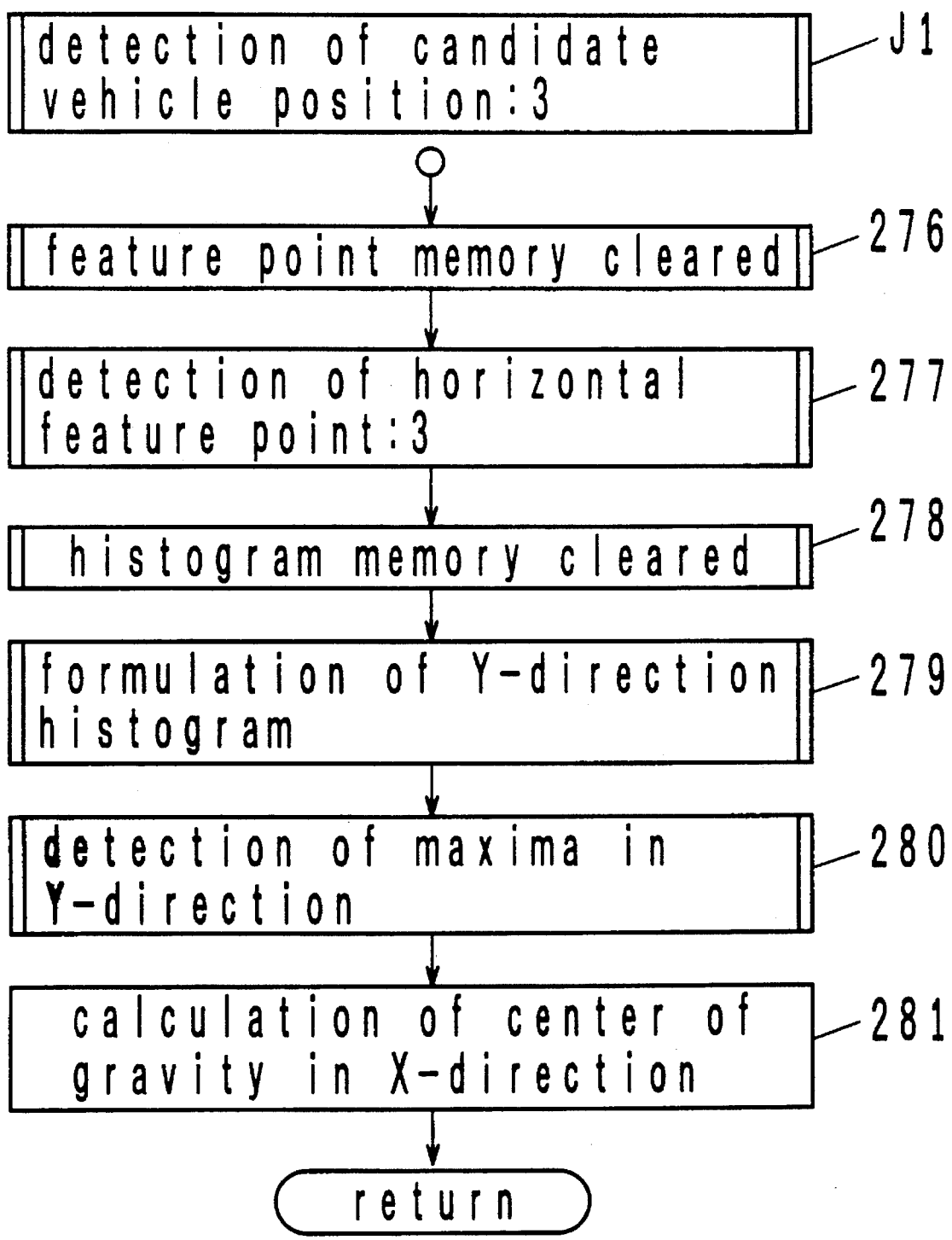
FIG. 51 is a flow chart showing "detection of candidate vehicle position 3" J1 shown in FIG. 50 in detail.
Figure 52:
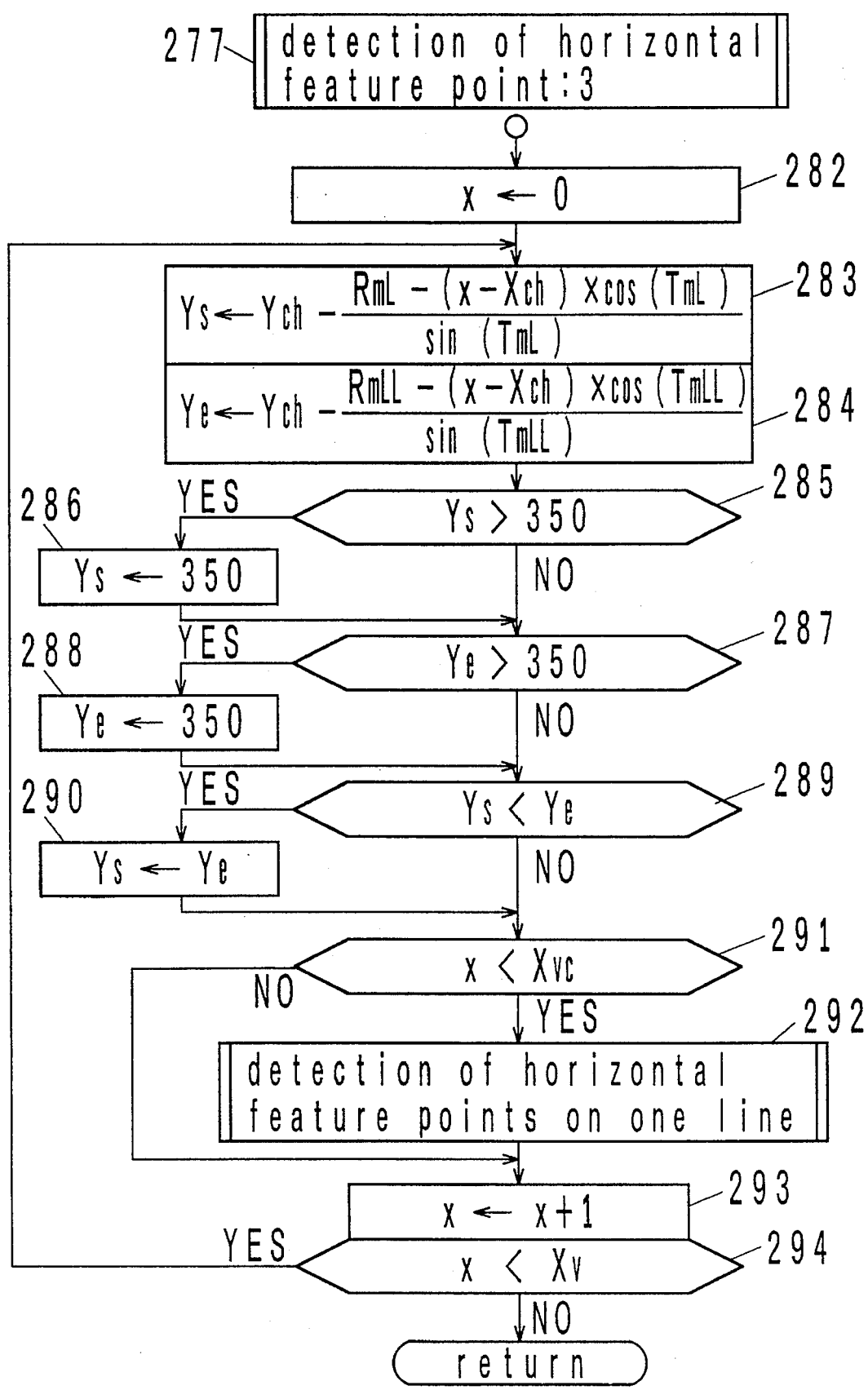
FIG. 52 is a flow chart showing "detection of horizontal feature point 3" 277 shown in FIG. 51 in detail.

J. "Recognition of any vehicle running ahead on the left adjacent lane and determination of distance" J (FIGS. 50, S1 and S2)

Again, a processing operation similar to the "recognition of any vehicle running ahead on the own vehicle's lane and determination of distance" H mentioned above is applied to the left adjacent lane region, namely, a region defined by the bottom side (Y=350) of the window 2, the white line (TmL, RmL) at the left end of the own vehicle's lane and the white line (TmLL, RmLL) at the left end of the left adjacent lane, thereby detecting any object or vehicle which is located ahead of one's own vehicle on the left adjacent lane, and the distance thereto from one's own vehicle is calculated.

When what has been described above is completed, it means that CPU 1 has completed the execution of one run of stored programs from the "correction of screen" C to the "recognition of any vehicle running ahead on the left adjacent lane and determination of distance" J based on the image data of one screen which has been read at the "image input" B. Then, it delivers a result of image recognition as an output at "output" K. Subsequently, it repeats the second run starting with the "image input" B and continuing to the "output" K as shown in FIG. 3.

While a preferred embodiment has been shown and described, it should be understood that a number of changes and modifications are possible therein. Accordingly it is to be understood that there is no intention to limit the invention to the precise construction disclosed herein, and the right is reserved to all changes and modifications coming within the scope of the invention as defined in the appended claims.

What is claimed is:

1. An apparatus for detecting a rectilinear line of an object comprising:

generating means for inputting an analog picture image of said object and generating image data which represents said picture image of said object in an X and Y orthogonal coordinate system;

determining means for determining a plurality of feature points (Xs, Ys), wherein said plurality of feature points (Xs, Ys) are defined by values and distributions of said image data on said picture image and wherein at least some of said plurality of feature points (Xs, Ys) correspond to said rectilinear line;

first converting means for respectively converting each of said plurality of feature points (Xs, Ys) into corresponding first groups of points (r1, t1), wherein said corresponding first groups of points (r1, t1) respectively represent curves in a first r1–t1 polar coordinate system having a first resolution and a first range;

first memory means for storing first frequency data, wherein addresses of said first memory means respectively relate to points of said first r1–t1 polar coordinate system;

first incrementing means for incrementing said first frequency data, wherein said first incrementing means increments said first frequency data stored at a first certain address of said first memory means for each instance that one point in one of said corresponding first groups of points (r1, t1) relates to said first certain address;

first selecting means for selecting a first particular point (rm1, tm1) in said first r1–t1 polar coordinate system, wherein said first particular point (rm1, tm1) corresponds to a first particular address of said first memory means at which said first frequency data represents a maximum value;

second converting means for respectively converting at least some of said plurality of feature points (Xs, Ys) into corresponding second groups of points (r2, t2), wherein said corresponding second groups of points (r2, t2) respectively represent curves in a second r2–t2 polar coordinate system having a second resolution and a second range, wherein said second r2–t2 polar coordinate system is centered about said first particular point (rm1, tm1), and wherein said second resolution is higher than said first resolution and said second range is narrower than said first range;

second memory means for storing second frequency data, wherein addresses of said second memory means respectively relate to points of said second r2–t2 polar coordinate system;

second incrementing means for incrementing said second frequency data, wherein said second incrementing means increments said second frequency data stored at a second certain address of said second memory means for each instance that one point in one of said corresponding second groups of points (r2, t2) relates to said second certain address;

second selecting means for selecting a second particular point (rm2, tm2) in said second r2–t2 polar coordinate system, wherein said second particular point (rm2, tm2) corresponds to a second particular address of said second memory means at which said second frequency data represents a maximum value; and line determining means for determining said rectilinear line in said X and Y orthogonal coordinate system, wherein said rectilinear line is based at least partially on said second particular point (rm2, tm2) and approximates a succession of at least some of said plurality of feature points (Xs, Ys).

2. The apparatus for detecting a rectilinear line of an object as defined in claim 1, wherein said corresponding first group of points (r1, t1) in said first r1–t1 polar coordinate system are related to a $\rho$ and $\theta$ polar coordinate system having an origin point (Xch, Ych) in said X and Y orthogonal coordinate system based on the following first equations:

$\rho = r1/d_1 + c_1,$ $\theta = a_1 \cdot t1 + b_1,$ and $\rho = (Xs - Xch) \cdot \cos(a_1 \cdot t1 + b_1) + (Ych - Ys) \cdot \sin(a_1 \cdot t1 + b_1)$ for t1 = 0, 1, 2, . . . , M;

wherein M equals a first positive integer;

wherein said corresponding second groups of points (r2, t2) in said second r2–t2 polar coordinate system are related to said $\rho$ and $\theta$ polar coordinate system having said origin point (Xch, Ych) in said X and Y orthogonal coordinate system based on the following second equations:

$\rho = r2/d_2 + c_2,$ and $\theta = a_2 \cdot t2 + b_2,$ and $\rho = (Xs - Xch) \cdot \cos(a_2 \cdot t2 + b_2) + (Ych - Ys) \cdot \sin(a_2 \cdot t2 + b_2)$ for t1 = 0, 1, 2, . . . , N;

wherein N equals a second positive integer; and wherein $a_1$ is less than $a_1$, $b_2$ is closer to tm1 than $b_1$, $c_2$ is closer to rm1 than $c_1$, and $d_2$ is greater than $d_1$.

3. The apparatus for detecting a rectilinear line of an object as defined in claim 2, wherein said first positive integer equals said second positive integer.

4. The apparatus for detecting a rectilinear line of an object as defined in claim 1, further comprising:

third converting means for respectively converting at least some of said plurality of feature points (Xs, Ys) into corresponding third groups of points (r3, t3), wherein said corresponding third groups of points (r3, t3) respectively represent curves in a third r3–t3 polar coordinate system having a third resolution and a third range, wherein said third r3–t3 polar coordinate system is centered about said second particular point (rm2, tm2), and wherein said third resolution is higher than said second resolution and said third range is narrower than said second range;

third memory means for storing third frequency data, wherein addresses of said third memory means respectively relate to points of said third r3–t3 polar coordinate system;

third incrementing means for incrementing said third frequency data, wherein said third incrementing means increments said third frequency data stored at a third certain address of said third memory means for each instance that one point in one of said corresponding third groups of points (r3, t3) relates to said third certain address; and third selecting means for selecting a third particular point (rm3, tm3) in said third r3–t3 polar coordinate system, wherein said third particular point (rm3, tm3) corresponds to a third particular address of said third memory means at which said third frequency data represents a maximum value, wherein said line determining means determines said rectilinear line in said X and Y orthogonal coordinate system by determining that said rectilinear line corresponds to a succession of at least some of said plurality of feature points (Xs, Ys) which relate to said third particular point (rm3, tm3).

5. The apparatus for detecting a rectilinear line of an object as defined in claim 4, wherein said corresponding first groups of points (r1, t1) in said first r1–t1 polar coordinate system are related to a $\rho$ and $\theta$ polar coordinate system having an origin point (Xch, Ych) in said X and Y orthogonal coordinate system based on the following first equations:

$\rho = r1/d_1 + c_1,$ $\theta = a_1 \cdot t1 + b_1,$ and $\rho = (Xs - Xch) \cdot \cos(a_1 \cdot t1 + b_1) + (Ych - Ys) \cdot \sin(a_1 \cdot t1 + b_1)$ for t1=0, 1, 2, ..., M;

wherein M equals a first positive integer;

wherein said corresponding second groups of points (r2, t2) in said second r2–t2 polar coordinate system are related to said ρ and θ polar coordinate system having said origin point (Xch, Ych) in said X and Y orthogonal coordinate system based on the following second equations:

$\rho = r2/d_2 + c_2,$ $\theta = a_2 \cdot t2 + b_2,$ and $\rho = (Xs-Xch) \cdot \cos(a_2 \cdot t2 + b_2) + (Ych-Ys) \cdot \sin(a_2 \cdot t2 + b_2)$ for t2=0, 1, 2, ..., N;

wherein N equals a second positive integer; and wherein $a_2$ is less than $a_1$, $b_2$ is closer to tm1 than $b_1$, $c_2$ is closer to rm1 than $c_1$, and $d_2$ is greater than $d_1$.

6. The apparatus for detecting a rectilinear line of an object as defined in claim 5, wherein said corresponding third groups of points (r3, t3) in said third r3–t3 polar coordinate system are related to said ρ and θ polar coordinate system having said origin point (Xch, Ych) in said X and Y orthogonal coordinate system based on the following third equations:

$\rho = r3/d_3 + c_3,$ $\theta = a_3 \cdot t3 + b_3,$ and $\rho = (Xs-Xch) \cdot \cos(a_3 \cdot t3 + b_3) + (Ych-Ys) \cdot \sin(a_3 \cdot t3 + b_3)$ for t3=0, 1, 2, ..., X;

wherein X equals a third positive integer; and wherein $a_3$ is less than $a_2$, $b_3$ is closer to tm2 than $b_2$, $c_3$ is closer to rm2 than $c_3$, and $d_3$ is greater than $d_3$.

7. The apparatus for detecting a rectilinear line of an object as defined in claim 6, wherein said first positive integer equals said second positive integer and said second positive integer equals said third positive integer.

8. The apparatus for detecting a rectilinear line of an object as defined in claim 6, wherein each of said plurality of feature points (Xs, Ys) is a point on said X and Y orthogonal coordinate system at which a derivative value of said image data is equal to or greater than a threshold value and wherein said derivative value is calculated in a given direction in said X and Y orthogonal coordinate system.

9. The apparatus for detecting a rectilinear line of an object as defined in claim 1, wherein each of said plurality of feature points (Xs, Ys) is a point on said X and Y orthogonal coordinate system at which a derivative value of said image data is equal to or greater than a threshold value and wherein said derivative value is calculated in a given direction in said X and Y orthogonal coordinate system.

10. The apparatus for detecting a rectilinear line of an object as defined in claim 1, wherein said generating means comprises a photographing unit mounted onboard a vehicle for taking said picture image of said object.

11. An apparatus for detecting a rectilinear line of an object comprising:

a photographing unit mounted onboard a vehicle for inputting an analog picture of a scene including a road surface located ahead of the vehicle and for obtaining image data in an X and Y orthogonal coordinate system which represents said analog picture;

first memory means for storing the image data;

calculating means for calculating a derivative value of said image data in said first memory means and for determining feature positions (Xs, Ys) in said X and Y orthogonal coordinate system, wherein said derivative value is calculated in a given direction in the X and Y orthogonal coordinate system and wherein said feature positions (Xs, Ys) are considered to be at positions of said image data where said derivative value is equal to or greater than a threshold value;

second memory means for storing said feature positions (Xs, Ys);

conversion means for respectively converting said feature positions (Xs, Ys) in said second memory means into corresponding groups of points (r, t) which represent curves in a r–t polar coordinate system;

third memory means for storing frequency data, wherein addresses of said third memory means respectively relate to points of said r–t polar coordinate system;

counting means for incrementing said frequency data, wherein said counting means increments said frequency data at a certain address of said third memory means for each instance that one point in one of said corresponding groups of points (r, t) relates to said certain address;

selection means for selecting a particular point (rm, tm) in said polar coordinate system, wherein said particular point (rm, tm) corresponds to a particular address of said third memory means at which said frequency data represents a maximum value;

determination means for determining a rectilinear line in said X and Y orthogonal coordinate system, wherein said rectilinear line corresponds to said particular point (rm, tm) in said r–t polar coordinate system and wherein said rectilinear line approximates a white line drawn on said road surface within said scene; and repeating means for repeating said converting of said conversion means, said incrementing of said counting means, said selecting of the selecting means, and said determining of said determination means in for plurality of runs, wherein said r–t polar coordinate system has a first resolution and a first range during a previous run and a second resolution and a second range during a subsequent run, wherein said second resolution is greater thah said first resolution and said second range is narrower than said first range, and wherein, during said subsequent run, said r–t polar system is centered around said particular point (rm, tm) obtained during said previous run.

12. An apparatus for detecting a rectilinear line of an object as defined in claim 11, further comprising:

creating means for creating a feature point detecting window, wherein said feature point detecting window includes substantially all white lines on said road surface located ahead of said vehicle which are contained in said analog picture of said scene taken by said photographing unit and wherein said calculating means calculates said derivative values of said image data corresponding to said feature point detecting window.

13. An apparatus for detecting a rectilinear line of an object as defined in claim 12, wherein a position and an area of said feature point detecting window corresponding to a picture frame are constant.

14. The apparatus for detecting a rectilinear line of an object as defined in claim 11, wherein said corresponding groups of points (r, t) obtained during said previous run are related to a ρ and $\theta$ polar coordinate system having an origin point (Xch, Ych) in said X and Y orthogonal coordinate system based on the following first equations:

$$\rho = r/d_1 + c_1,$$

$$\theta = a_1 \cdot t + b_1, \text{ and}$$

$$\rho = (Xs - Xch) \cdot \cos(a_1 \cdot t + b_1) + (Ych - Ys) \cdot \sin(a_1 \cdot t + b_1)$$

for $t = 0, 1, 2, \ldots, M$;

wherein M equals a first positive integer;

wherein said corresponding groups of points (r, t) obtained during said subsequent run are related to said $\rho$ and $\theta$ polar coordinate system having said origin point (Xch, Ych) in said X and Y orthogonal coordinate system based on the following second equations:

$$\rho = r/d_2 + c_2,$$

$$\theta = a_2 \cdot t + b_2, \text{ and}$$

$$\rho = (Xs - Xch) \cdot \cos(a_2 \cdot t + b_2) + (Ych - Ys) \cdot \sin(a_2 t + b_2)$$

for $t = 0, 1, 2, \ldots, N$;

wherein N equals a second positive integer; and wherein $a_2$ is less than $a_1$, $b_2$ is closer to tm obtained during said previous run than $b_1$, $c_2$ is closer to rm obtained during said previous run than $c_1$, and $d_2$ is greater than $d_1$.

15. The apparatus for detecting a rectilinear line of an object as defined in claim 14, wherein said first positive integer equals said second positive integer.

16. The apparatus for detecting a rectilinear line of an object as defined in to claim 14, wherein said corresponding groups of points (r, t) obtained during second subsequent run are related to said $\rho$ and $\theta$ polar coordinate system having said origin point (Xch, Ych) in said X and Y orthogonal coordinate system based on the following third equations:

$$\rho = r/d_3 + c_3,$$

$$\theta = a_3 \cdot t + b_3, \text{ and}$$

$$\rho = (Xs - Xch) \cdot \cos(a_3 t + b_3) + (Ych - Ys) \cdot \sin(a_3 \cdot t + b_3)$$

for $t = 0, 1, 2, \ldots, X$;

wherein X equals a third positive integer; and wherein $a_3$ is less than $a_2$, $b_3$ is closer to tm obtained during said subsequent run than $b_2$, $c_3$ is closer to rm obtained during said subsequent run than $c_2$, and $d_3$ is greater than $d_2$.

17. The apparatus for detecting a rectilinear line of an object as defined in claim 16, wherein said first positive integer equals said second positive integer and said second positive integer equals said third positive integer.

18. The apparatus for detecting a rectilinear line of an object as defined in claim 16, further comprising:

creating means for creating a feature point detecting window, wherein said feature point detecting window includes substantially all white lines on said road surface located ahead of said vehicle which are contained in said picture of said scene taken by said photographing unit and wherein said calculating means calculates said derivative values of said image data corresponding to said feature point detecting window.

19. An apparatus for detecting a rectilinear line of an object as defined in claim 18, wherein a position and an area of said feature point detecting window corresponding to a picture frame are constant.

20. The apparatus for detecting a rectilinear line of an object as defined in claim 19, wherein said first positive integer equals said second positive integer and said second positive integer equals said third positive integer.

* * * * *